US008417715B1

(12) United States Patent
Bruckhaus et al.

(10) Patent No.: US 8,417,715 B1
(45) Date of Patent: Apr. 9, 2013

(54) PLATFORM INDEPENDENT PLUG-IN METHODS AND SYSTEMS FOR DATA MINING AND ANALYTICS

(76) Inventors: Tilmann Bruckhaus, Cupertino, CA (US); Ramann Kamalakannan, Sunnyvale, CA (US)

(*) Notice: Subject to any disclaimer, the term of this patent is extended or adjusted under 35 U.S.C. 154(b) by 463 days.

(21) Appl. No.: 12/339,088

(22) Filed: Dec. 19, 2008

Related U.S. Application Data

(60) Provisional application No. 61/015,168, filed on Dec. 19, 2007.

(51) Int. Cl.
  *G06F 17/30* (2006.01)
  *G06F 7/00* (2006.01)
(52) U.S. Cl. .................... 707/758; 709/248; 705/26.1
(58) Field of Classification Search .............. 707/754, 707/776, 999.004, 999.006, 999.102; 709/248
See application file for complete search history.

(56) References Cited

U.S. PATENT DOCUMENTS

| 6,704,717 | B1 | 3/2004 | Tate | |
|---|---|---|---|---|
| 6,865,573 | B1* | 3/2005 | Hornick et al. | 707/748 |
| 2002/0078039 | A1* | 6/2002 | Cereghini et al. | 707/4 |
| 2005/0278458 | A1* | 12/2005 | Berger et al. | 709/248 |
| 2006/0020620 | A1* | 1/2006 | Iyer et al. | 707/102 |
| 2006/0224603 | A1* | 10/2006 | Correll, Jr. | 707/100 |
| 2006/0277157 | A1* | 12/2006 | Seidl et al. | 707/2 |
| 2007/0214135 | A1* | 9/2007 | Crivat et al. | 707/6 |
| 2008/0270250 | A1* | 10/2008 | Bolivar et al. | 705/26 |
| 2008/0319958 | A1* | 12/2008 | Bhattacharya et al. | 707/4 |

OTHER PUBLICATIONS

Provost, Foster, "Random Forests," Machine Learning, 2001, vol. 45, p. 5-32, Springer Netherlands.
Strumbelj, Erik, Igor Kononenko, "An Efficient Explanation of Individual Classifications using Game Theory" Journal of Machine Learning Research 11, Springer US, MIT Press.
Forman, George, "Quantifying Trends Accurately Despite Qualifier Error and Class Imbalance" KDD'06, Aug. 20-23, 2006, Philadelphia, PA.
Perner, Petra, "Advances in Data Mining," Lecture Notes in Artificial Intelligence, 7th Industrial Conference, 2007, vol. 4597, USA, Springer.
Costa Da Silva, Josenildo, Matthias Klusch, "Privacy Preserving Pattern Discovery in Distributed Time Series," ICDE Workshops 2007, pg. 207-214.
www.kdkeys.net.
http://www.cs.waikato.ac.nz/ml/weka/index_top.html.
http://www.r-project.org/.
http://rapid-i.com/content/view/10/32/lang,en/.
Henschen, Doug, "IDC Report See Steady Growth for BI, Pent-Up Demand for Analytics," Intelligent Enterprise, Jul. 3, 2008.
Segaran, Toby, Programming Collective Intelligence: Building Smart Web 2.0 Applications [Illustrated], Aug. 16, 2007, p. 7-17, O'Reilly Media, Inc.

(Continued)

*Primary Examiner* — Usmaan Saeed
*Assistant Examiner* — Dung K Chau

(57) ABSTRACT

The present invention comprises methods, system, and apparatuses for generating and delivering analytic results for any simple or highly complex problem for which data exists that software or similar automated means can analyze. The present invention thus contemplates methods, systems, apparatuses, software, software processes, computer-readable medium, and/or data structures to enable performance of these and other features. In one embodiment, a method of the present invention comprises extracting and converting data using a data management component into a form usable by a data mining component, performing data mining to develop a model in response to a question or problem posed by a user.

21 Claims, 53 Drawing Sheets

OTHER PUBLICATIONS

Jones, Tim, AI Application Programming (Programming Series), 2d edition, Jun. 3, 2005, p. 303-305, Charles River Media.

Frank, Eibe, Ian H. Witten, Data Mining: Practical Machine Learning Tools and Techniques, 2d edition, Jun. 10, 2005, p. 461-469 Morgan Kaufmann.

Han, Jiawei, Micheline Kamber Data Mining: Concepts and Techniques (The Morgan Kaufmann Series in Data Management Systems), 2d edition, Nov. 3, 2005, Morgan Kaufmann.

Hastie, Trevor, Robert Tibshirani, Jerome Friedman, The Elements of Statistical Learning, Jul. 30, 2003, p. 10-15, Springer.

Mitchell, Tom, Machine Learning (McGraw-Hill International Edit), Oct. 1, 1997, McGraw Hill Higher Education.

http://www.public.asu.edu/~huanliu/FSBOOK/CODE/WSBG.

SPSS, http://www-01.ibm.com/software/analytics/spss/.

SAS, http://www.sas.com/.

Salford Systems, http://salford-systems.com/.

Elkan, Charles, "The Foundations of Cost-Sensitive Learning," Proceedings of the Seventeenth International Joint Conference on Artificial Intelligence, 2001, pp. 973-978.

Caruana, Rich, Nikolaos Karampatziakis, Ainur Yessenalina, "An Empirical Evaluation of Supervised Learning in High Dimensions," ICML, 2008.

Molina, Luis Carlos, Lluis Belanche, Angela Nebot, "Feature Selection Alogrithms: A Survey and Experimental Evaluation," IEEE International Conference, 2002, pp. 306-313.

Caruana, Rich, Alexandru Niculescu-Mizil, "Data Mining in Metric Space: An Empirical Analysis of Supervised Learning Performance Criteria," Proceedings of the tenth ACM SIGKDD.

Zhu, Xingquan, Ian Davidson, "Knowledge Discovery and Data Mining: Challenges and Realities," IGI Global, 2007, pp. 114-138.

Soukup, Tom, Ian Davidson, Visual Data Mining: Techniques and Tools for Data Visualization and Mining, 2002, p. 228-233, John Wiles and Sons, Inc.

Herschel, Gareth, "Magic Quadrant for Customer Data Mining, 2Q07," Gartner RAS Core Research Note G001145685, May 4, 2007.

* cited by examiner

| IDENTIFIER | BUSINESS TASK | INPUT IDENTIFIER | INPUT NAME | TYPE |
|---|---|---|---|---|
| 4001 | BUS TASK 1 | 20011 | DATA_PREP_COL1 | DATA INPUT |
| 4002 | BUS TASK 1 | 20012 | DATA_PREP_COL2 | DATA INPUT |
| 4003 | BUS TASK 1 | 20013 | DATA_PREP_COL3 | DATA INPUT |
| 4004 | BUS TASK 1 | 20014 | DATA_PREP_COL4 | DATA INPUT |
| 4005 | BUS TASK 1 | 20015 | DATA_PREP_COL5_A | DATA INPUT |
| 4006 | BUS TASK 1 | 20016 | DATA_PREP_COL5_B | DATA INPUT |
| 4007 | BUS TASK 1 | 20017 | DATA_PREP_COL5_C | DATA INPUT |
| 4008 | BUS TASK 1 | 20018 | DATA_PREP_COL100 | DATA INPUT |
| 4009 | BUS TASK 1 | 20019 | DATA_PREP_COL8 | DATA INPUT |
| 4010 | BUS TASK 1 | 20020 | DATA_PREP_COL9 | DATA INPUT |
| 4011 | BUS TASK 1 | 20021 | DATA_PREP_COL10 | DATA INPUT |
| 4012 | BUS TASK 1 | 20022 | DATA_PREP_COL11 | DATA INPUT |
| 4013 | BUS TASK 1 | 20023 | DATA_PREP_COL12 | DATA INPUT |
| 4014 | BUS TASK 1 | 20024 | DATA_PREP_COL13 | OUTPUT |
| 4015 | BUS TASK 1 | 20025 | DATA_PREP_COL14 | DATA INPUT |
| 4016 | BUS TASK 1 | 70004 | DATA_MINING_CATEG_1 | ALGORITHM CATEGORY |
| 4017 | BUS TASK 1 | 90001 | OBJ_FUNCTION_1 | OBJECTIVE FUNCTION |

FIG. 8

| IDENTIFIER | BUSINESS TASK | JOB NAME | SERVICE PROCESS | TYPE | SEQUENCE |
|---|---|---|---|---|---|
| 9001 | BUS TASK 1 | CREATE BUSINESS TASK | BUSINESS SERVICES | INTERACTIVE | 1 |
| 9002 | BUS TASK 1 | CREATE CDMDM MAPPING | BUSINESS SERVICES | INTERACTIVE | 2 |
| 9003 | BUS TASK 1 | TRANSLATE BUSINESS TASK | BUSINESS SERVICES | INTERACTIVE | 3 |
| 9004 | BUS TASK 1 | ACQUIRE DATA | DATA ACQUISITION SERVICES | AUTOMATED | 4 |
| 9005 | BUS TASK 1 | AGGREGATE DATA | DATA AGGREGATION SERVICES | AUTOMATED | 5 |
| 9006 | BUS TASK 1 | CREATE OBSERVATIONS | DATA PREPARATION SERVICES | AUTOMATED | 6 |
| 9007 | BUS TASK 1 | OPTIMIZE MODEL | MODEL MANAGER | AUTOMATED | 7 |
| 9008 | BUS TASK 1 | EXECUTE MODEL | MODEL MANAGER | AUTOMATED | 8 |
| 9009 | BUS TASK 1 | DELIVER RESULTS | DELIVERY SERVICES | AUTOMATED | 9 |

FIG. 8C

| IDENTIFIER | BUSINESS TASK | TASK_NAME | SOURCE_DATABASE | SOURCE_TABLE | SOURCE_TABLE_TYPE | SOURCE_COLUMN | LAST_CHANGE_COLUMN | TARGET_DATABASE | TARGET_TABLE | TARGET_COLUMN | TARGET_TABLE_TYPE |
|---|---|---|---|---|---|---|---|---|---|---|---|
| 10001 | BUS TASK 1 | ACQUIRE DATA | SDB1 | STBL1 | ATTRIBUTE | SCOL1 | | CDMDR | STG_TBL1 | STG_COL1 | TYPE 2 |
| 10002 | BUS TASK 1 | ACQUIRE DATA | SDB1 | STBL1 | ATTRIBUTE | SCOL2 | | CDMDR | STG_TBL1 | STG_COL2 | TYPE 2 |
| 10003 | BUS TASK 1 | ACQUIRE DATA | SDB1 | STBL1 | ATTRIBUTE | SCOL3 | | CDMDR | STG_TBL1 | STG_COL3 | TYPE 2 |
| 10004 | BUS TASK 1 | ACQUIRE DATA | SDB1 | STBL1 | ATTRIBUTE | SCOL4 | | CDMDR | STG_TBL1 | STG_COL4 | TYPE 2 |
| 10005 | BUS TASK 1 | ACQUIRE DATA | SDB1 | STBL1 | ATTRIBUTE | SCOL5 | | CDMDR | STG_TBL1 | STG_COL5 | TYPE 2 |
| 10006 | BUS TASK 1 | ACQUIRE DATA | SDB1 | STBL1 | ATTRIBUTE | SCOL6 | YES | CDMDR | STG_TBL1 | STG_COL6 | TYPE 2 |
| 10007 | BUS TASK 1 | ACQUIRE DATA | SDB1 | STBL2 | TRANSACTION | SCOL7 | | CDMDR | STG_TBL2 | STG_COL7 | TYPE 0 |
| 10008 | BUS TASK 1 | ACQUIRE DATA | SDB1 | STBL2 | TRANSACTION | SCOL8 | | CDMDR | STG_TBL2 | STG_COL8 | TYPE 0 |
| 10009 | BUS TASK 1 | ACQUIRE DATA | SDB1 | STBL2 | TRANSACTION | SCOL9 | | CDMDR | STG_TBL2 | STG_COL9 | TYPE 0 |
| 10010 | BUS TASK 1 | ACQUIRE DATA | SDB1 | STBL2 | TRANSACTION | SCOL10 | | CDMDR | STG_TBL2 | STG_COL10 | TYPE 0 |
| 10011 | BUS TASK 1 | ACQUIRE DATA | SDB1 | STBL2 | TRANSACTION | SCOL11 | | CDMDR | STG_TBL2 | STG_COL11 | TYPE 0 |
| 10012 | BUS TASK 1 | ACQUIRE DATA | SDB1 | STBL2 | TRANSACTION | SCOL12 | | CDMDR | STG_TBL2 | STG_COL12 | TYPE 0 |
| 10013 | BUS TASK 1 | ACQUIRE DATA | SDB1 | STBL2 | TRANSACTION | SCOL13 | | CDMDR | STG_TBL2 | STG_COL13 | TYPE 0 |
| 10014 | BUS TASK 1 | ACQUIRE DATA | SDB1 | STBL2 | TRANSACTION | SCOL14 | YES | CDMDR | STG_TBL2 | STG_COL14 | TYPE 0 |
| 10015 | BUS TASK 1 | ACQUIRE DATA | SDB1 | STBL2 | TRANSACTION | SCOL15 | | CDMDR | STG_TBL2 | STG_COL15 | TYPE 0 |

FIG. 10

| IDENTIFIER | BUSINESS TASK | TASK_NAME | SOURCE_DATABASE | SOURCE_TABLE | SOURCE_TABLE_TYPE | SOURCE_COLUMN | DATA_PROCESSED_COLUMN | TARGET_DATABASE | TARGET_TABLE | TARGET_COLUMN | TARGET_TABLE_TYPE |
|---|---|---|---|---|---|---|---|---|---|---|---|
| 10011 | BUS TASK 1 | AGGREGATE DATA | CDMDR | STG_TBL1 | TYPE 2 | STG_COL1 |  | CDMDR | AGG_TBL1 | AGG_COL | TYPE 2 |
| 10012 | BUS TASK 1 | AGGREGATE DATA | CDMDR | STG_TBL1 | TYPE 2 | STG_COL2 |  | CDMDR | AGG_TBL1 | AGG_COL | TYPE 2 |
| 10013 | BUS TASK 1 | AGGREGATE DATA | CDMDR | STG_TBL1 | TYPE 2 | STG_COL3 |  | CDMDR | AGG_TBL1 | AGG_COL | TYPE 2 |
| 10014 | BUS TASK 1 | AGGREGATE DATA | CDMDR | STG_TBL1 | TYPE 2 | STG_COL4 |  | CDMDR | AGG_TBL1 | AGG_COL | TYPE 2 |
| 10015 | BUS TASK 1 | AGGREGATE DATA | CDMDR | STG_TBL1 | TYPE 2 | STG_COL5 |  | CDMDR | AGG_TBL1 | AGG_COL | TYPE 2 |
| 10016 | BUS TASK 1 | AGGREGATE DATA | CDMDR | STG_TBL1 | TYPE 2 | STG_COL6 |  | CDMDR | AGG_TBL1 | AGG_COL | TYPE 2 |
| 10017 | BUS TASK 1 | AGGREGATE DATA | CDMDR | STG_TBL1 | TYPE 2 | STC_COL100 | YES | N/A | N/A | N/A | N/A |
| 10018 | BUS TASK 1 | AGGREGATE DATA | CDMDR | STG_TBL2 | TYPE 0 | STG_COL7 |  | CDMDR | AGG_TBL2 | AGG_COL | TYPE 0 |
| 10019 | BUS TASK 1 | AGGREGATE DATA | CDMDR | STG_TBL2 | TYPE 0 | STG_COL8 |  | CDMDR | AGG_TBL2 | AGG_COL | TYPE 0 |
| 10020 | BUS TASK 1 | AGGREGATE DATA | CDMDR | STG_TBL2 | TYPE 0 | STG_COL9 |  | CDMDR | AGG_TBL2 | AGG_COL | TYPE 0 |
| 10021 | BUS TASK 1 | AGGREGATE DATA | CDMDR | STG_TBL2 | TYPE 0 | STG_COL10 |  | CDMDR | AGG_TBL2 | AGG_COL | TYPE 0 |
| 10022 | BUS TASK 1 | AGGREGATE DATA | CDMDR | STG_TBL2 | TYPE 0 | STG_COL11 |  | CDMDR | AGG_TBL2 | AGG_COL | TYPE 0 |
| 10023 | BUS TASK 1 | AGGREGATE DATA | CDMDR | STG_TBL2 | TYPE 0 | STG_COL12 |  | CDMDR | AGG_TBL2 | AGG_COL | TYPE 0 |
| 10024 | BUS TASK 1 | AGGREGATE DATA | CDMDR | STG_TBL2 | TYPE 0 | STG_COL13 |  | CDMDR | AGG_TBL2 | AGG_COL | TYPE 0 |
| 10025 | BUS TASK 1 | AGGREGATE DATA | CDMDR | STG_TBL2 | TYPE 0 | STG_COL14 |  | CDMDR | AGG_TBL2 | AGG_COL | TYPE 0 |
| 10026 | BUS TASK 1 | AGGREGATE DATA | CDMDR | STG_TBL2 | TYPE 0 | STG_COL15 |  | CDMDR | AGG_TBL2 | AGG_COL | TYPE 0 |
| 10027 | BUS TASK 1 | AGGREGATE DATA | CDMDR | STG_TBL2 | TYPE 0 | STC_COL200 | YES | N/A | N/A | N/A | N/A |

FIG. 12

| 1 | 2 | 3 | 4 | 5 | 6 | 7 | 8 | 9 | 10 | 11 |
|---|---|---|---|---|---|---|---|---|---|---|
| IDENTIFIER | BUSINESS_TASK | TASK_NAME | SOURCE_DATABASE | SOURCE_TABLE | SOURCE_TABLE_TYPE | SOURCE_COLUMN | TARGET_DATABASE | TARGET_TABLE | TARGET_COLUMN | TARGET_COLUMN_IS_DERIVED |
| 20011 | BUS TASK 1 | CREATE OBSERVATIONS | CDMDR | AGG_TBL1 | TYPE 2 | AGG_COL1 | CDMDR | DATA_PREP_TBL1 | DATA_PREP_COL1 | YES |
| 20012 | BUS TASK 1 | CREATE OBSERVATIONS | CDMDR | AGG_TBL1 | TYPE 2 | AGG_COL2 | CDMDR | DATA_PREP_TBL1 | DATA_PREP_COL2 | |
| 20013 | BUS TASK 1 | CREATE OBSERVATIONS | CDMDR | AGG_TBL1 | TYPE 2 | AGG_COL3 | CDMDR | DATA_PREP_TBL1 | DATA_PREP_COL3 | |
| 20014 | BUS TASK 1 | CREATE OBSERVATIONS | CDMDR | AGG_TBL1 | TYPE 2 | AGG_COL4 | CDMDR | DATA_PREP_TBL1 | DATA_PREP_COL4 | |
| 20015 | BUS TASK 1 | CREATE OBSERVATIONS | CDMDR | AGG_TBL1 | TYPE 2 | AGG_COL5 | CDMDR | DATA_PREP_TBL1 | DATA_PREP_COL5_A | YES |
| 20016 | BUS TASK 1 | CREATE OBSERVATIONS | CDMDR | AGG_TBL1 | TYPE 2 | AGG_COL5 | CDMDR | DATA_PREP_TBL1 | DATA_PREP_COL5_B | YES |
| 20017 | BUS TASK 1 | CREATE OBSERVATIONS | CDMDR | AGG_TBL1 | TYPE 2 | AGG_COL5 | CDMDR | DATA_PREP_TBL1 | DATA_PREP_COL5_C | YES |
| 20018 | BUS TASK 1 | CREATE OBSERVATIONS | CDMDR | AGG_TBL2 | TYPE 0 | AGG_COL7 | CDMDR | DATA_PREP_TBL1 | DATA_PREP_COL100 | YES |
| 20019 | BUS TASK 1 | CREATE OBSERVATIONS | CDMDR | AGG_TBL2 | TYPE 0 | AGG_COL7 | CDMDR | DATA_PREP_TBL1 | DATA_PREP_COL8 | |
| 20020 | BUS TASK 1 | CREATE OBSERVATIONS | CDMDR | AGG_TBL2 | TYPE 0 | AGG_COL8 | CDMDR | DATA_PREP_TBL1 | DATA_PREP_COL9 | |
| 20021 | BUS TASK 1 | CREATE OBSERVATIONS | CDMDR | AGG_TBL2 | TYPE 0 | AGG_COL9 | CDMDR | DATA_PREP_TBL1 | DATA_PREP_COL10 | |
| 20022 | BUS TASK 1 | CREATE OBSERVATIONS | CDMDR | AGG_TBL2 | TYPE 0 | AGG_COL10 | CDMDR | DATA_PREP_TBL1 | DATA_PREP_COL11 | |
| 20023 | BUS TASK 1 | CREATE OBSERVATIONS | CDMDR | AGG_TBL2 | TYPE 0 | AGG_COL11 | CDMDR | DATA_PREP_TBL1 | DATA_PREP_COL12 | |
| 20024 | BUS TASK 1 | CREATE OBSERVATIONS | CDMDR | AGG_TBL2 | TYPE 0 | AGG_COL12 | CDMDR | DATA_PREP_TBL1 | DATA_PREP_COL13 | |
| 20025 | BUS TASK 1 | CREATE OBSERVATIONS | CDMDR | AGG_TBL2 | TYPE 0 | AGG_COL13 | CDMDR | DATA_PREP_TBL1 | DATA_PREP_COL14 | YES |
| 20026 | BUS TASK 1 | CREATE OBSERVATIONS | CDMDR | AGG_TBL2 | TYPE 0 | AGG_COL14 | CDMDR | DATA_PREP_TBL1 | DATA_PREP_COL14 | YES |
| 20027 | BUS TASK 1 | CREATE OBSERVATIONS | CDMDR | AGG_TBL2 | TYPE 0 | AGG_COL15 | CDMDR | DATA_PREP_TBL1 | DATA_PREP_COL14 | YES |

| 12 | 13 |
|---|---|
| DATA_PREP_FORMULA | TARGET_TABLE_TYPE |
| BINNING | SINGLE-VIEW |
| DIRECT COPY | SINGLE-VIEW |
| DIRECT COPY | SINGLE-VIEW |
| DIRECT COPY | SINGLE-VIEW |
| DISCRETE VALUE 1 | SINGLE-VIEW |
| DISCRETE VALUE 2 | SINGLE-VIEW |
| DISCRETE VALUE 3 | SINGLE-VIEW |
| AVERAGE | SINGLE-VIEW |
| DIRECT COPY | SINGLE-VIEW |
| DIRECT COPY | SINGLE-VIEW |
| DIRECT COPY | SINGLE-VIEW |
| DIRECT COPY | SINGLE-VIEW |
| DIRECT COPY | SINGLE-VIEW |
| DIRECT COPY | SINGLE-VIEW |
| CONCATENATE | SINGLE-VIEW |
| CONCATENATE | SINGLE-VIEW |
| CONCATENATE | SINGLE-VIEW |

FIG. 14

|  |  | Prediction | |
|---|---|---|---|
|  |  | Negative | Positive |
| Truth | Negative | True Negatives (TN)<br>M1: 719<br>M2: 700 | False Positives (FP)<br>M1: 1<br>M2: 20 |
|  | Positive | False Negatives (FN)<br>M1: 238<br>M2: 80 | True Positives (TP)<br>M1: 42<br>M2: 200 |

FIG. 23

Scenario 1

$$Precision(M1) = \frac{TP}{FP+TP} = \frac{42}{43} = 97.6\%$$

$$Recall(M1) = \frac{TP}{FN+TP} = \frac{42}{280} = 15\%$$

Bugs to fix (M1): 43

Escalations prevented (M1): 42

Scenario 2

$$Precision(M2) = \frac{TP}{FP+TP} = \frac{200}{220} = 90\%$$

$$Recall(M2) = \frac{TP}{FN+TP} = \frac{200}{280} = 71.4\%$$

Bugs to fix (M2): 220

Escalations prevented (M2): 200

FIG. 24

Preferences Table

| Selection Step | Model | Preference |
|---|---|---|
| 1 | 1 | 1 |
| 1 | 2 | 0 |
| 1 | 3 | 0 |
| 2 | 2 | 0 |
| 2 | 3 | 0 |
| 2 | 4 | 1 |
| 2 | 5 | 0 |

FIG. 24A

Performance Table

| Row | Selection Step | Model | Precision | Recall | Preference |
|---|---|---|---|---|---|
| 1 | 1 | 1 | 0.82 | 0.63 | 1 |
| 2 | 1 | 2 | 0.07 | 0.84 | 0 |
| 3 | 1 | 3 | 0.17 | 0.75 | 0 |
| 4 | 2 | 2 | 0.07 | 0.84 | 0 |
| 5 | 2 | 3 | 0.17 | 0.75 | 0 |
| 6 | 2 | 4 | 0.88 | 0.75 | 1 |
| 7 | 2 | 5 | 0.47 | 0.69 | 0 |

| IDENTIFIER | BUSINESS TASK | JOB NAME | SERVICE PROCESS | TYPE | SEQUENCE |
|---|---|---|---|---|---|
| 9001 | PREDICT CHURN | CREATE BUSINESS TASK | BUSINESS SERVICES | INTERACTIVE | 1 |
| 9002 | PREDICT CHURN | CREATE CDMDM MAPPING | BUSINESS SERVICES | INTERACTIVE | 2 |
| 9003 | PREDICT CHURN | TRANSLATE BUSINESS TASK | BUSINESS SERVICES | INTERACTIVE | 3 |
| 9004 | PREDICT CHURN | ACQUIRE DATA | DATA ACQUISITION SERVICES | AUTOMATED | 4 |
| 9005 | PREDICT CHURN | AGGREGATE DATA | DATA AGGREGATION SERVICES | AUTOMATED | 5 |
| 9006 | PREDICT CHURN | CREATE OBSERVATIONS | DATA PREPARATION SERVICES | AUTOMATED | 6 |
| 9007 | PREDICT CHURN | CONSTRUCT MODEL | MODEL MANAGER | AUTOMATED | 7 |
| 9008 | PREDICT CHURN | EXECUTE MODEL | MODEL MANAGER | AUTOMATED | 8 |
| 9009 | PREDICT CHURN | DELIVER RESULTS | DELIVERY SERVICES | AUTOMATED | 9 |

FIG. 26A

| IDENTIFIER | BUSINESS TASK | INPUT IDENTIFIER | INPUT NAME |
|---|---|---|---|
| 4001 | PREDICT CHURN | 20011 | CUSTOMER_KEY |
| 4002 | PREDICT CHURN | 20012 | CUSTOMER_NAME |
| 4003 | PREDICT CHURN | 20013 | INCOME |
| 4004 | PREDICT CHURN | 20014 | MARRIED |
| 4005 | PREDICT CHURN | 20015 | SINGLE |
| 4006 | PREDICT CHURN | 20016 | CTA |
| 4007 | PREDICT CHURN | 20017 | CTB |
| 4008 | PREDICT CHURN | 20018 | ANNUAL |
| 4009 | PREDICT CHURN | 20019 | MONTHLY |
| 4010 | PREDICT CHURN | 20020 | FEE PER PERIOD |
| 4011 | PREDICT CHURN | 20021 | NUMBER LATE PAYMENTS |
| 4012 | PREDICT CHURN | 20022 | RECENT LATE PAYMENT DATE |
| 4013 | PREDICT CHURN | 20023 | WILL CANCEL |
| 4016 | PREDICT CHURN | 70004 | CLASSIFICATION |
| 4017 | PREDICT CHURN | 90001 | OBJ_FUNCTION_1 |

FIG. 26B

| IDENTIFIER | CATEGORY | ALGORITHM | PROCESSABLE_INPUTS |
|---|---|---|---|
| 1 | CLASSIFICATION | DECISION TREE 2898 | DATETIMESTAMP |
| 2 | CLASSIFICATION | DECISION TREE 2898 | VARCHAR(255) |
| 2 | CLASSIFICATION | DECISION TREE 2898 | NUMERIC |
| 3 | CLASSIFICATION | DECISION TREE 2898 | SET |
| 2 | CLASSIFICATION | NEURAL NETWORK 115 | NUMERIC |
| 3 | CLASSIFICATION | NEURAL NETWORK 115 | VARCHAR(255) |
| 4 | CLASSIFICATION | NEURAL NETWORK 115 | SET |

FIG. 26C

| 1 | 2 | 3 | 4 | 5 | 6 | 7 |
|---|---|---|---|---|---|---|
| IDENTIFIER | SOURCE_DATABASE | SOURCE_TABLE | SOURCE_TABLE_TYPE | SOURCE_COLUMN | DATA TYPE | LAST_CHANGE_COLUMN |
| 70001 | QUICKBOOKS DB | CUSTOMERS | ATTRIBUTE | CUSTOMER_NAME | VARCHAR(255) | |
| 70002 | QUICKBOOKS DB | CUSTOMERS | ATTRIBUTE | INCOME | NUMERIC | |
| 70003 | QUICKBOOKS DB | CUSTOMERS | ATTRIBUTE | MARITAL_STATUS | VARCHAR(255) | |
| 70004 | QUICKBOOKS DB | CUSTOMERS | ATTRIBUTE | UPDATE TIMESTAMP | DATETIMESTAMP | YES |
| 70005 | QUICKBOOKS DB | CONTRACTS | ATTRIBUTE | CONTRACT_ID | NUMERIC | |
| 70006 | QUICKBOOKS DB | CONTRACTS | ATTRIBUTE | CONTRACT_TYPE | VARCHAR(255) | |
| 70007 | QUICKBOOKS DB | CONTRACTS | ATTRIBUTE | FEE TYPE | VARCHAR(255) | |
| 70008 | QUICKBOOKS DB | CONTRACTS | ATTRIBUTE | FEE PER PERIOD | NUMERIC | |
| 70009 | QUICKBOOKS DB | CONTRACTS | ATTRIBUTE | CONTRACT START | DATETIMESTAMP | |
| 70010 | QUICKBOOKS DB | CONTRACTS | ATTRIBUTE | CONTRACT END | DATETIMESTAMP | |
| 70011 | QUICKBOOKS DB | CONTRACTS | ATTRIBUTE | UPDATE TIMESTAMP | DATETIMESTAMP | YES |
| 70012 | QUICKBOOKS DB | CUSTOMERS WITH CONTRACTS STAGE | TRANSACTION | CUSTOMER_NAME | VARCHAR(255) | |
| 70013 | QUICKBOOKS DB | CUSTOMERS WITH CONTRACTS STAGE | TRANSACTION | CONTRACT_ID | NUMERIC | |
| 70014 | QUICKBOOKS DB | CUSTOMERS WITH CONTRACTS STAGE | TRANSACTION | ASSIGNMENT DATE | DATETIMESTAMP | |
| 70015 | QUICKBOOKS DB | CUSTOMERS WITH CONTRACTS STAGE | TRANSACTION | UPDATE TIMESTAMP | DATETIMESTAMP | YES |
| 70016 | QUICKBOOKS DB | LATEPAYMENTS | TRANSACTION | CUSTOMER NAME | VARCHAR(255) | |
| 70017 | QUICKBOOKS DB | LATEPAYMENTS | TRANSACTION | CONTRACT_ID | NUMERIC | |
| 70018 | QUICKBOOKS DB | LATEPAYMENTS | TRANSACTION | LATE_PAYMENT_DATE | DATETIMESTAMP | |
| 70019 | QUICKBOOKS DB | LATEPAYMENTS | TRANSACTION | UPDATE TIMESTAMP | DATETIMESTAMP | YES |
| 70020 | QUICKBOOKS DB | CANCELLATIONS | TRANSACTION | CUSTOMER NAME | VARCHAR(255) | |
| 70021 | QUICKBOOKS DB | CANCELLATIONS | TRANSACTION | CONTRACT_ID | NUMERIC | |
| 70022 | QUICKBOOKS DB | CANCELLATIONS | TRANSACTION | CANCEL_DATE | DATETIMESTAMP | |
| 70023 | QUICKBOOKS DB | CANCELLATIONS | TRANSACTION | UPDATE TIMESTAMP | DATETIMESTAMP | YES |

| IDENTIFIER | FUNCTION NAME | TYPE | DEFINITION |
|---|---|---|---|
| 90001 | OBJ_FUNCTION_1 | OBJECTIVE_FUNCTION | MAXIMIZE PRECISION |
| 90002 | WILL_BE_TARGET | DATA_PREP_FORMULA | FUNCTION_WILL_BE_TARGET{ID} |
| 90003 | DISCRETE VALUE | DATA_PREP_FORMULA | DISTINCT {ATTRIBUTE} |
| 90004 | COUNT EVENT | DATA_PREP_FORMULA | COUNT {EVENT FLAG} |
| 90005 | MAX EVENT DATE | DATA_PREP_FORMULA | MAX {EVENT DATE} |

FIG. 26H

| IDENTIFIER | REPORT ID | ATTRIBUTE | SOURCE TABLE | PRESENTATION NAME |
|---|---|---|---|---|
| 20001 | 7867 | EXECUTION DATE | CHURN RESULTS | ANALYSIS DATE |
| 20002 | 7867 | CUSTOMER NAME | PREDICT CHURN OBSERVATIONS | CUSTOMER NAME |
| 20003 | 7867 | CUSTOMER ID | PREDICT CHURN OBSERVATIONS | CUSTOMER ID |
| 20004 | 7867 | MODEL SCORE | CHURN RESULTS | CHURN RISK |

FIG. 26I

Source Table: Customers

| Customer_ID | Customer_Name | Income | Marital_Status |
|---|---|---|---|
| 1000001 | Mike Smith | $19,000.00 | Married |
| 1000002 | Jane Doe | $22,000.00 | Single |
| 1000003 | Susan Jones | $36,000.00 | Married |
| 1000004 | Jack Johnson | $58,000.00 | Single |
| 1000005 | Adam Miller | $72,000.00 | Married |
| 1000006 | Peter Jackson | $68,000.00 | Single |
| 1000007 | Mary Black | $94,000.00 | Married |
| 1000008 | Sarah Davis | $44,000.00 | Single |
| 1000009 | Cindy Carter | $51,000.00 | Married |
| 1000010 | Ben Tailor | $77,000.00 | Single |

FIG. 27

Source Table: Contract Types

| Contract_Type | Contract_Fee_Type | Fee_Per_Period |
|---|---|---|
| CTA | Monthly | $12.99 |
| CTB | Annual | $99.99 |

FIG. 28

Source Table: Contracts

| Contract_ID | Contract_Start | Contract_Type | Contract_End |
|---|---|---|---|
| 2000001 | 1/14/2008 | CTA | 1/13/2009 |
| 2000002 | 3/20/2008 | CTB | 3/20/2009 |
| 2000003 | 5/19/2008 | CTA | 5/19/2009 |
| 2000004 | 2/2/2008 | CTB | 2/1/2009 |
| 2000005 | 6/1/2008 | CTA | 6/1/2009 |
| 2000006 | 3/29/2008 | CTB | 3/29/2009 |
| 2000007 | 3/7/2008 | CTA | 3/7/2009 |
| 2000008 | 4/11/2008 | CTB | 4/11/2009 |
| 2000009 | 8/2/2008 | CTA | 8/2/2009 |
| 2000010 | 2/14/2008 | CTB | 2/13/2009 |

FIG. 29

Source Table: Customers with Contracts

| PRIMARY_KEY | Customer_ID | Contract_ID |
|---|---|---|
| 100 | 1000001 | 2000001 |
| 101 | 1000002 | 2000002 |
| 102 | 1000003 | 2000003 |
| 103 | 1000004 | 2000004 |
| 104 | 1000005 | 2000005 |
| 105 | 1000006 | 2000006 |
| 106 | 1000007 | 2000007 |
| 107 | 1000008 | 2000008 |
| 108 | 1000009 | 2000009 |
| 109 | 1000010 | 2000010 |

FIG. 30

Source Table: Late Payments

| Late_Payment_ID | Customer_ID | Late_Payment_Date |
|---|---|---|
| 3000001 | 1000001 | 5/16/2008 |
| 3000002 | 1000001 | 5/17/2008 |
| 3000003 | 1000001 | 5/26/2008 |
| 3000004 | 1000002 | 6/6/2008 |
| 3000005 | 1000002 | 6/10/2008 |
| 3000006 | 1000004 | 2/9/2008 |
| 3000007 | 1000004 | 5/15/2008 |
| 3000008 | 1000005 | 6/2/2008 |
| 3000009 | 1000007 | 3/17/2008 |

FIG. 31

Source Table: Cancellations

| Cancellation_ID | Contract_ID | Cancel_Date |
|---|---|---|
| 4000001 | 2000001 | 6/25/2008 |
| 4000002 | 2000004 | 5/31/2008 |

FIG. 32

Aggregate Table: Customer_Dimension

| Customer_Key | Customer_ID | Customer_Name | Income | Marital_Status | Record Active | Record Start Date | Record End Date |
|---|---|---|---|---|---|---|---|
| 1 | 1000001 | Mike Smith | $19,000.00 | Married | Yes | 10/1/2008 | 1/1/2025 |
| 2 | 1000002 | Jane Doe | $22,000.00 | Single | Yes | 10/1/2008 | 1/1/2025 |
| 3 | 1000003 | Susan Jones | $36,000.00 | Married | Yes | 10/1/2008 | 1/1/2025 |
| 4 | 1000004 | Jack Johnson | $58,000.00 | Single | Yes | 10/1/2008 | 1/1/2025 |
| 5 | 1000005 | Adam Miller | $72,000.00 | Married | Yes | 10/1/2008 | 1/1/2025 |
| 6 | 1000006 | Peter Jackson | $68,000.00 | Single | Yes | 10/1/2008 | 1/1/2025 |
| 7 | 1000007 | Mary Black | $94,000.00 | Married | Yes | 10/1/2008 | 1/1/2025 |
| 8 | 1000008 | Sarah Davis | $44,000.00 | Single | Yes | 10/1/2008 | 1/1/2025 |
| 9 | 1000009 | Cindy Carter | $51,000.00 | Married | Yes | 10/1/2008 | 1/1/2025 |
| 10 | 1000010 | Ben Tailor | $77,000.00 | Single | Yes | 10/1/2008 | 1/1/2025 |

FIG. 33

Aggregate Table: Contracts_Dimension

| Contract_Key | Contract_ID | Contract_Type | Fee Type | Fee Per Period | Contract Start | Contract | Record Active | Record Start Date | Record End Date |
|---|---|---|---|---|---|---|---|---|---|
| 101 | 2000001 | CTA | Annual | $99.99 | 1/14/2008 | 1/13/2009 | Yes | 10/1/2008 | 1/1/2025 |
| 102 | 2000002 | CTB | Monthly | $12.99 | 3/20/2008 | 3/20/2009 | Yes | 10/1/2008 | 1/1/2025 |
| 103 | 2000003 | CTA | Annual | $99.99 | 5/19/2008 | 5/19/2009 | Yes | 10/1/2008 | 1/1/2025 |
| 104 | 2000004 | CTB | Monthly | $12.99 | 2/2/2008 | 2/1/2009 | Yes | 10/1/2008 | 1/1/2025 |
| 105 | 2000005 | CTA | Annual | $99.99 | 6/1/2008 | 6/1/2009 | Yes | 10/1/2008 | 1/1/2025 |
| 106 | 2000006 | CTB | Monthly | $12.99 | 3/29/2008 | 3/29/2009 | Yes | 10/1/2008 | 1/1/2025 |
| 107 | 2000007 | CTA | Annual | $99.99 | 3/7/2008 | 3/7/2009 | Yes | 10/1/2008 | 1/1/2025 |
| 108 | 2000008 | CTB | Monthly | $12.99 | 4/11/2008 | 4/11/2009 | Yes | 10/1/2008 | 1/1/2025 |
| 109 | 2000009 | CTA | Annual | $99.99 | 8/2/2008 | 8/2/2009 | Yes | 10/1/2008 | 1/1/2025 |
| 110 | 2000010 | CTB | Monthly | $12.99 | 2/14/2008 | 2/13/2009 | Yes | 10/1/2008 | 1/1/2025 |

FIG. 34

Fact Table: LatePayments_Fact

| LatePayment_ID | Customer Key | Contract | Late_Payment_Date |
|---|---|---|---|
| 3000001 | 1 | 101 | 5/16/2008 |
| 3000002 | 1 | 101 | 5/17/2008 |
| 3000003 | 1 | 101 | 5/26/2008 |
| 3000004 | 2 | 102 | 6/6/2008 |
| 3000005 | 2 | 102 | 6/10/2008 |
| 3000006 | 4 | 104 | 2/9/2008 |
| 3000007 | 4 | 104 | 5/15/2008 |
| 3000008 | 5 | 105 | 6/2/2008 |
| 3000009 | 7 | 107 | 3/17/2008 |

FIG. 35

Fact Table: Cancellations_Fact

| Cancellation_ID | Customer Key | Contract_Key | Cancel_Date |
|---|---|---|---|
| 4000001 | 1 | 101 | 6/25/2008 |
| 4000002 | 4 | 104 | 5/31/2008 |

FIG. 36

Aggregate Table: Customer_Dimension
(Source data changes preserved)

| Customer_Key | Customer_ID | Customer_Name | Income | Marital_Status | Record Active | Record Start Date | Record End Date |
|---|---|---|---|---|---|---|---|
| 1 | 1000001 | Mike Smith | $19,000.00 | Married | No | 10/1/2008 | 10/8/2025 |
| 2 | 1000002 | Jane Doe | $22,000.00 | Single | Yes | 10/1/2008 | 1/1/2025 |
| 3 | 1000003 | Susan Jones | $36,000.00 | Married | Yes | 10/1/2008 | 1/1/2025 |
| 4 | 1000004 | Jack Johnson | $58,000.00 | Single | Yes | 10/1/2008 | 1/1/2025 |
| 5 | 1000005 | Adam Miller | $72,000.00 | Married | Yes | 10/1/2008 | 1/1/2025 |
| 6 | 1000006 | Peter Jackson | $68,000.00 | Single | Yes | 10/1/2008 | 1/1/2025 |
| 7 | 1000007 | Mary Black | $94,000.00 | Married | Yes | 10/1/2008 | 1/1/2025 |
| 8 | 1000008 | Sarah Davis | $44,000.00 | Single | Yes | 10/1/2008 | 1/1/2025 |
| 9 | 1000009 | Cindy Carter | $51,000.00 | Married | Yes | 10/1/2008 | 1/1/2025 |
| 10 | 1000010 | Ben Tailor | $77,000.00 | Single | Yes | 10/1/2008 | 1/1/2025 |
| 11 | 1000011 | Will Thomson | $99,100.00 | Married | Yes | 10/9/2008 | 1/1/2025 |
| 12 | 1000001 | Mike Smith | $29,000.00 | Married | Yes | 10/9/2008 | 1/1/2025 |

FIG. 37

Fact Table: Cancellations_Fact
(Additional cancellations from source system are captured)

| Cancellation_ID | Customer Key | Contract_Key | Cancel_Date |
|---|---|---|---|
| 4000001 | 1 | 101 | 6/25/2008 |
| 4000002 | 4 | 104 | 5/31/2008 |
| 4000003 | 12 | 101 | 10/15/2008 |

FIG. 38

Observations Table: Churn Prediction Observations

| Observation Id | Customer_ID | Customer_Name | Income | Marital_Status | Contract_Key | Contract_Type | Fee Type | Fee Per Period | Number Late Payments | Recent Late Payment Date | Will Cancel |
|---|---|---|---|---|---|---|---|---|---|---|---|
| 10001 | 1000001 | Mike Smith | $19,000.00 | Married | 101 | CTA | Annual | $99.99 | 3 | 5/26/2008 | 1 |
| 10002 | 1000002 | Jane Doe | $22,000.00 | Single | 102 | CTB | Monthly | $12.99 | 2 | 6/10/2008 | 0 |
| 10003 | 1000003 | Susan Jones | $36,000.00 | Married | 103 | CTA | Annual | $99.99 | 0 | | 0 |
| 10004 | 1000004 | Jack Johnson | $58,000.00 | Single | 104 | CTB | Monthly | $12.99 | 2 | 5/15/2008 | 0 |
| 10005 | 1000005 | Adam Miller | $72,000.00 | Married | 105 | CTA | Annual | $99.99 | 1 | 6/2/2008 | 0 |
| 10006 | 1000006 | Peter Jackson | $68,000.00 | Single | 106 | CTB | Monthly | $12.99 | 0 | | 0 |
| 10007 | 1000007 | Mary Black | $94,000.00 | Married | 107 | CTA | Annual | $99.99 | 1 | 3/17/2008 | 0 |
| 10008 | 1000008 | Sarah Davis | $44,000.00 | Single | 108 | CTB | Monthly | $12.99 | 0 | | 0 |
| 10009 | 1000009 | Cindy Carter | $51,000.00 | Married | 109 | CTA | Annual | $99.99 | 0 | | 0 |
| 10010 | 1000010 | Ben Tailor | $77,000.00 | Single | 110 | CTB | Monthly | $12.99 | 0 | | 0 |
| 10011 | 1000001 | Mike Smith | $29,000.00 | Married | 101 | CTA | Annual | $99.99 | 3 | 5/26/2008 | 0 |

FIG. 39

Analytic Results Table: Churn Prediction
(Results created 10/1/2008)

| Analysis Date | Customer_Id | Customer_Name | Churn Risk |
|---|---|---|---|
| 10/1/2008 | 1000001 | Mike Smith | 0 |
| 10/1/2008 | 1000002 | Jane Doe | 0 |
| 10/1/2008 | 1000003 | Susan Jones | 0 |
| 10/1/2008 | 1000004 | Jack Johnson | 0 |
| 10/1/2008 | 1000005 | Adam Miller | 0 |
| 10/1/2008 | 1000006 | Peter Jackson | 0 |
| 10/1/2008 | 1000007 | Mary Black | 0 |
| 10/1/2008 | 1000008 | Sarah Davis | 0 |
| 10/1/2008 | 1000009 | Cindy Carter | 0 |
| 10/1/2008 | 1000010 | Ben Tailor | 0 |

FIG. 40

Analytic Results Table: Churn Prediction
(Results created 10/9/2008)

| Analysis Date | Customer_I | Customer_Name | Churn Risk |
|---|---|---|---|
| 10/9/2008 | 1000001 | Mike Smith | 0.2 |
| 10/9/2008 | 1000002 | Jane Doe | 0 |
| 10/9/2008 | 1000003 | Susan Jones | 0 |
| 10/9/2008 | 1000004 | Jack Johnson | 0 |
| 10/9/2008 | 1000005 | Adam Miller | 0 |
| 10/9/2008 | 1000006 | Peter Jackson | 0 |
| 10/9/2008 | 1000007 | Mary Black | 0 |
| 10/9/2008 | 1000008 | Sarah Davis | 0 |
| 10/9/2008 | 1000009 | Cindy Carter | 0 |
| 10/9/2008 | 1000010 | Ben Tailor | 0 |

FIG. 41

PLATFORM INDEPENDENT PLUG-IN METHODS AND SYSTEMS FOR DATA MINING AND ANALYTICS

CROSS-REFERENCES TO RELATED APPLICATIONS

This application claims the benefit of provisional Application No. 61/015,168, filed Dec. 19, 2007. The entirety of the foregoing provisional application is incorporated by reference herein.

BACKGROUND OF THE INVENTION

1. Field of the Invention

The present invention relates to simple and complex data analytics and simple and complex machine learning or data mining, including methods, systems, and processes for enabling non-expert users to use and apply complex analytics to a particular task or query and to use and benefit from the results generated through the use of analytics. This invention and its various embodiments provide data mining and analytics solutions, including but not limited to predictive analytics, clustering, text mining, collaborative filtering, operations research methods, heuristics, and other similar analytic solutions. This invention and its various embodiments also provide data management solutions, such as data fusion, integration, transformation, de-normalization, historical preservation, preparation, derivation of statistical metrics, and other data management solutions. While the description of the invention often refers to use of predictive models to illustrate functionality of the invention, it will be appreciated that similar analytic techniques, such as the ones mentioned above, can be supported by this invention as well.

2. Description of Related Art

Analytics is a technology that has recently gained much attention in order to solve highly complex problems. Analytics basically encompasses the determination of large-scale data correlations. For example, in a business setting, a typical data analytics system processes many millions of records very quickly for thousands of different products and for thousands of different customers. While a human expert may be able to learn about a limited number of products and a limited number of different customers, no human expert would be able to understand patterns across the whole breadth of a multi-billion, multi-national enterprise. Further, human experts can sometimes have biases due to personal experiences, while analytics eliminates human biases in producing solutions and results.

The application of analytics to a business task or query involves collecting data about the problem; storing, managing, integrating, and preparing such data; and applying mathematical, quantitative and statistical analysis, and predictive modeling. As a result of applying analytics, organizations can better understand business needs and issues, discover causes and opportunities, predict risk levels and events, take steps to prevent risks and events, and perform other similar activities that are beneficial to the organization. It should be appreciated that analytics are used not only in the commercial for-profit sector but also in government, the non-profit sector, and by individuals to evaluate and solve many different types of problems or queries.

Examples of applications of analytics technology include the selection by a web browser of web pages and ad results in response to user queries, identification of tax returns with a high risk of fraud or inaccuracies, and selection of communications for further screening for terrorist threats. Further examples include categorization of retail customers to tailor offers and customer care to maximize customer loyalty and profit, prediction of equipment outages by computer manufacturers or data center operators, prediction of response and purchase propensities for marketing, and many other diverse applications.

Currently in the art, the use of analytics requires two general steps: data management and data mining. The data management phase requires the user to identify data that may be located in various disparate source systems within their organization. A typical complex case involves a large enterprise that may have a large number of source systems that are not integrated, but each of these source systems may separately provide different pieces of information that the customer would like to analyze. Typically, experts in data management spend a large amount of time and effort to build customized software to implement connections to these disparate systems, extract the information or data, and then integrate the data. Furthermore, such customized software development typically requires a large amount of interaction between the data management experts and the technical experts familiar with the various source systems. Once the data is integrated, the source or raw data typically requires further augmentation or manipulation to prepare the data for use by the data mining operations. Such work is typically very resource intensive in terms of time and financial cost.

At the data mining phase, typically a new set of experts who are skilled in mathematical analysis algorithms, such as neural networks, decision trees, nonlinear regressions, etc. perform data mining on the prepared data. Data mining experts typically create or use custom applications written in programming languages such as Java, C++, Python, or R, or data mining workbenches or use graphical user interface-based (GUI-based) tools, such as those provided by a development workbench tool like WEKA, SAS, and SPSS CLEMENTINE, to read, analyze, transform, and derive data from one or more data tables and to develop models. Data mining experts then set up experiments to evaluate the effectiveness of such models; however, this requires a data mining expert to configure the data mining tool manually. Further, the data mining expert must evaluate and compare models to select a satisfactory model to deploy. In some cases, a data mining expert may select various models that work together in concert, which the expert must also configure manually. Accordingly, the data mining phase is also very labor and cost-intensive.

In some cases, even after results become available in the data mining phase, a return to the data management phase may be required. For example, if a data mining expert decides to look at additional data that was not previously analyzed by the data mining phase, the data-mining experts must interface with data management experts who, in turn, must update the data integration and preparation process to prepare a new set of data for use by the data-mining experts.

Further, data management experts may use different applications from the applications and workbenches used by data mining experts. For example, a typical workbench for data management experts may include ETL (i.e., extract, transform, and load) tools and data warehousing tools, such as INFORMATICA and AB INITIO to build the data management capabilities, whereas data mining experts may use tools noted above such as WEKA, CLEMENTINE, SAS, STATISTICA, etc.

It would be an advantage in the art to eliminate these expensive expert interfaces and workbenches and to bypass such interfaces and workbenches and to provide a tool that seamlessly integrates data management and data mining. In other words, it would be advantageous to be able to take a user's data and generate inputs for data mining that can be used regardless of the format of the original data and that can be passed to any data mining algorithm or model without the expense of data management and data mining experts customizing the connection between the data and the data mining algorithms and models. That is, it would be beneficial to integrate the two complex steps of data management and data mining into a single product so that users would not need expensive data management or data mining experts, thereby saving time and costs.

It would also be an advantage in the art to provide a product that operates with standard platforms that users may use for data management and data mining and that can be easily installed and operated by non-data management and/or non-data mining experts. For such standard platform implementations, it would be an advantage to provide solutions in a fully automated fashion and to be able to develop a data mining model, execute that model and interpret the results from start to finish without requiring the intervention of an expert. If would be a further advantage to provide a product that easily adapts to custom installation and custom solutions with minimal user intervention.

For users with existing data management and data mining interfaces and workbenches, it would be beneficial to have a tool that automatically feeds improved information or data to such interfaces and workbenches. In other words, it would be beneficial for users, at their option, to reduce, continue, or expand their existing data management and data mining activities using a tool that interfaces with such existing activities and that flexibly supports users with various needs. For example, a user could perform data management and create new data inputs that could be used to build better data mining models. Similarly, a user could perform data mining and create new models that provide predictions that could be used as new inputs to build even better data mining models.

Since the current state of the art requires extensive analysis, design, implementation, testing, and deployment work that is performed by human experts, there is a high risk of introducing defects or "bugs" into the process of developing an analytic capability. It would be an advantage to automate much or all of the process by providing an analytic capability such that the risk of defects is greatly reduced, which is a significant value to potential users.

In addition to providing automated data analytic solutions for standard and/or custom platforms, it would be a further advantage to be able to improve analytic models over time. That is, data mining could be applied to the data-mining models to improve the analytic models without a user being required to be an expert in applying complex data management or data mining techniques (such as meta data management, data quality management, data warehousing, genetic algorithms, neural networks, etc.) to be able to optimize the analytic models.

BRIEF SUMMARY OF THE INVENTION

The invention comprises methods, system, and apparatuses for generating and delivering analytic results for any simple or highly complex problem for which data exists that software or similar automated means can analyze. One embodiment of the invention is a software program operating on a computer.

Current analytics technologies require significant effort in two major domains: the management of data in the broadest sense, including aspects such as data acquisition, data preparation, and many related aspects; and data mining, including statistical analysis, the selection of modeling algorithms, model input selection, model training/optimization, and many other related aspects of machine learning. Frequently, users and organizations find the use of analytics challenging, because rare, sophisticated, and expensive skills are required in the two distinct fields of data management and data mining. Accordingly, organizations must staff a separate data management team and a separate data mining team, making it very expensive to apply analytics. Larger organizations that have both skills available in-house may find the adoption of analytics somewhat easier while smaller organizations are facing more challenges. Further, the outsourcing of these skills is both expensive and risky because of the advanced nature of the technology.

Users of data mining technology require accurate data mining results because inaccurate results may lead to taking actions that could prove harmful. For example, if a data-mining model inaccurately predicts churn risk, the user might needlessly offer costly incentives to retain customers with low churn risk or fail to offer such incentives where needed. Users would also benefit from data mining capabilities that integrate into a closed-loop process, where the steps of data collection, data management, data mining, and acting on data mining results occur quickly and in a repeatable fashion. The reason for this need is that without expeditious, repeatable, closed-loop integration, the risk of errors and costly rework increases. For example, if users prepare and mine customer churn-related data in such a way that significant delays occur between preparing and mining, or so that data preparation is not repeatable, errors in the preparation process may prove difficult to detect, or they may go unnoticed, so that mining results are inaccurate and can lead to harmful actions. One of the benefits of the invention is the integration of data management and data mining together in a single system. The present invention allows non-experts to apply analytics by making user inputs easily accessible and understandable, by automatically performing business translations, and by automatically performing predictive analysis in the specified business context. The invention significantly lowers barriers to adopting analytics as a part of everyday business processes by making analytics more automated, by reducing the cycle time of the analytic process, and by delivering high-quality, repeatable results that are less subject to human error. The invention also provides a high degree of automation that reduces the time and resources required to perform highly complex data mining tasks, while providing the automatic optimization of predictive models. Thus, the invention brings about a high degree of accuracy and a closed-loop business process having tight integration with existing business processes—all of which are easily realized because the invention can be easily installed, configured, implemented, and maintained by a user or service provider.

The invention can support many standard or common business tasks, thereby minimizing the need for human expert effort for customization, tuning, and optimizing. The present invention automates data analytic processes by integrating with some or all of the data models, data interfaces, workflow, and user interfaces of standard systems and interprets the data the same way across different implementations of these standardized systems. All this complexity is essentially transparent to the user.

The invention also supports specialized business tasks by defining the problem in an easy-to-use configuration process. Once a new business task is defined, this business task definition can be used by the same or other organizations with no or minimal adjustments.

The results that the invention delivers can feed directly into down-stream business processes and systems. Therefore, organizations that do not have or have limited data management and data mining capabilities can use this invention to take advantage of analytics technology and apply analytics to everyday business processes. In addition, organizations that have the ability to perform data management and data mining can use this invention to augment their data management and data mining capabilities. For example, users can utilize the data prepared by this invention, they can prepare it further for other purposes, and they can use outputs from predictive models provided by this invention as inputs into other predictive models. Further, the data resulting from existing or new data management and data mining activities can serve as inputs to this invention, which facilitates a closed-loop virtuous cycle and business process.

Finally, the present invention performs machine learning in an automated fashion. This automates model evaluation to measure the quality of the predictive model quantitatively, and the invention can select models with the highest quality for execution during run time. The present invention includes a repository of numerous predictive models that the invention evaluates to find the best one for each task. In addition, functionality in this system evolves new models in an intelligent fashion, using, for example, genetic algorithms, to attempt to find models that are of higher quality than the ones that already exist.

The present invention thus contemplates methods, systems, apparatuses, software, software processes, computer-readable medium, and/or data structures to enable performance of these and other features. These and other objects and features of the present invention will become more fully apparent from the following description, drawings, and claims, or may be learned by the practice of the invention as set forth hereinafter.

BRIEF DESCRIPTION OF THE DRAWINGS

FIG. 8 shows the attributes of a sample catalog of translated business task;

FIG. 8C illustrates a sample control job list;

FIG. 10 illustrates an example source and target table list comprising data acquisition metadata;

FIG. 12 illustrates an example source and target table list comprising data aggregation metadata;

FIG. 14 illustrates an example observations table list comprising observations metadata;

FIG. 23 illustrates example business solution data according to one embodiment of the invention;

FIG. 24 illustrates example business solution data according to one embodiment of the invention;

FIG. 26 is a screen shot that shows how QUICKBOOKS tracks information for monitoring business performance, including the tracking of which customers owe money and when and how often they pay invoices late;

FIGS. 26A through 26I illustrate example metadata;

FIG. 27 illustrates an example source table;

FIG. 28 illustrates an example source table;

FIG. 29 illustrates an example source table;

FIG. 30 illustrates an example source table;

FIG. 31 illustrates an example source table;

FIG. 32 illustrates an example source table;

FIG. 33 illustrates a table showing the format of the data stored in the data repository in one embodiment;

FIG. 34 illustrates a table showing the format of the data stored in the data repository in one embodiment;

FIG. 35 illustrates a table showing the format of the data stored in the data repository in one embodiment;

FIG. 36 illustrates a table showing the format of the data stored in the data repository in one embodiment;

FIG. 37 illustrates a table showing the format of the data stored in the data repository in one embodiment;

FIG. 38 illustrates a table showing the format of the data stored in the data repository in one embodiment FIG. 39 illustrates an example observations table;

FIG. 40 illustrates one example of results from operation of one embodiment of the invention; and FIG. 41 illustrates one example of results from operation of one embodiment of the invention.

DETAILED DESCRIPTION OF THE EMBODIMENTS

Figure 1:
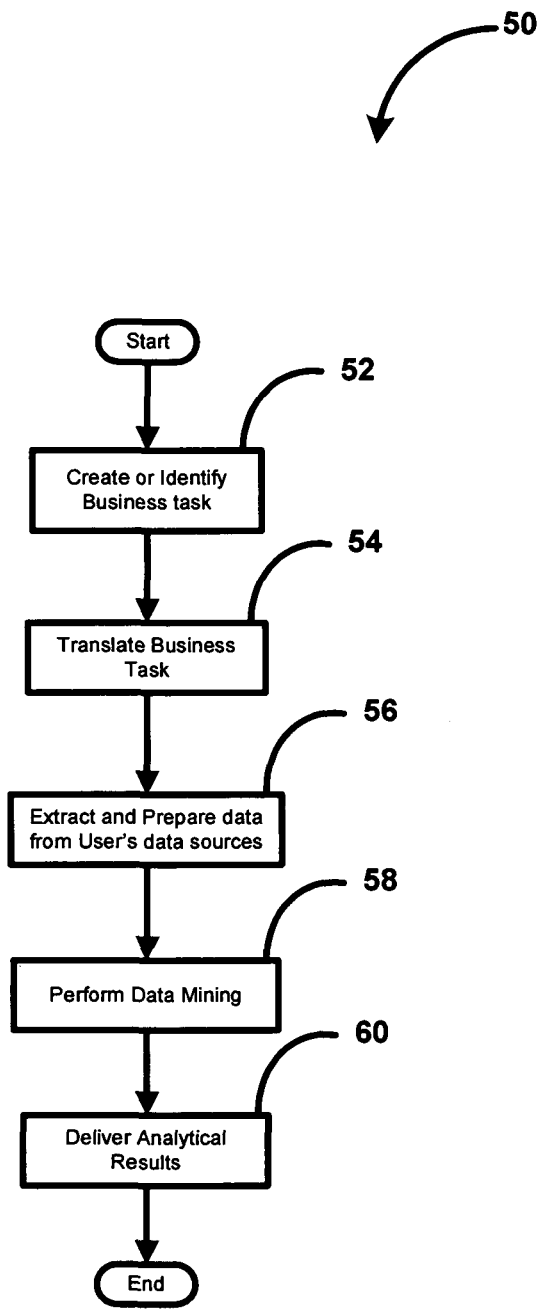
FIG. 1 is a flowchart illustrating the overall process performed by one embodiment of the invention.

"Analytics" generally refers to the analysis of data and, as described above, encompasses large-scale data correlations. For example, a business may make a decision about its operations based on analytics or an analysis of its existing operational data. Business managers may choose to make decisions based on experiences or rules of thumb, but analytics involves the use of data in the decision making process. Although business data may be studied using statistical analysis in order to discover and understand historical patterns to provide predictions about future business performance, the use of analytics is not limited to statistical analysis. Analytics also includes the use of data to develop predictive models that may involve computations that are much more complex and extensive than standard statistical analysis. Some fields within the area of analytics are enterprise decision management, marketing analytics, predictive science, strategy science, credit risk analysis and fraud analytics.

The present invention and its various embodiments relate to methods and systems for performing sophisticated analytics or data mining on data, while at the same time maintaining simple user interfaces that do not require extensive knowledge of data analytics by the user. In particular, the methods and systems of the present invention provide a user with the ability to define a question, such as a question about some aspect of a user's business, and to perform data mining using that user's data to generate a solution to the question. Even more specifically, the methods and systems of the present invention provide the ability to interface with any data source or sources provided by the user; to extract data from those data sources and to prepare it for use by any data mining function, including any data mining algorithm; to use appropriate data mining techniques to build models in response to the user's question; to automatically select an optimal model that provides a response to the user's question; and to provide such response to the user.

In one embodiment, these methods and systems can be provided as a software program that provides data management functions and data mining functions. The data management functions include the ability to interface with and extract data from any database that a user may have and to prepare such data for data mining. The data mining functions include the ability to build various models from various data mining algorithms based upon the data prepared by the data management functions and to automatically select the optimal model or a predictive model that provides useful results to the user. In other words, users of the invention can exercise the data management functions and data mining functions to develop predictive models based upon an analysis of their existing data that can be used to assist in making decisions.

Some of the various embodiments of the invention are described below in conjunction with the Figures; however, this description should not be viewed as limiting the scope of the present invention. Rather, it should be considered exemplary of various embodiments that fall within the scope of the present invention as defined by the claims. For example, the following describes the invention generally as a software program; however, other embodiments of the invention are possible. Further, it should be appreciated that references to "the invention" or "the present invention" should not be construed as meaning that the description herein is directed to only one embodiment or that every embodiment must contain a given feature described in connection with the use of such phrases. In fact, the term "invention" in some instances refers to the embodiment of a software program; however, such should not be construed as meaning that the software program must contain all of the various features of the invention described below. In fact, various embodiments with common and differing features are described herein. It should also be appreciated that while headings may be used below, such are not to be construed as limiting the discussion following such heading to the topic described by the heading. Moreover, information regarding certain aspects and embodiments of the invention may be described under different headings. Further, references are made to various books, articles, and other sources of information are incorporated by reference herein in their entirety.

As used herein, the term "data mining" generally covers applying statistical processes to large amounts of data as well as to small amounts of data. "Machine learning" is a more specific form of data mining that relates to pattern analysis and optimization and is also contemplated as a feature of the present invention. Although there are differences between the terms "data mining," "machine learning," "mathematical modeling," "analytics," "predictive analytics," and other similar terms, all of these terms can be interpreted as interchangeable for the purpose of this description.

As used herein, the terms "analytic business task," or "business task," are used to refer to any problem or question or query that can be addressed through the use of analytics. One example of a business task is a problem or question that a user desires to be answered based on the user's existing business processes and data, such as which customers are likely to buy a particular product or which customers are likely to default on their outstanding invoices. Other examples of business tasks associated with retail business include predicting quantities or volumes of specific products sold over a given time period, predicting which items sell well together, or predicting which specific items a particular customer might want to buy in a future time period. Other examples of business tasks include fraud detection, escalation prediction in CRM implementations, and the like.

Although the terms "business" and "business tasks" are used herein, such does not imply that the invention only handles business-related tasks. Rather, the proper, broad interpretation of the term "business task" is to include questions or tasks requested or desired to be solved not only by for-profit companies but also by individuals, non-profit organizations, government organizations, and other non-business entities about any aspect of their business, organization or operations. Accordingly, these terms are used in an exemplary manner, since the invention is applicable to other tasks and is not limited to tasks related to business. It should be appreciated that the invention can be used as a data preparation interface between a source system and a data mining workbench. The source system can be an operational database such as the database of a Point-Of-Sale (POS) system or a data warehouse storing historic data. In this case, the business task will be the "data preparation" of source data into observations for data mining using the work bench.

Accordingly, the methods and systems of the present invention allow a user to define a business task and to use data management and data mining functions to develop a predictive model that provides output, results, or solutions to the user in response to the original question or business task. Accordingly, the methods and systems of the present invention provide solutions to a business task that addresses a business need, for example, where information about current or past situations, potentially together with additional data, can help to predict likely future results or behavior. In addition to the examples noted above, common business tasks related to a customer support call center may include predicting which customers may cancel their subscription to a service and predicting which products, options, or services a customer may be interested in purchasing. These business tasks are known in the art as "churn analysis" and "up and cross selling," respectively. An example of a business task in an insurance environment is to predict the risk that a given claim is fraudulent, which is known in the art as "fraud detection." In each of these examples, the question requires a prediction about future customer behavior. The methods and systems of the present invention can provide such predictions by developing a predictive model based upon a user's existing data.

Although there may be an unlimited number of business tasks that could be defined, some business tasks may be similar for many users. Therefore, in some embodiments, the present invention includes pre-configured or predefined business tasks that are applicable to similar industries that a user can select to be solved. Alternatively, in some embodiments, the present invention allows a user to develop a customized business task to be solved.

Similarly, the methods and systems of the present invention can be implemented in conjunction with any platform that a user may be using or desire to use. In some cases, a user may have a standard platform such as commercially available programs that collect and store certain types of data, such as financial accounting programs, customer and product tracking programs, and the like. In other cases, a user may have a non-standard platform. In either case, the methods and systems of the present invention can be configured to operate or integrate with such platforms. Accordingly, it should be appreciated that the methods and systems of the present invention can be integrated with any database format utilized by any platform.

FIG. 1 is a flowchart illustrating the overall process performed by one embodiment of the invention. The process 50 is an overview of the processes performed by the methods and systems of the invention. In a first step 52, a given business task is identified by the user. As noted, this is basically the identification of a question or query for which the user would like to use data mining techniques to provide a solution, in particular, a predictive model that will allows the user to predict future behavior based upon the user's existing data. In a next step 54, the business task is translated into a machine-executable task. In other words, the business task as identified by the user is basically converted into information that the invention can use in further processing the business task. Based on the translation of the specific business task selected, in a next step 56, a data management component of the invention is used to extract relevant data from the user's existing data or source systems within the user's platform and prepare that data for use by a data mining component. In a next step 58, the data mining component executes various algorithms selected from a group of existing algorithms known in the art for analyzing various aspects of data. The choice of which algorithms to use is dependent upon the specific question asked by the business task.

Once the appropriate algorithms are selected, the methods and systems of the present invention build numerous models based upon those algorithms, each of which could provide a solution to the business task. It should be appreciated that multiple models may be constructed from a single algorithm by using different data inputs and by altering the parameters for that algorithm. The selection of data inputs and parameters to be used in building each model can be done using known techniques for fine tuning algorithms. Ultimately, a single model is selected as the model that best provides a solution for the business task and that model is deployed and made available to the user. In a next step 60, the analytic results generated by applying that model are displayed to the user.

It should be appreciated that the methods and systems of the present invention optimize the process of identifying the best model by automatically building multiple models from the selected algorithms. As each model is built it is compared to a previous model to determine which model best addresses the business task based upon the user's data. In this manner the best model is ultimately selected and used to provide the user with results or a response to the business task. In other words, the methods and systems of the present invention perform machine learning by measuring the quality of the predictive model quantitatively, which allows for selection of the model with the highest quality for execution during run time for a given business task. For example, if the business task is to determine churn analysis or up and cross selling, the methods and systems of the invention will develop an optimized model based upon the user's data and evaluation of numerous models built from various algorithms that can be used to predict churn or cross-selling opportunities. The results from this model are then presented to the user in various forms, including graphic displays, through a user interface.

As noted above and as described further below, in one embodiment the methods and systems of the present invention can be implemented as a software program that is operated using a programmed computer and its processor and memory. In some embodiments, the invention can be implemented as a software program on a computer within a computer network or a distributed computer network or on a website accessible through the Internet as a web service. In other embodiments, the invention can be implemented as a plug-in component to another software program that itself may reside on a computer, a distributed computer network, or on a website.

Since the methods and systems of the present invention can address a wide range of business tasks and provide predictive models in response. Accordingly, the invention is useful in a wide range of fields and businesses and for a wide range of users. As noted above, the methods and systems of the present invention have application for providing analytic solutions in almost any field of interest and for almost any type of business. Therefore, users may include business owners, system owners, customer service representatives, or anyone who desires to be able to access the capabilities of the predictive system. Users may also be administrators or developer-users who have higher levels of access to administrative capabilities of the predictive system and a higher level of expertise with respect to analytics. In those cases where the user is less sophisticated, that user may simply utilize the preconfigured or predefined business tasks. Other more sophisticated users may desire to exercise certain methods and systems of the invention that allow for the development of customized business tasks. Accordingly, users may range from those that have a lack of expert knowledge with regard to data management and/or data mining to those with some expertise in this field. Thus, the present invention aims to make the data management and analytic services easily accessible, understandable, and user-friendly for a large variety of users, importantly for those users lacking in data management and data mining expertise. Additional information regarding uses of the invention is described further below.

Figure 1A:
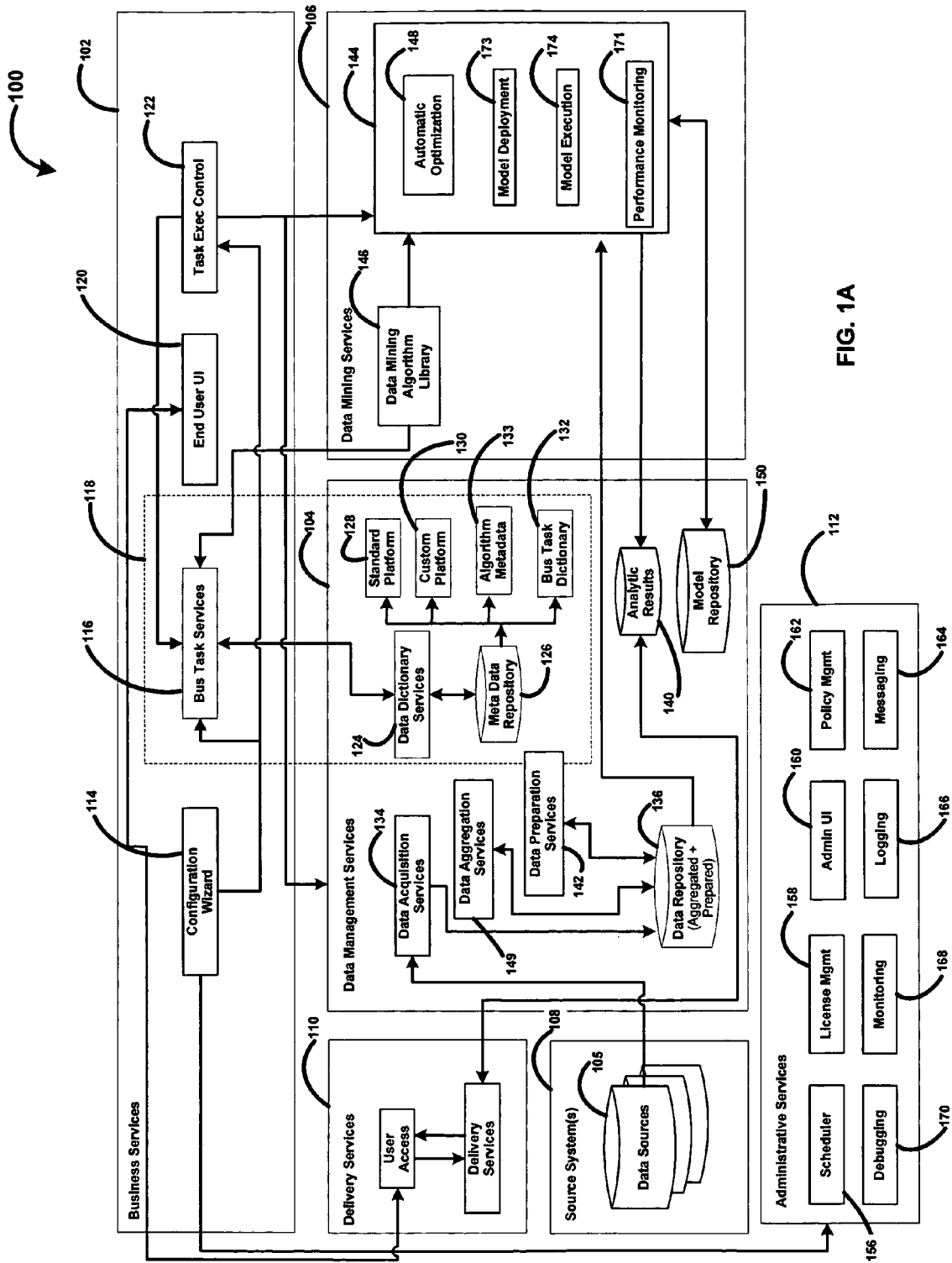
FIG. 1A illustrates exemplary software architecture for implementing embodiments of the present invention.

FIG. 1A illustrates exemplary software architecture for implementing certain embodiments of the present invention. With reference to FIG. 1A, software architecture 100 has various components or modules that are exemplary of various broad functionalities that can be programmed and executed, in some embodiments, as a software program, wherein the lines between components illustrate some of the data flows between components. It should be appreciated, however, that not all data flows or directions of data flow are shown. It should be appreciated that the following discussion, while provided in the context of a software program, should not be viewed as limiting the implementation of the program in another form or for any particular purpose. Further, it should be appreciated that the software architecture is exemplary, and the same functionalities may be provided using variations of this architecture.

It should also be appreciated that the various components and modules shown in FIG. 1A may be combined together. For example, while various data storage devices are shown, a single storage device with the appropriate storage capacity may be used. Also, it will be appreciated that the components can be combined together to operate on a single hardware device such as a computer comprising a single CPU and related memory components with access to various databases containing the user's data, or it may be operated in a distributed hardware or computer system in which different components run on different hardware devices each having access to the user's databases or other accessible data sources such as the Internet, Web Application Programming Interfaces (APIs), or commercially available data services. The software program may also be executed via a website through the Internet. As will be described further below, generally all of the components are able to communicate with each other to organize and schedule tasks using, for example, a system bus. However, it should be appreciated that whatever computer system is used, it must provide the necessary computational or processing power, since the methods and systems of the present invention may require the computation of a large number of calculations.

In some embodiments the invention comprises an "appliance," either a "hardware appliance" or a "software appliance." When configured as an appliance, the user "drops" the invention into an existing requirement, and the appliance requires no or minimal setup. When the invention is configured as a hardware appliance, a computer server, such as a blade-server, has all the required software pre-loaded, and the user can simply insert the server into a server rack. By inserting the appliance into a server rack, the appliance receives power, networking, and other needed resources. When the invention is configured as a software appliance the situation is analogous to the hardware appliance, except that the software is installed on existing hardware. However, it functions in the same manner as a hardware appliance.

As noted above, the methods and systems of the present invention can also be used with both standard and non-standard or customized platforms, such as commercially available programs that collect and store certain types of data, such as financial accounting programs, customer and product tracking programs, and the like. When used in connection with standard platforms, and where standard business tasks are preconfigured, the appliance proceeds to discover a user's data sources and then executes the functionality of the methods described herein without requiring further setup. For non-standard platforms and non-standard business tasks, the appliance can be configured during setup so that it treats the non-standard platform and/or non-standard business tasks just as it treats standard platforms and standard business tasks. Accordingly, it should be appreciated that the methods of the present invention can be adapted to operate with any platform.

The architecture 100 in FIG. 1A generally depicts six high-level components, including a business services component 102, a data management services component 104, a data mining services component 106, a source system component 108, a delivery services component 110, and an administrative services component 112. Each of these components is described in more detail below.

Business Services Component

The business services component 102 provides most of the interfaces with which a user can interact with the methods and systems of the present invention. The business services component 102 provides tools that allow a user to easily install the data management and analytic or data mining services portions of the present invention, or portion thereof, on a standard or custom platform, easily configure a business task to be analyzed or executed, and easily obtain results for one or more business tasks related to the user's business process. The business services component 102 comprises a configuration wizard 114, a business task services module 116, and end user interface 120, and a task execution control module 122. Each of these is described in more detail below.

The business services component 102 includes a configuration wizard 114 that performs multiple functions. The configuration wizard 114 provides a simplified user interface or GUI with orchestrated steps to install the invention within a user's system or platform and to configure the invention to that user's system or platform and specifications. For example, some users of the invention may have an existing platform or system in place into which they wish to integrate an embodiment of the invention. For example, the user may have an existing collection of hardware, software, and processes that accomplish a given task, such as a retail point of sale system, a manufacturing warranty management system, a CRM call center management system, or other system, such as a computer system utilizing a financial management or accounting program, such as QUICKBOOKS. In these cases, the user may wish to implement an embodiment of the invention that will perform data mining functions using existing data from these systems and display model results to the user. The configuration wizard 114 provides a user interface to install the program in a manner that integrates with those existing systems.

It should be appreciated that for standard platforms, such as B2C, banking, CMS, computer system management, CRM, ERP, financials, gaming, property management and hospitality, HR, marketing, POS, retail, RMS, supply chain management, travel systems, and web logs (website logs) from vendors such as APACHE, BMC, DIGITAL IMPACT, GALOR, GENESIS, INFOSYS, INTUIT, MICROSOFT, OMNITURE, ORACLE, PEGASUS, PEOPLESOFT, SALESFORCE.COM, SAP, and SIEBEL, the invention can be easily embedded into those platforms.

Figure 2:
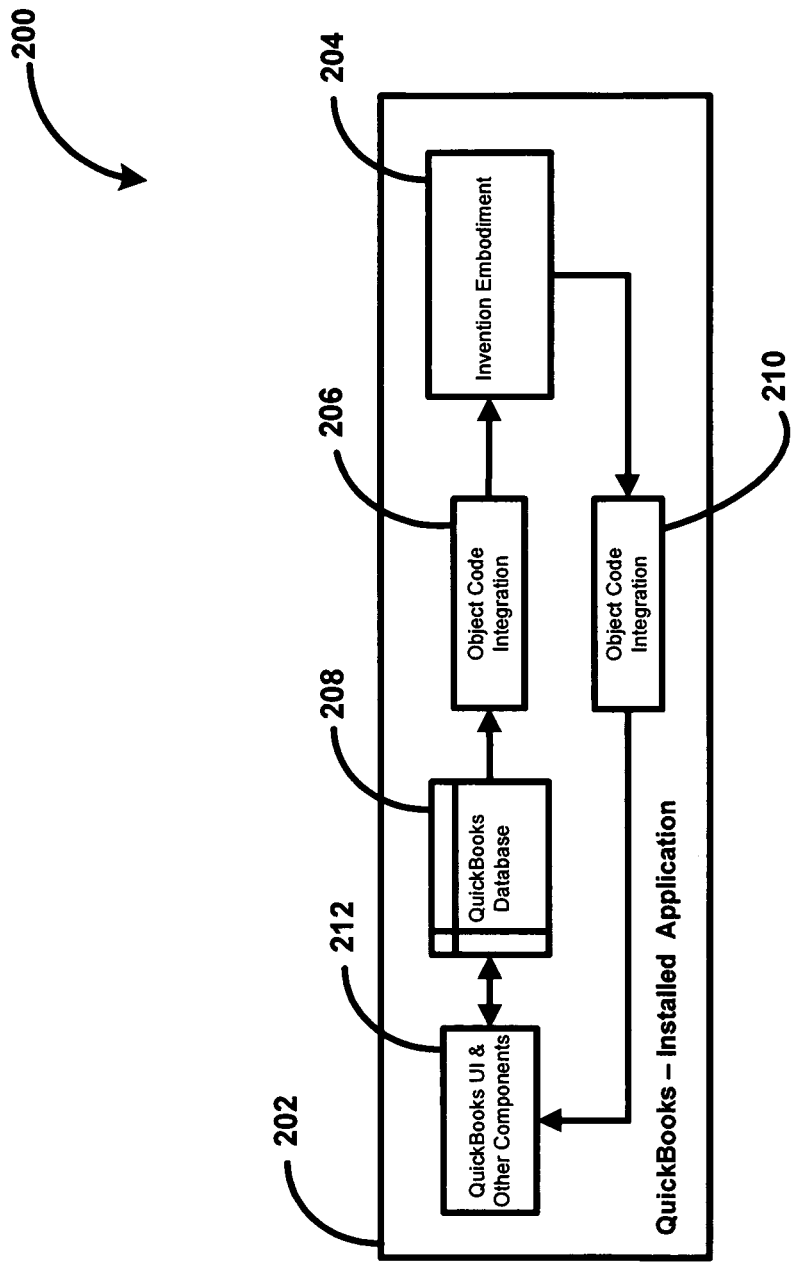
FIG. 2 illustrates the component architecture for integrating an embodiment of the invention into a given platform in one embodiment of the invention.

FIG. 2 illustrates the component architecture for integrating an embodiment of the invention into a given platform in one embodiment of the invention. In this architecture 200, QUICKBOOKS 202 is utilized as an example platform, and the invention 204 is integrated completely into that platform forming a single installed application. In this case, the object code 206 related to the databases 208 associated with or generated by QUICKBOOKS is integrated into the invention 204. Similarly, the object code 210 of the invention is integrated into the QUICKBOOKS user interface 212. Specifically, the respective portions of the object code 206, 210 of the platform and the invention are integrated by linking the interfaces of the invention and by modifying the source code of the QUICKBOOKS software.

Figure 2A:
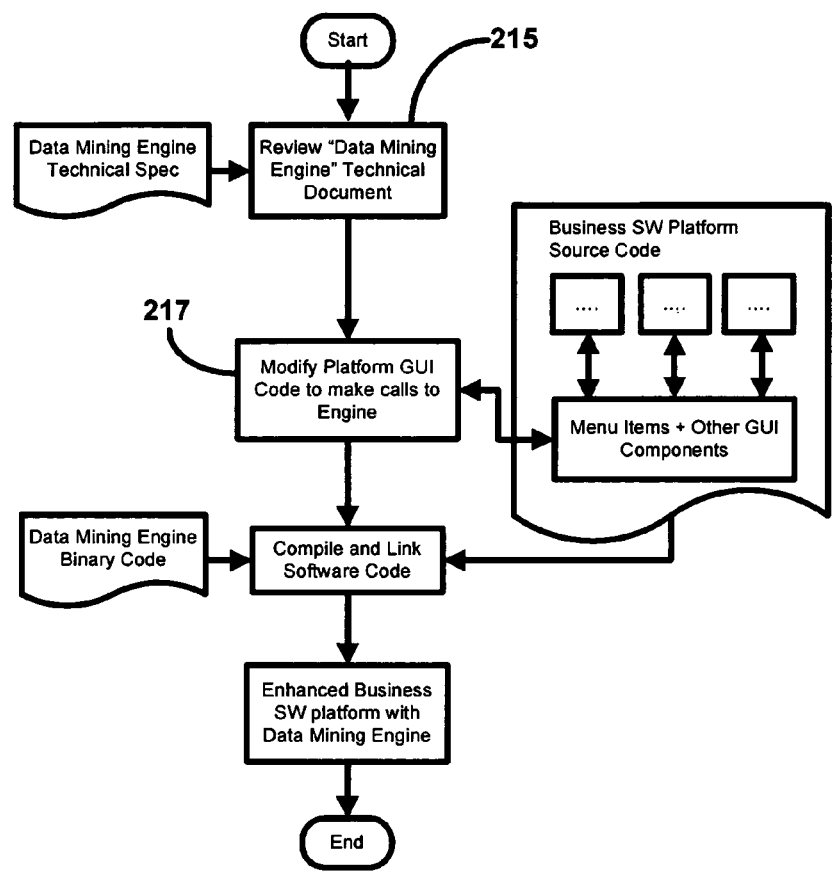
FIG. 2A is a flowchart illustrating the process for integrating an embodiment of the invention into a given platform in one embodiment of the invention.

FIG. 2A is a flowchart illustrating the process for integrating an embodiment of the invention into a given platform in one embodiment of the invention. In a first step 215, a developer-user would review the technical specifications for the program of the invention The technical specifications would include specifications for data management and data mining. Based upon that knowledge, in a next step 217, the developer-user would modify the business software platform's GUI code to make the necessary application program interface (API) calls to the interfaces of the modules in the program of the invention. In a next step, the developer-user would compile the source code of the business software platform along with the binary code of the program of the invention. As a result, new user interface components, such as clickable buttons, pull down menus, graphs, tables, and similar user interface elements, which provide access to the results provided by the invention, become available to the user of QUICKBOOKS directly from and inside of the QUICKBOOKS user interface. This compilation process links or embeds the binary code of the program of the invention within the business software platform, thereby providing the enhanced business software platform incorporating the program of the invention.

Figure 3:
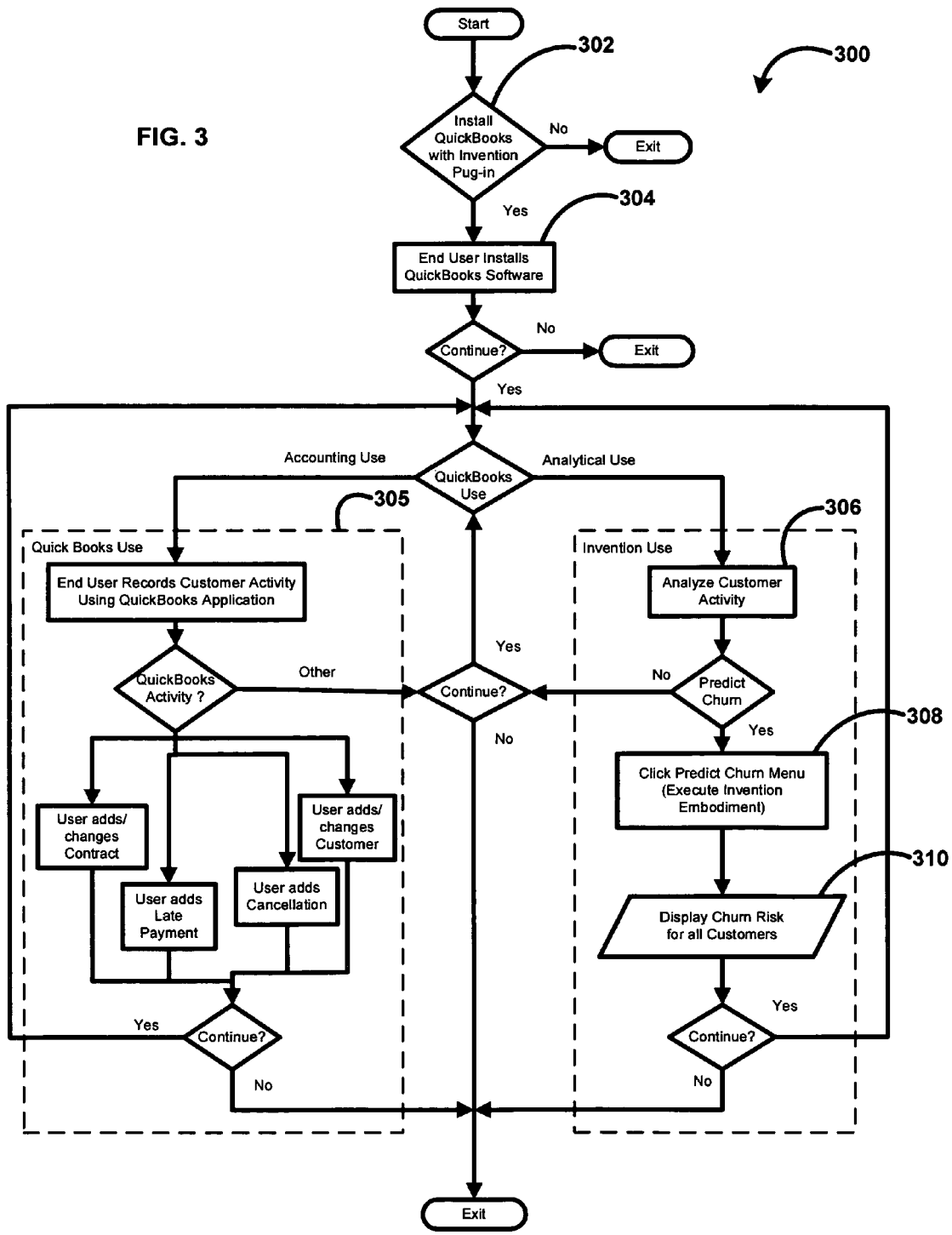
FIG. 3 is a flowchart illustrating the process for using one embodiment of the invention installed as shown in FIG. 2.

FIG. 3 is a flowchart illustrating the process for using one embodiment of the invention installed as shown in FIG. 2. In this process 300, in a first step 302, the end user starts the installation process. In a next step 304, an installation wizard prompts the end user to install the user's platform software, in this case QUICKBOOKS software, with the invention as a plug-in. In a next step 305, the end user starts the platform software application and begins use of that software. For example, the end user would start the QUICKBOOKS application to records customer's accounting activity such as "add a new customer," "add a new contract," "add a late payment," and "add a customer cancellation." In a next step 306, the end user activates the invention to analyze some aspect of data collected in the platform software application, such as the customer activity in the context of QUICKBOOKS. In a next step 308, the end user clicks on a given business task, in this case the "Predict Churn." In a last step 310, the invention displays the results for the business task within the user interface of the platform application, in this case the risk of churn for all customers in the database within the QUICKBOOKS user interface.

In some instances, however, the invention may be used in a "stand alone installation" configuration, where it does not integrate with or exchange data with other systems. In this case, the data that is analyzed can be entered by the end user manually. Another configuration option is the "stand alone user interface" configuration, in which the invention integrates with a software platform and receives or extracts data from the platform, but where end users access data mining results through a "stand alone user interface" that the invention provides, rather than through the user interface of the software platform. Where the meaning is clear from the context, both types of configuration may be referred to as "stand alone" configurations.

Figure 4:
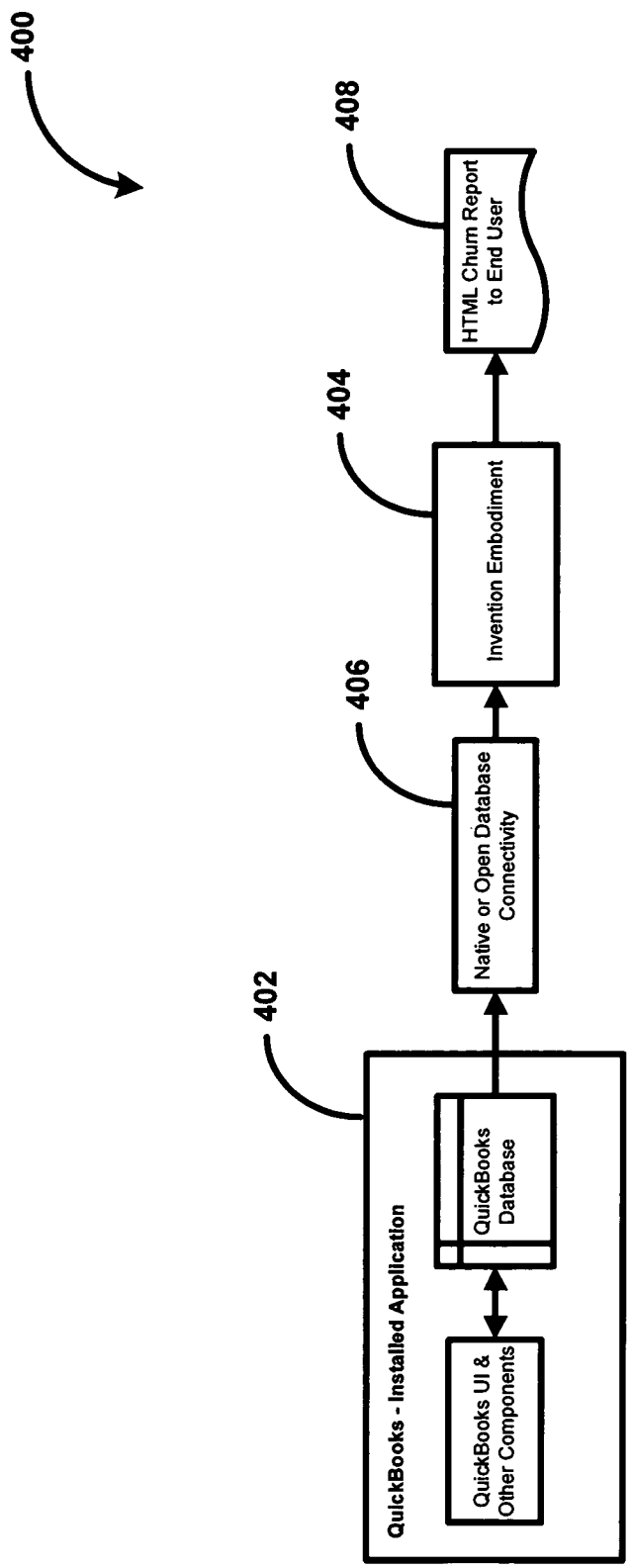
FIG. 4 illustrates the component architecture for integrating an embodiment of the invention into a given platform in another embodiment of the invention.

FIG. 4 illustrates the component architecture for integrating an embodiment of the invention into a given platform in another embodiment of the invention. In this architecture 400, QUICKBOOKS 402 is utilized as an example platform, and the invention 404 is external to the QUICKBOOKS platform 402, thereby forming a standalone application. In this case, the native and open database connectivity 406 between the invention and the QUICKBOOKS software is created during runtime by utilizing the standard database connectivity protocols in addition to the authentication details received from the user.

Figure 5:
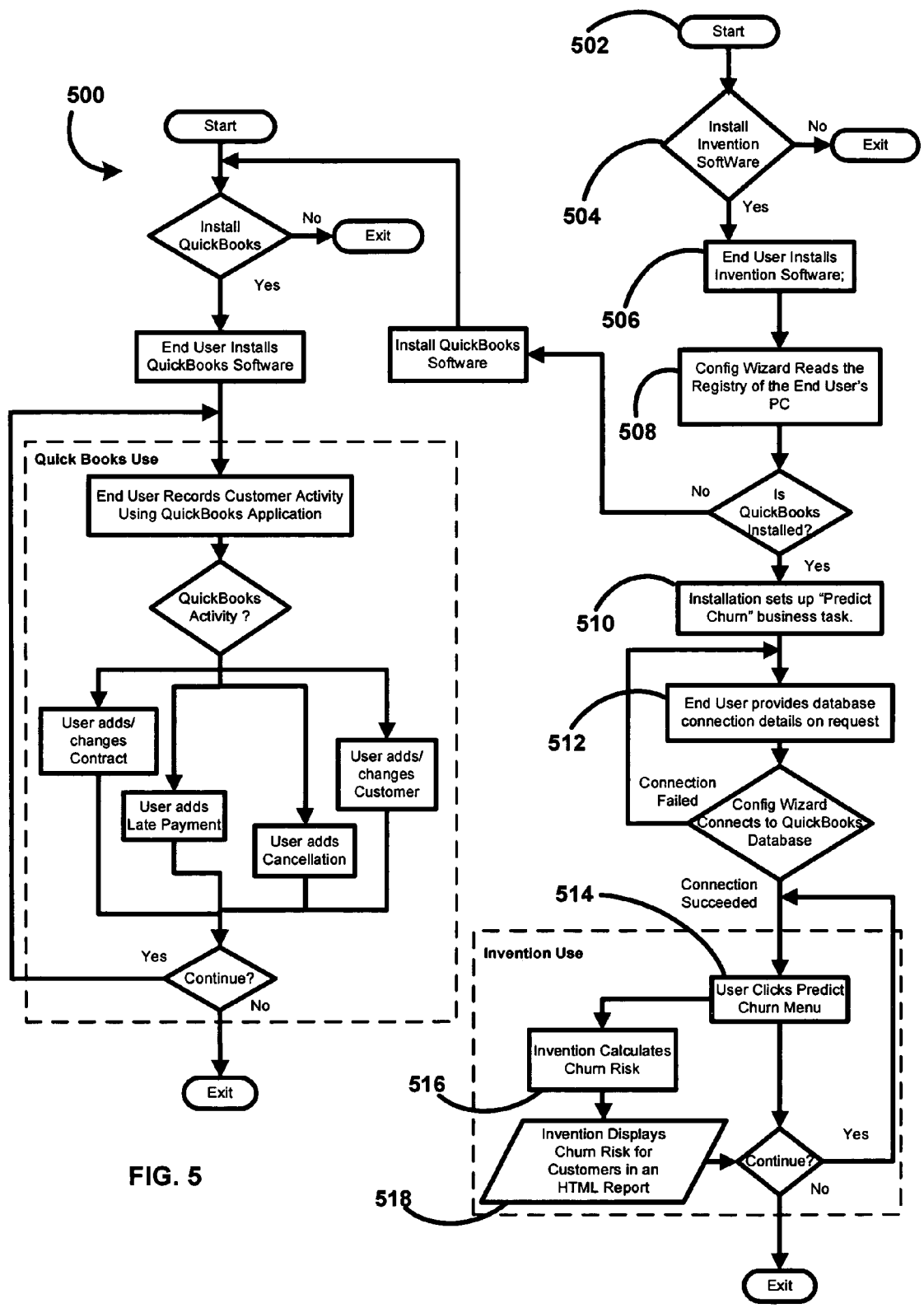
FIG. 5 is a flowchart illustrating the process for using another embodiment of the invention installed as shown in FIG. 4.

FIG. 5 is a flowchart illustrating the process for using one embodiment of the invention installed as shown in FIG. 4. In this process 500, in a first step 502, the end user starts the installation process for the invention. In a next step 504, an installation wizard prompts the end user to install the invention software. In a next step 506, the end user installs the invention software. In a next step 508, the configuration wizard of the invention checks for an installed version of the user's platform software application, in this case QUICKBOOKS. If a QUICKBOOKS application is not installed, then the configuration wizard prompts the user to install QUICKBOOKS software application. In a next step 510, after completing step 508, the end user installs a desired business task, in this case "Predict Churn." In a next step 512, the end user requests access details to connect to the QUICKBOOKS database. In a next step 514, the end user clicks on the selected business task, in this case the "Predict Churn" menu. In a next step 516, the invention fetches the data from the QUICKBOOKS database and calculates churn risk for customers by executing the "Predict Churn" business task. In a last step 518, the invention displays the results with the risk of churn for all customers in the database in an HTML report.

Further, in some embodiments, password installation may be used to invoke an embedded program inside of an existing platform. When software providers make new software available through "password installation" the new software may already be included in an existing software system to which the user already has access, but the user cannot access and use the new software before taking certain steps. Such steps may include steps similar to some or all of the following: registering as a user of the new software, paying a license fee, obtaining a password, and activating the new software by entering the password. A variation of this setup requires downloading and installing the software before or after activating the new software by providing a password. Accordingly, the software of the present invention may be made available to users via inclusion in existing software systems, and it may subsequently be activated through password activation.

When the invention is first set up and/or the software installed, the configuration wizard 114 also integrates the user's source systems 108 located at the user site with the program. The user's source system 108 refers collectively to the user's existing data sources 105, which may be a database on a data storage device. Thus, while the source system 108 is depicted as part of the high-level software architecture environment of FIG. 1A, it will be appreciated that in some cases, the source system 108 may reside at a customer site remote from the installation of the invention and may include multiple databases stored on various storage devices located in different physical locations.

More specifically, an important aspect of the methods and systems of the present invention is the use of a common data model for data mining (CDMDM) that allows for the foregoing integration of a user's data sources, specifically for use by the data mining functions. The CDMDM basically is a model or structure of a table or tables having defined columns that will be used by the various functionalities of the invention to store data or information. The structure of these tables identifies their columns and is used with a mapping that maps the user's data sources 105 or the various columns within the user's data source tables to the columns in these tables defined by the CDMDM.

The mapping between the user's data sources 105 and the table defined by the CDMDM can be generated in two ways. In one embodiment, the GUI of the configuration wizard 114 allows the user to define this mapping. In this case, a user, such as a developer-user, who knows the data structure and column definitions for tables used by the user's platform, can map those columns to the corresponding or appropriate columns in the table defined by the CDMDM. This mapping is stored as metadata in a metadata repository 126, described further below, for use by the invention. In the other embodiment, the program may automatically map the user's data sources 105 to the table defined by the CDMDM. In this case this mapping is also stored as metadata in a metadata repository 126. Each of these options is described in more detail below. It should be appreciated that "data" refers to the actual value (e.g., source system 108 and data sources 105 therein), while "metadata" describes the attributes of the data and/or how the data maps between the source system and the invention. For example, in a source table, a column labeled "customer," would have data stored in the column, such as different customer names. The corresponding metadata would be the description of the column (i.e., the header). Both the actual data and the metadata may be stored in various formats, such as binary, octal, hexadecimal, alphanumeric, or other formats in the metadata repository 126.

Initially, it should be appreciated that not all of the columns in tables within the user's platform will be mapped, as this mapping is dependent upon the business task selected for execution by the user. As described below, the configuration wizard 114 allows the user to identify a business task to be executed, which may be a pre-configured business task or a customized business task. This identification is simply the definition of the business task in business terms and does not involve any programming function, other than perhaps giving a name to the business task for use in the program. In other words, identifying the business task is simply defining the question or task for which the user desires information through the use of data mining. Once the business task is identified, then the business task as expressed in business terms is translated into information that the program can use to execute the data mining functions and provide a solution for that business task. This translation function is described in more detail further below. However, after identifying the business task but prior to translation of the business task, the tables and columns of the user's data sources 105 are mapped to the tables and columns defined by the CDMDM for that business task. It should be appreciated that multiple tables may be specified by the CDMDM to correspond to multiple tables within the user's data sources 105.

Accordingly, based upon the business task, the user, preferably a developer-user, may decide to perform the necessary mapping, particularly in the case where the user's platform is a custom platform or the program is being used in a stand alone embodiment. In this case, the user needs to determine which information, specifically which columns in which tables in which data sources, are to be used in developing a solution to the business task. Based upon this selection, the mapping described above can be done, noting again that not all of the user's raw data needs to be mapped. Only that data that the user decides is appropriate for developing a data mining solution for that business task needs to be mapped. This mapping is then stored as metadata in the metadata repository 126 for use by the invention, specifically in the custom platform portion 130 of the metadata repository 126. It should be appreciated, however, that the user can always add additional data for a given business task. In this case, the user would simply execute the configuration wizard 114 and map the additional data. It should also be appreciated that as the program is executed over time, certain business task will have already been defined and a mapping already created for that business task. In this case, the user will not have to re-create the mapping. This mapping is also created for standard platforms when the invention is configured for the particular platform for the first time.

Alternatively, based upon the business task, the configuration wizard 114 will automatically map the user's data sources 105 to the columns in the table defined by the CDMDM. This embodiment may be used when the user is using a common or standard platform that has readily identifiable or known columns or data structures, or in some embodiments similarly named columns as those in the table defined by the CDMDM. In these cases, the identity of the columns in the user's data sources 105 are known for that common or standard platform, and a mapping can be pre-configured to map those columns to those in the table defined by the CDMDM. Similar to the mapping created by the user, this pre-configured mapping is also stored as metadata in the metadata repository 126 for use by the invention, specifically in the standard platform portion 128 of the metadata repository 126. It should be appreciated that this mappings is only created based upon the user identifying a business task for which it is known which columns from which tables in the user's standard platform are to be used to solve that given business task. Therefore, not all of the user's data elements will necessarily be mapped; however, the user can utilize the configuration wizard to map additional data if desired.

Examples of the attributes stored as metadata for various standard platforms includes attribute or column name, business definition of the attribute, name of table or entity that contains the attribute, identity of the database and the system that contains the attribute, entity relationship of various tables in the database, and storage format of the attribute, including whether the attribute is stored as a string, number, boolean, binary, or date value. For example, in a retail management systems (RMS) implementation, if the business task includes identifying the company name of a customer, the standard platform component 128 locates this data in a MICROSOFT RMS table and column.

It should be appreciated that the columns in the table defined by the CDMDM remain constant or are the same regardless of the user's data sources 105. By using a data structure of tables having "fixed" columns, further processing performed by the invention can be separated from and made independent of the structure or format of a user's data sources. This allows the methods and systems of the invention to be used with any type of data source and avoids having to specifically code the functionalities of the invention for a particular format or data source structure. Further, it allows a user to thereafter add additional, different data sources to the invention.

Figure 6:
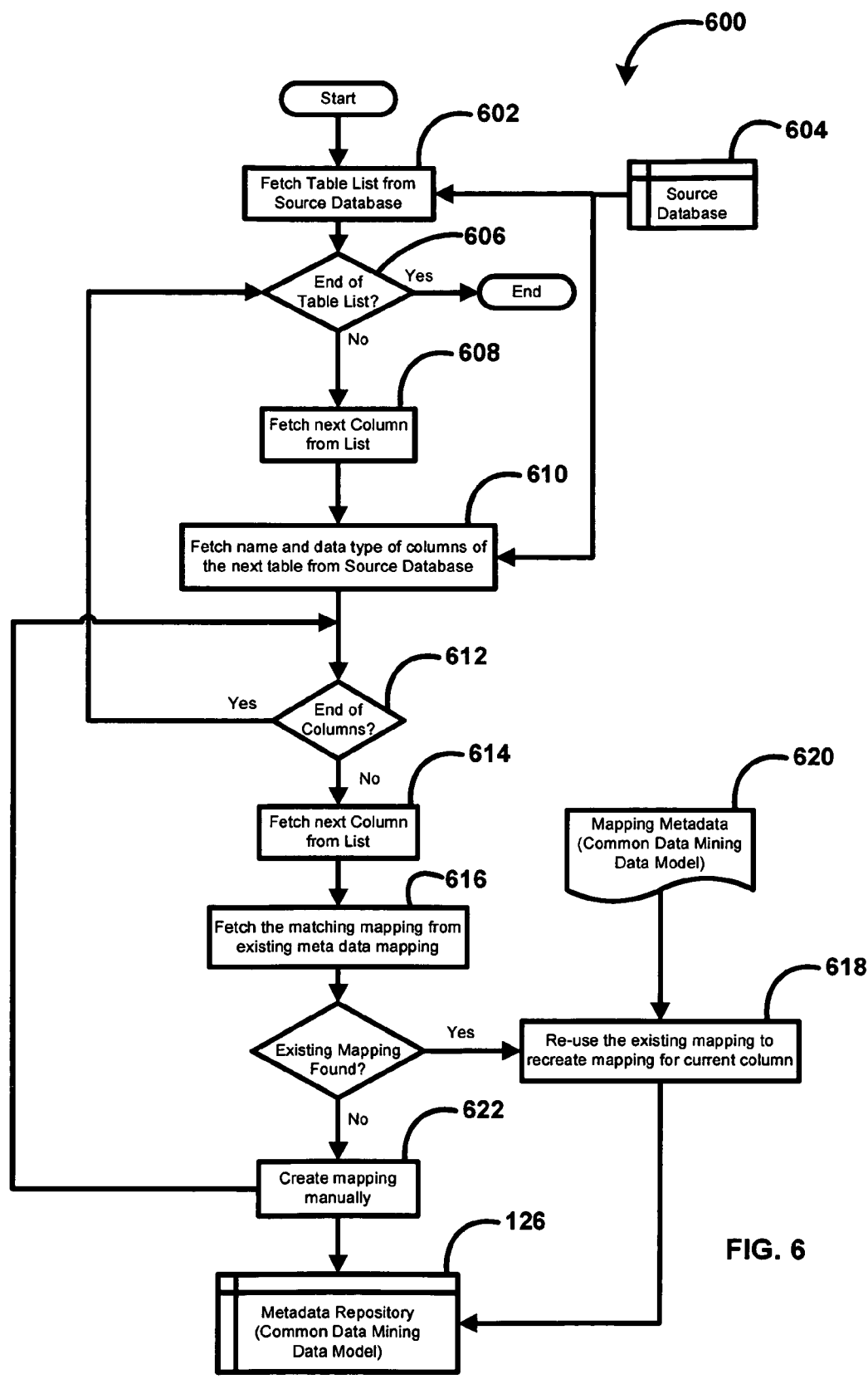
FIG. 6 is a flowchart illustrating one embodiment for creating the mapping of the user's data sources.

FIG. 6 is a flowchart illustrating one embodiment for creating the mapping of the user's data sources. Specifically, the process 600 illustrates how a mapping between a user's data sources 105 and the table defined by the CDMDM is created. In this process 600, after identification of a given business task and the identification of the data columns in those tables in the user's data sources 105 that are to be used in performing data mining for that business task, in a first step 602, a list of tables associated with the user's platform is retrieved from a source database 604 within the user's data sources 105. In a next step 606, the configuration wizard 114 determines whether it has reached the last table, and if not, in a next step 608, the next column is fetched from the table list. In a next step 610, the name and type of column is fetched from the source database 604, and in a next step 612, the configuration wizard 114 determines whether it has reached the last column in that table. If not, then in a next step 614, it fetches the next column from the table. In a next step 616, the configuration wizard 114 fetches a matching mapping from existing mappings within the metadata repository 126. In a next step, the configuration wizard 114 determines whether such existing mapping exists, and if it does, in a next step 618 the configuration wizard 114 retrieves the mapping from the metadata repository 126 and reuses it to map the current column from the new source system to the appropriate column defined by the CDMDM 620. If such matching mapping does not exist, then in a next step 622, the configuration wizard allows the user to manually create the mapping. In either case, in a next step 624, the mapping for that column is stored in the metadata repository 126. The configuration wizard then repeats the above steps until it reaches the last column for a given table and then proceeds to repeats these steps for each table until it reaches the last column of the last table, at which point, the entire mapping of the user's data sources 105 will be stored within the metadata repository in a format specified by the CDMDM. After the mapping is stored into the metadata repository, the configuration wizard prompts the developer user to create the tables specified in the CDMDM. Upon the approval of the developer user, the invention creates these tables in the common data repository for data mining (CDRDM) 136.

In addition to, or as an alternative to integrating a user's source system 108 with the program, in one embodiment, the configuration wizard 114 allows a user to upload tabular data consisting of rows and columns of data by identifying some columns as input or predictor columns to be used by the data mining component of the invention and other columns as output or target columns to receive, for example, the results from the data mining component. Users may obtain such data by extracting it from a source system, by creating such data by manually entering data into a table, or by obtaining the data through other similar means.

The integration of a user's data via the configuration wizard 114 allows this data to be used by the data management and data mining components to ultimately develop a predictive model that uses the value of input variables to predict the values of output variables and to provide a solution to a given business task. As noted, not all data fields within the user's data sources 105 need to be available or used, and in fact, some data may be missing. If at least some data rows have some values that can be used as inputs and, in the case of data mining tasks that predict outputs, some values are present that can be used as outputs, the system can build a predictive model for the business task. Subsequently, users do not need to provide any additional target variable values, and the system can predict the output variable values from the available inputs. Any new data rows that have some input variable values and some output variable values are used by the system to improve the performance of predictive models.

As noted above, in some cases a user may wish to have the invention utilize additional data from a different or new system, or the user may want to build custom predictive models based upon a new system or new platform with new data sources. In either case, the configuration wizard 114 presents a set of questions to the user based upon the user's specific business needs to address these needs. The incorporation of these new data sources can be done by executing the configuration wizard 114 and mapping these new data sources, for a given business task, to the table defined by the CDMDM as described above. Further, a user may identify a new business task, in which case the user may then map data from the new system and use this data in developing a predictive model in response to the business task.

As noted above, the configuration wizard 114 also enables the user to identify the business task to be analyzed. The identification of a business task consists of selecting a name for the business task, which may include selecting a pre-configured business task or setting up a new, customized business task, and optionally defining an objective function. The objective function is described in more detail further below in connection with the data mining component 106; however, basically, it is a metric of measure used in selecting the best model in response to the business task. This objective function can be identified by the user through the configuration wizard or in other ways described further below. Accordingly, it is an optional input at this point. In addition, the identification of a business task also includes identifying the location of the particular user's data sources 105 desired to be used for the given business task and access information (e.g., password information) for those data sources 105. Based upon this information, the configuration wizard 114 is able to guide the user to create the mapping, as described above, between the user's data sources 105 and the table defined by the CDMDM for a given business task. This information regarding a given business task is then written and stored in the business task dictionary portion 132 of the metadata repository 126.

This identification of a business task, which then allows the mapping between the user's data sources 105 and the tables defined by the CDMDM, can be done in two ways. In some embodiments, once the program is integrated with the user's platform, the configuration wizard 114 provides certain pre-configured or predefined business tasks from a business task dictionary 132. In this case, the configuration wizard GUI presents the user with a list of pre-configured business tasks for selection. It should be appreciated, however, that the invention first needs to be integrated with the user's standard platform in order to identify the business tasks pre-configured for that particular standard platform, including any access requirements for the program to access the user's data sources 105. It should also be appreciated that certain pre-configured business tasks may be pre-selected such that the user does not need to actively select a business task and may simply enter the user's preferences for executing those pre-selected business tasks.

It should be appreciated that a business task is pre-configured based upon knowledge of the user's platform and structure of the user's data sources for that platform. Accordingly, the mapping required based upon the CDMDM can also be pre-configured prior to the user's selection of the corresponding business task, or it can be automatically created by the configuration wizard as described above.

In a second method, if a user desires a more customized business task, the configuration wizard 114 allows the user to provide certain information about the desired business task. Specifically, the GUI in the configuration wizard 114 would request a name for the business task, optionally the identification of the objective function, and the identification of the location of the particular user's data sources 105 desired to be used for the given business task and access information (e.g., password information) for those data sources 105. Based upon this information, the configuration wizard 114 is able to create the mapping, as described above, between the user's data sources 105 and the table defined by the CDMDM for a given business task. It should be appreciated that the creation of this mapping in a customized business task will typically be performed by the user or developer-user as described above, wherein the user would identify the data tables and columns within those tables in the user's data sources 105 to be used for the customized business task. This information regarding a given business task is then written to the business task catalog and stored in the business task dictionary portion 132 of the metadata repository 126.

It should be appreciated that once a mapping has been established between the data elements referred to in a business task, and the data available from the source platform, it is possible to execute the business task on this platform. For example, in one embodiment, a basic configuration may provide a set of basic pre-configured business tasks, such as identifying personalized offers for individual customers for a retailer. A user may then want to add a "custom" business task that is not available as a pre-configured business task, such as predicting which individual customers are most likely to purchase a given product. To do so, the configuration wizard 114 lets the user identify data sources 105 and data items within those sources that provide information on the "target" variable and a set of one or more "predictor" variables. In this case, the target variable might be a customer flag attribute of purchase transactions indicating whether the customer purchased dog food as part of a transaction in the past. Predictor variables might include historical customer purchase transactions, such as purchase dates, quantities and prices of historical dog food purchases, and customer demographics from a loyalty card database, such as age, gender, marital status, and income.

To reiterate, the set of data from the user's data sources 105 that requires mapping is defined by the business task as defined in a business task catalog within the business task dictionary 132. In the case where a business task is pre-configured, the identity of the data required from the user's data sources 105 has already been determined, and the selection of a business task will results in the creation of the mapping between those data sources 105 and the table defined by the CDMDM or such mapping will have already been created within the program prior to use because the format of the user's data sources 105 is already known for a standard platform. Accordingly, data elements not referred to in the business task do not require such mapping. In the case of a custom business task, a developer-user identifies the input data required and identifies the mapping to the table defined by the CDMDM. It should be appreciated that in this case, the develop-user has wide latitude in determining what data to use as inputs to the program for solving a particular business task. However, should the developer-user later decide to use additional data for the user's data sources, such data can easily be incorporated simply by mapping that data to the table defined by the CDMDM as described in connection with FIG. 6.

The configuration wizard module 114 also interacts with the administrative services component 112, which is described further below. Specifically, the configuration wizard module 114 receives data from and sends data to the administrative services component 112. For example, the configuration wizard 114 may communicate with a license management service module 158 within the administrative services component 112 to perform license management when and as needed by the business services component 102, where "license management" refers to management of the user's license to the software program. As another example, during configuration of the software, the configuration wizard module 114 might be used to activate the user's license to an embodiment of the invention. To do so, the configuration wizard 114 communicates with the license management service module 158 to determine what pieces of information the user must type or paste into the configuration wizard interface. The configuration wizard would then display GUI components to the user to request and acquire this information from the user and provide it to the license services module 158, which in turn would validate the information and respond to the configuration wizard as to whether authorization succeeded, and for which specific resources or access to the system the user has obtained authorization. Other similar interactions can occur between the configuration wizard 114 and other administrative services modules within the administrative service module 112, such as interacting with the scheduler module 156 to schedule business tasks or predictive models for periodic execution, interacting with the policy management module 152 to update user access to data and functions via policies, and so forth.

Once the user's system platform is integrated with the invention, the execution of the remaining the steps, such as preparing the data, performing data mining analysis on the data, optimizing the data mining algorithms, and producing predictive results is transparent to the user depending on user preferences. It should be appreciated that other functions of the configuration wizard may be described in connection with a given module. In these cases, the GUI for the configuration wizard 114 is configured to provide input screens to the user to allow the user to input whatever information is required.

The business services component 102 also includes a business task services module 116. Generally, the business task services module 116 receives information about the configurations for both standard and/or custom platforms as established by the configuration wizard 114 and receives information about the business task desired by the user that is also established by the configuration wizard 114. Based on the received information, the business task services module 116, in conjunction with several modules within the data management services component 104, translates a given business task into translated business task that the data management services component 104 and the mining services component 106 can then use to ultimately develop a model that provides a solution for the business task. By using this translation, the data mining services component 106 can perform its function without requiring knowledge about the interpretation or business meaning of each business task and without further interaction or input from the user. In this way, the data mining component can be applied to any business task. This avoids the need to have data mining experts program the data mining functionality specifically for a given business task and essentially decouples the data mining functionality from the business task, thereby providing the ability to utilize the data mining functionality with any business task.

Initially, a business task is typically identified using the configuration wizard 114 in a manner that is easily understood by a user as described above. As noted above, a business task can be a pre-configured business task or a customized business task that is created using the configuration wizard 114. Once identified or created, the business task needs to be translated into translated business tasks to enable data mining analysis to generate analytic results. Thus, "business task translation" refers to translating the identified business task into machine-understandable or machine-executable task.

As an example, a business task that is understood by a user may be "predict customer churn risk, based on information about duration and severity of historical service cases." In this case, this business task would be identified using the configuration wizard 114 and may be done by selecting a matching pre-configure business task or by defining a new business task. In either case, the name of the business task, the identity of the user's data sources 105, and possibly the objective function will have been saved in the appropriate section of the metadata repository 126. The translation of this business task may then result in a matching technical task such as: "construct a regression model using data mining algorithm 4,001, for target column 101 and data rows 1 through 50,000, in table 1,001, in database 9,001, using input columns 202 and 203 and data rows 1 through 1,000,000, in table 2,001 and apply the resulting model to rows 1,000,001 through 1,005,000 in table 2,001." As described further below, the invention accomplishes this translation in a two-step process. First, a developer-user translates the original "business task" into a "translated business task" that the data mining component 106 of the invention can interpret. As described in more detail below, the second step of generating the "technical task," as described here above, is accomplished through the interactions of the various components of the invention. For example, portions of the second translation step are accomplished by the data management services component 104, which provides data in a standardized format to the data mining component 106, so that the data mining services component 106 does not require any direct interactions with the user's source systems 108. Similarly, the data mining component 106 manages and categorizes individual data mining algorithms in an algorithm library 146, discussed further below, and it can translate references to a given algorithm category to a set of specific algorithms, which are available from the algorithm library 146 and which fall under the algorithm category called for by a given translated business task. By encapsulating the translation of a business task into a translated business task within the business task services module 116, a wide variety of business tasks can be mapped to a broad selection of data mining algorithms without the need to set up data mining algorithms manually for each business task. In essence, the program is designed to decouple the configuration of the business task and the data mining algorithms so that either can be separately defined and still work in conjunction with each other. As a result, any business task can be addressed by the same data mining functionality. In addition, new data mining algorithms can be easily added to the data mining services component 106 without having to re-configure the specific business tasks that may use those new algorithms. In this case, as discussed further below, only the technical properties of the new algorithms need to be specified, and the business task services module 116 can automatically identify whether any or all of the new algorithms are appropriate for any business task of interest. Optionally, a virtual machine can be used to perform this translation.

To perform this business task translation, the business task services module 116 operates in conjunction with components in the data management component 104. FIG. 1A illustrates this collection of modules as a business task translator 118, which is shown by a dashed line around each of the components that participates directly in the translation of a business task. It should be appreciated that the components forming the business task translator 118 may also function outside of the business task translator 118. For example, some of these components are used in connection with the identification or initial selection of a business task using the configuration wizard 114 as described above.

It should be appreciated that a given business task only needs to be translated into a translated business task one time. Once the business task has been translated, the data management component 104 will prepare the user's data for use by the data mining component 106 to build various models based upon appropriate data mining algorithms within data mining algorithm categories that were identified during the translation process. Ultimately the best model or predictive model for providing results for the business task will be identified. The predictive model then can be used in conjunction with the user's data sources 105 as any time as specified by the user to provide the user with the results or solution to the business task. It should be appreciated, however, that the translation of a business task may be repeated by the user at any later time. Further, it should be appreciated that while the following description of the business task translation process is described for one business task, many different business tasks may be configured by the configuration wizard 114 and translated by the business task translator module 118 for one or more platforms used by the user and using one or more data sources available to the user.

The business task translator module 118 comprises several modules to accomplish the function of translating a business task into a technical or machine-executable task. As described above, the business tasks services module 116 acts as a common interface to other components for obtaining or updating business task information. To provide these services, the business task services module 116 receives information from the configuration wizard module 114 about the business task the user desires to translate into translated business tasks. The business tasks services module 116 also interfaces with the task-execution control module 122, which is described in more detail below, to provide details regarding when these translated business tasks need to be executed. In addition, the business task services module 116 also interfaces with a data dictionary services module 124 that simply provides an interface to the metadata repository 126 and the various portions of that repository to control read/write access to the repository.

Figure 7:
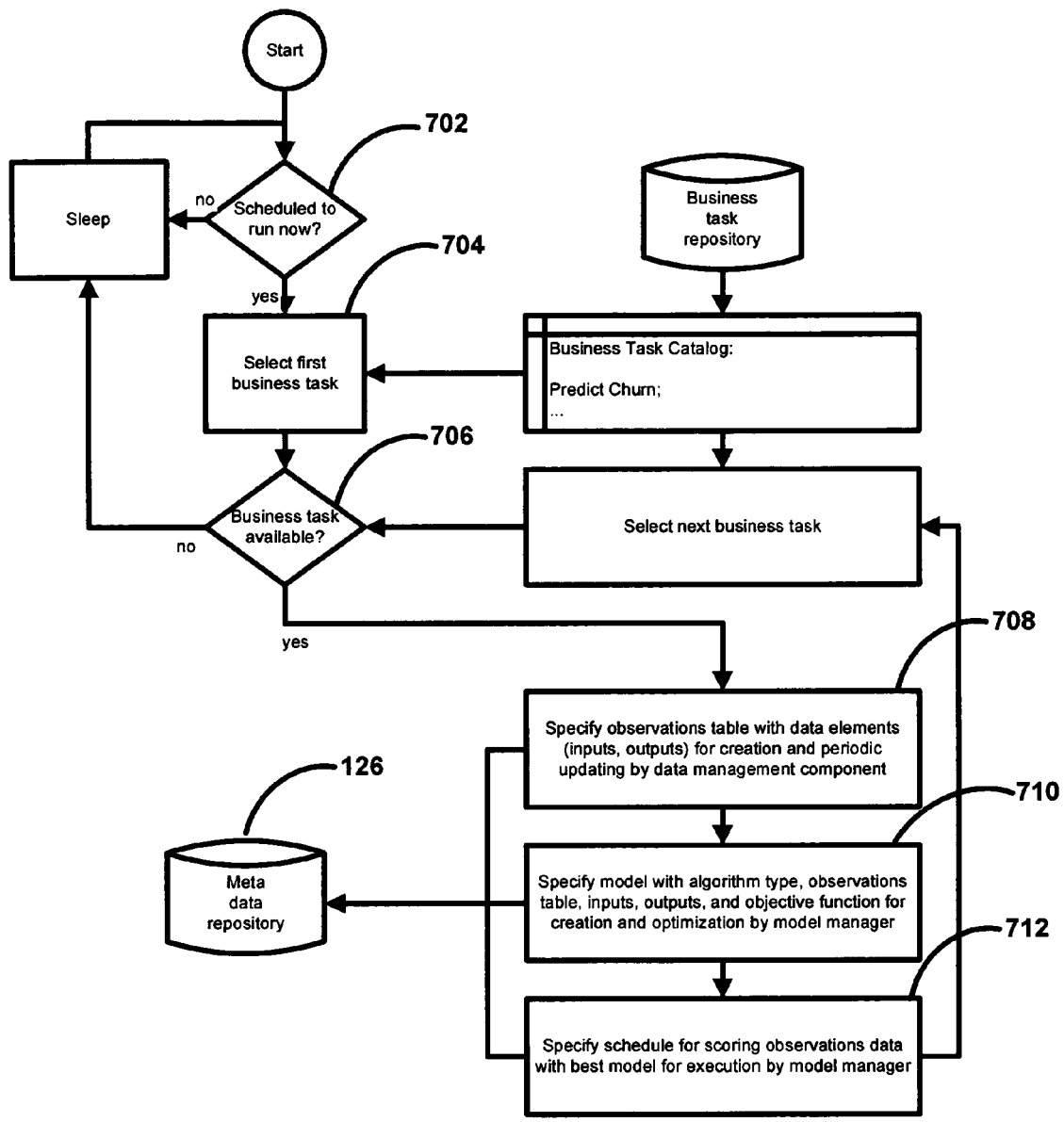
FIG. 7 is a flowchart illustrating the business task translation process.

FIG. 7 is a flowchart illustrating the business task translation process. The overall process of translating a business task basically includes, among other items, identifying the category or type of data mining algorithm that could be used to solve the business task, as well as the identification of which data from the user's data sources 105 will be used in creating the models within the data mining component and the data that will be used to evaluate the models.

In a first step 702, the business task translator module 118 determines whether it is scheduled to begin execution. This determination is done in conjunction with the task execution control module 122 as described further below. Alternatively, this module could be invoked manually by the user, which is done through the configuration wizard 114 which in turn instructs the task execution control module 122 to invoke execution of this module 118. If the business task translator module 118 is scheduled to begin execution, in a next step 704, the business task services module 116 selects the first business task identified to be executed and retrieves the metadata information previously stored for that business task by the configuration wizard 114 in the business task catalog that is stored in the business task dictionary 132, which is a portion within the metadata repository 126. As noted, the business task services module 116 utilizes the data dictionary services module 124 as an interface to the business task catalog. The metadata retrieved for a given business task includes the identity of the business task, possibly the identity of an objective function if already defined, and the identity of the corresponding data inputs in the CDMDM that is mapped to the user's data sources 105. The metadata of the inputs and objective function is retrieved from the business task dictionary 132 during translation.

In a next step 706, the business task services module 116 determines whether the business task is available or whether the translator has completed translation of the last business task requiring translation. If it is, in a next step 708, the business task services module 116 specifies an observations table. The observations table is a de-normalized table into which select data from the user's data sources 105 will be placed by the data management services component 104 for subsequent use by the data mining services component 106 for a given business task. In this step, the business task services module 116 retrieves the mapping of the user's data sources to the table specified by the CDMDM for the given business task from either the standard or custom platform sections 128, 130 of the metadata repository 126. This mapping is used to further map columns from the table specified by the CDMDM to columns in the observations table, thereby creating metadata that specifies the columns in the observations table for that business task. It should be appreciated that the user, preferably a developer-user, can specify all or some subset of the columns in the table specified by the CDMDM as columns in the observations table, thereby allowing some data to be used and preventing other data from being used. The business task services module 116 would provide the user the ability to specify these columns by invoking the configuration wizard 114. Each of the columns in the table specified by the CDMDM to which user's data has been mapped, that are specified as a column in the observations table are referred to as input or output columns in the observations table for that business task. The specifications for the observations table is then stored in the business task dictionary portion 132 of the metadata repository 126 for retrieval and use by the data management services component 104 in actually constructing the observations table itself. It should be appreciated, as described further below, that by constructing a de-normalized form of the user's data in an observation table, the data mining services component 106 can operate on the observation table regardless of the form of the user's original data. In other words, the data mining services component 106 does not have to be customized to operate directly on the user's data and can be used to operate on any set of data that has been placed into a de-normalized form in an observation table.

In a next step 710, the business task services module 116 specifies the algorithm category to be used for the selected business task. Similar to the specification of columns in the table specified by the CDMDM, the business task services module 116 allows the user to invoke the configuration wizard 114 to select a particular algorithm category for use with the given business task. It should be appreciated that the user may alternatively specify the algorithm category before specifying the observations table, during the current translation process. In addition, the user may select an objective function, if one has not already been selected, to be used during the development of a model for providing a solution to the given business task.

The type or category of data mining algorithm refers to a classification of algorithms based upon the type of data mining performed by a given algorithm and the type of information that the algorithm would extract from a given set of data. This information about each category of algorithm is stored as metadata in an algorithm metadata portion 133 of the metadata repository 126. The algorithm categories are discussed in more detail further below.

In a next step 712, the business task services module 116, again through the configuration wizard 114, requests the user to specify the schedule for scoring observations data, described further below in connection with the data mining component 106. This process then repeats for each business task.

All of the information specified during the business task translation process is stored in the business task dictionary 132 within the metadata repository 126 for use by the data management and data mining components 104, 106, as described below. In addition to the identifying the input and output columns, the developer-user manually defines certain specialized inputs derived from other inputs in order to improve the analytic use of the input data. These specifications of the derived attributes are recorded by the developer-user manually during the translation process and are stored in the business task catalog in the business task dictionary 132. FIG. 8 shows the attributes of a sample catalog of translated business task.

Metadata that describes the user's platform schema and the platform's extract, transform, and load ("ETL") functionality is used by the program's own En functionality to convert the user's data from the user's data sources 105 in the user's source systems 108, which are stored in a data repository 136. The business task services module 116, to construct the observation table that is required for the operation of the selected, algorithm to solve the business task, then uses this information. The observation table is also stored in the data repository 136. It should be appreciated that any ETL program known in the art may provide the program's ETL functionality.

The foregoing process of translating a business task to a translated business task may be illustrated using a retail business task to determine combinations of different items to sell together. Examples for which such a business task may apply include a restaurant trying to decide what combination dishes to offer together or a supermarket offering different pharmacy items packaged together. In the configuration wizard 114, the user would select the business task, which is to "identify which items to sell together." This business task is translated into a business task using components of the business task translator 118 residing in the data management component 104 and business services component 102, the detailed processes for which are transparent to the user as is the subsequent translation into translated business tasks.

In this example, the user may select a business task entitled "identify items that sell together." The business task services module 116 uses metadata from the metadata repository 126 to configure a sequence of executable processes that are required to complete the business task selected by the user. These include data management processes such as extraction and aggregation of raw data from the user's data sources 105 and data preparation to transform aggregated data to a format usable by the data mining component and data mining process such as model building, evaluation, selection, evolution, execution and deployment. The data management processes will extract historic product and sales data from the user's data sources 105, for example, a point-of-sale database for a restaurant, aggregate the data to preserve its history and prepare the data in a readable format for the data mining process. All of these functions performed once the business task has been translated are described in detail further below.

It should be appreciated that the foregoing description of the translation of a business task into a translated business task, or specification of the observations table as a de-normalized table, would be repeated for each business task selected by the user. Thereafter, the program will develop predictive models to address each business task and to provide the user with the results from the operation of such models.

Returning to FIG. 1A, the business services component 102 also includes an end user interface (UI) 120 that allows the user to interact with the program on an ongoing basis, for example, to access analytic results and/or to view basic customer configurations. In some embodiments, the end user interface 120 comprises a GUI that displays requests for inputs from the user and that displays results from operation of the program, including the results of operation of the predictive model developed based upon a given business task. More specifically, the end user interface 120 obtains the results from the delivery services component 110, which, in turn, obtains the results from the analytic results database 140. Depending upon the business task, the results may be displayed in graphical, tabular, or sentence form.

For example, in a retail business application, the end user interface 120 can be a web interface to display analytic results in the form of suggestions of various combinations of products that the retailer could sell together and that have a probability of high profit. For a CRM implementation, the end user interface 120 could display analytic results of calls ranked by risk of a subscriber initiating an escalation or ranked by the risk of becoming reopened, which may be displayed graphically or in tabular form. The end user interface could also display the results of other business tasks including the identification of the likelihood of order cancellation or likelihood of customer churning, which may be displayed in graphical or tabular form as well.

The business services component 102 also comprises a task execution control module 122 that is a back-end processor that manages execution of different tasks within the business services component 102. As used herein, the term "task" as managed by the task execution control module 122 is different from a "business task" that is performed by the invention in order to obtain analytic or predictive model results for a defined business task. The tasks managed by the task execution control module 122 include those functions or routines within the overall program that require execution.

The task execution control module 122 executes various processes such as business task translation, data acquisition, data aggregation, data preparation, model building, and model execution. The tasks executed by the task execution control module 122 are executed both interactively and in an automated fashion. For example, tasks such as business task creation, CDMDM creation, and business task translation can be executed through the configuration wizard 114 driven by the inputs provided by the developer-user, whereas task execution control module 122 automates the execution of tasks such as data aggregation, data preparation, model building, and model execution. The above mentioned tasks are stored in the metadata repository 126 in a list called control job list.

It is to be noted that the invention implements task execution control in two approaches referred to as centralized and de-centralized. In the centralized approach, the task execution control module 122 will be the central processor executing all the components in the invention from the list of automated jobs in the control job list. In the de-centralized approach the task execution control module 122 initiates various processes related to the corresponding jobs in the control jobs list. The processes initiated by the task execution control module 122 then run as self-managing processes like system-demon processes in the UNIX operating system or service process in the WINDOWS operating system. It is to be noted that interactive tasks are always executed using the task execution control module 122.

Figure 8A:
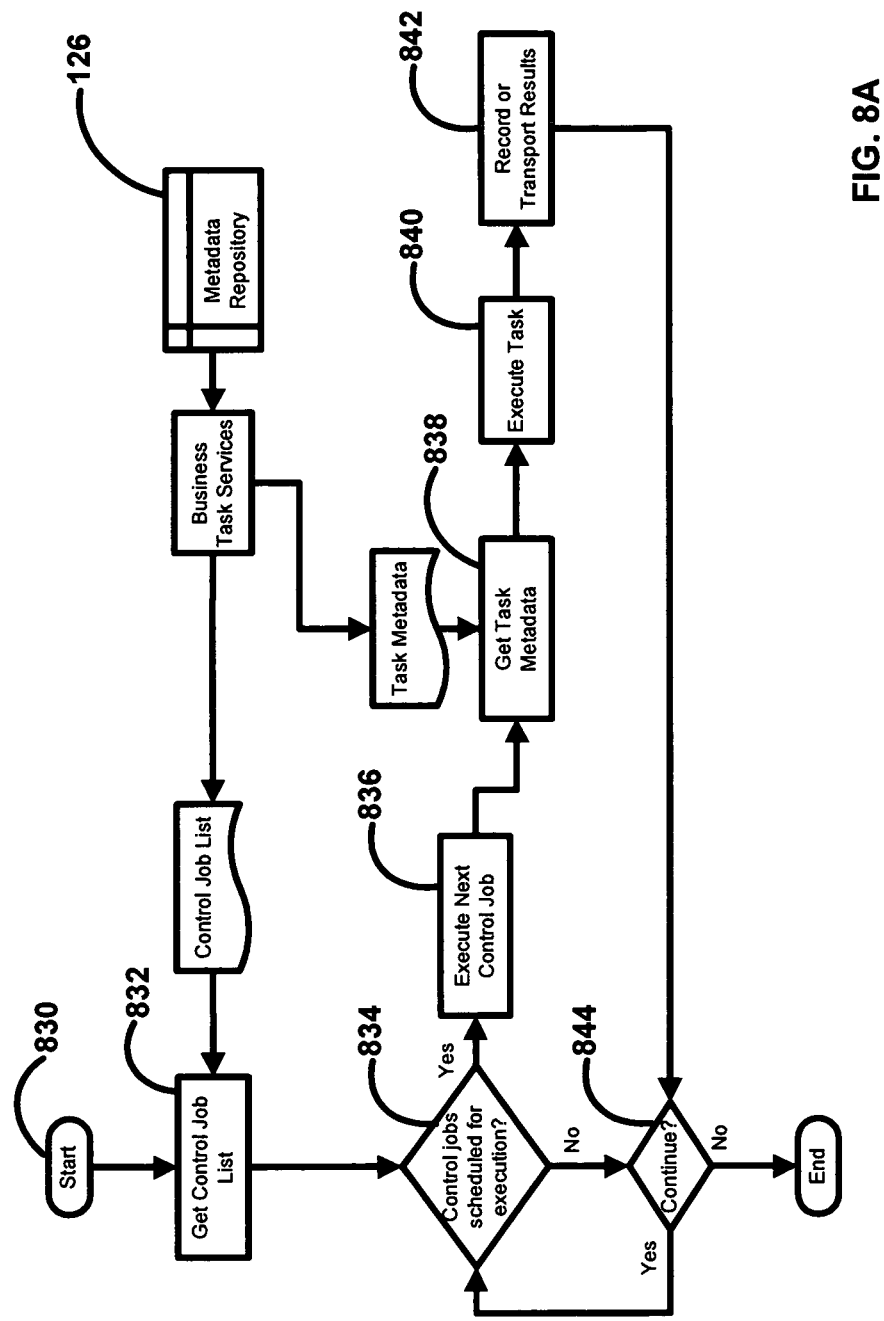
FIG. 8A is a flowchart illustrating one embodiment of task execution control.

FIG. 8A is a flowchart illustrating one embodiment of task execution control. Specifically, the operation of the task execution control module 122 in a centralized approach is shown. In an initial step 830, the invention invokes the task execution control module 122. The task execution control module 122 is invoked by the configuration wizard 114 or by the scheduler 156 in the administrative services 112. In a next step 832, the task execution control module 122 fetches a control job list from the metadata repository 126. In a next step 834, the task execution control module 122 checks for control jobs to execute. In a next step 836, if a control job is present, then task execution control module 122 executes the next control job. In a next step 838, the task execution control module 122 fetches the metadata of the task to be executed. In a next step 840, the task execution control module 122 executes the task by passing the metadata, and the task executed by the task execution control module 122 uses the metadata and executes the process in the module. In a next step 842, the output of the executed process is recorded by the executed module. In a next step 844, the task execution control module 122 continues the process from step 836 for the remaining control jobs or exits if no remaining jobs are scheduled to be executed in the control job list.

Figure 8B:
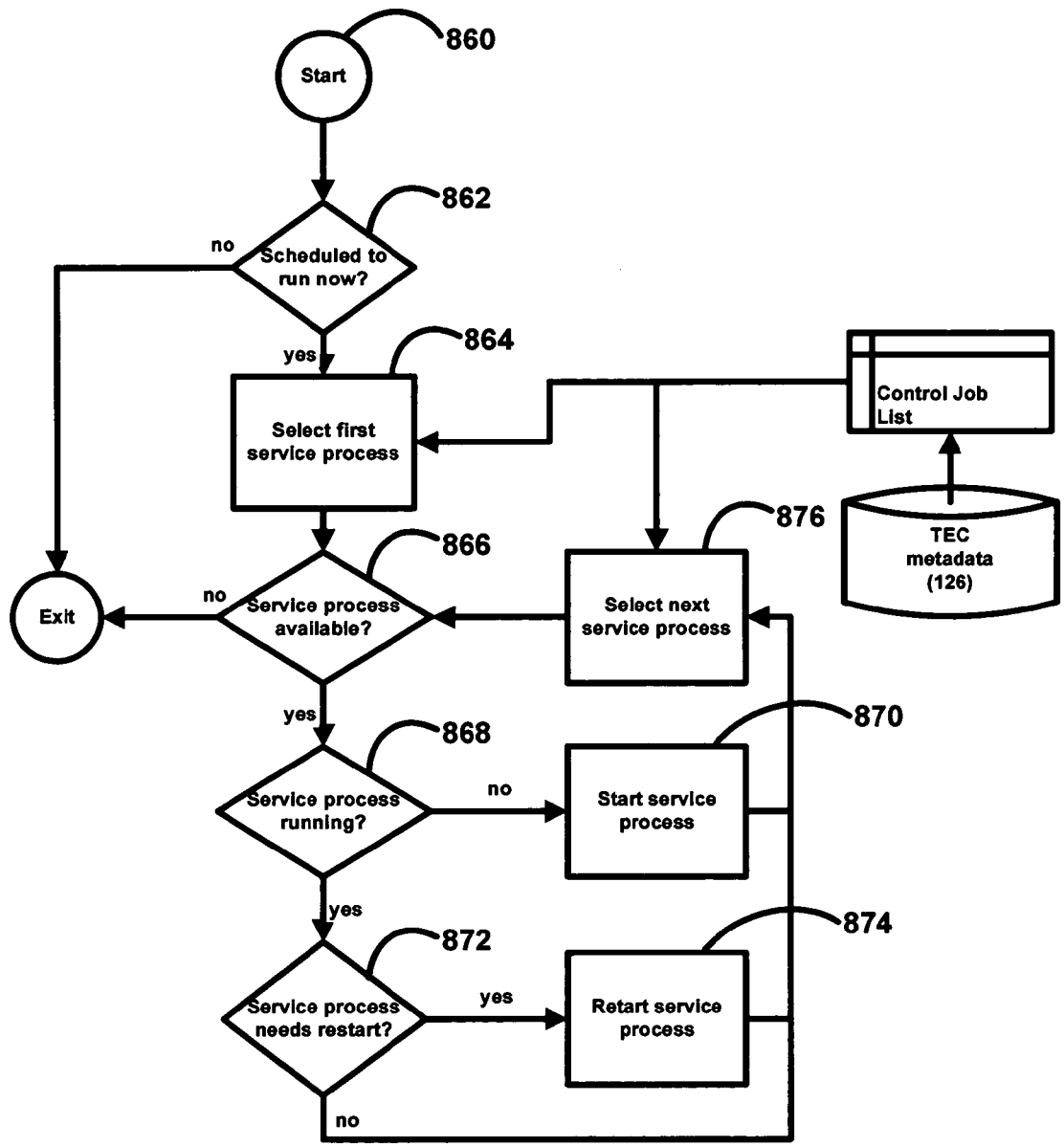
FIG. 8B is a flowchart illustrating one embodiment of task execution control.

FIG. 8B is a flowchart illustrating one embodiment of task execution control. Specifically, the operation of the task execution control module 122 in a decentralized approach is shown. In an initial step 860, the invention invokes the task execution control module 122. In a next step 862, the task execution control module 122 determines if it is scheduled to run. In a next step 864, the task execution control module 122 selects the first process or service process from a control job list. In a next step 866, the task execution control module 122 checks to see if the selected service process is available. In a next step 868, the task execution control module 122 checks whether the service process pertaining to the control job is currently running. In a next step 870, if the service process is not running, then the task execution control module 122 starts the service process. In a next step 872, if the service process is running, then the task execution control module 122 checks to see if a restart is required. In a next step 874, if the service process requires a restart, then the task execution control module 122 restarts the service process. In a next step 876, if restart is not required, then the task execution control module 122 continues the process from step 866 for remaining control jobs or exits if no remaining jobs are scheduled to be executed in the control job list.

FIG. 8C illustrates a sample control job list. The task execution control module 122 executes the jobs listed in the control job list in the centralized approach in the order specified by the attribute named "SEQUENCE." The type of the job denotes whether the job has to be executed interactively or can be automated. It is to be noted that the ask execution control module 122 starts or restarts the service processes in the de-centralized approach. The description of the control jobs is as follows. CREATE BUSINESS TASK is executed interactively by invoking the configuration wizard 114. This job creates a business task as specified by the developer user. CREATE CDMDM MAPPING is executed interactively by invoking the configuration wizard 114. This job provides an interface to enable the developer user to map the source system columns and tables to the CDMDM. After completing the mapping, the configuration wizard 114, prompts the developer user to create the corresponding tables in the CDRDM 136. In addition, this job creates the data mapping required for data acquisition and data aggregation as shown in FIGS. 10 and 12, described further below. TRANSLATE BUSINESS TASK is executed interactively by invoking the configuration wizard 114. This job provides an interface to enable the developer user to execute business task translation and identify data mining attributes such as data inputs, outputs, and algorithm category and the objective function. The business task catalog is updated with the translated information. ACQUIRE DATA is executed as an automated task by the task execution control module 122. This job invokes the data acquisition services module 134 to execute acquisition of data from the source system 105 to store in the staging tables in the CDRDM 136. The data acquisition services module 134 use the acquisition metadata (FIG. 10) provided by task execution control module 122 to execute data acquisition. AGGREGATE DATA is executed as an automated task by the task execution control module 122. This job invokes the data aggregation services module 149 to execute aggregation of data from the staging tables to the aggregated tables in CDRDM 136. The data aggregation services module 149 use the aggregation metadata (FIG. 12) provided by task execution control module 122 to execute data acquisition. CREATE OBSERVATIONS is executed as an automated task by the task execution control module 122. This job invokes the data preparation services module 142 to execute preparation of data from the aggregated tables to create observations in the observations table in CDRDM 136. The data preparation services 142 use the preparation metadata (FIG. 14) provided by task execution control module 122 to create observations. CONSTRUCT MODEL is executed as an automated task by the task execution control module 122. This job invokes the model manager 144 to execute multiple steps of model building. The model manager 144 uses the metadata from algorithm and business task catalog provided by task execution control module 122 to build and deploy data mining models. EXECUTE MODEL is executed as an automated task by the task execution control module 122. This job invokes the model manager 144 to execute the model to score the observations to create analytic results in the analytic results repository 150. DELIVER RESULTS is executed as an automated task by the task execution control module 122. This job invokes the delivery services component 110 to deliver the results to the end user. The delivery services component 110 uses the delivery metadata from the metadata repository 126 provided by task execution control module 122 to present results to the end user.

One function performed by the task execution control module 122 is calling on the data mining component 106 to generate model predictions and to provide the results from those predictions back to the business services component 102. The task-execution control module 122 also executes certain tasks on a schedule that is defined by a user or administrator using the administrative services component 112, which is discussed further below. The task-execution control module 122 can also monitor access rights of the user to the program. For example, the task-execution control module 122 can be involved in license management and limiting access to use of the program. In this case, the configuration wizard 114 can require a user to provide a license string to activate the license and access the program. The task-execution control module 122 ensures that the program receives a valid license string from the user before allowing other tasks within the program to be performed.

It should be appreciated that a data access services module (not shown) will be a common utility program used by every module in the invention to read and write data from and into the different repositories such as source databases 105, the common data repository for data mining (CDRDM) 136, the metadata repository 126, the analytic results repository 140 and model repository 150. In addition to providing read write access to stored data, the data access services module provides a level of transformation of data stored and retrieved. For example, when requested by the model manager module 144 within the data mining services component 106, the data access services component provides prepared observations in a data format that can be interpreted by the model manager 144. More specifically, in scenarios such as providing data to an algorithm wrapped in third-party software, the data access services module ensures that the format of the data is compliant with the data types used by the third-party algorithm. The data access services component accomplishes the customization of data rendered by either using the specification provided by the calling program or from the specification recorded in the metadata repository 126. Similarly, the data access services module provides a layer of abstraction between the calling program and the underlying storage systems. The data access services module will provide interfaces to multiple storage formats. A subset of the storage formats supported includes relational databases, text files, and xml files.

Data Management Services Component

Referring back to FIG. 1A, the software architecture 100 also comprises a data management services component 104. This component 104 comprises several modules for performing various functions with respect to the data in the user's data sources 105 and the output from the data mining component 106. In general, the data management services component 104 accesses and prepares data from user's data sources 105 for use by the data mining services component 106 and handles the output provided by the data mining services component 106, in particular the output from the data mining predictive model. During the process of preparing data the individual components in the data management services 104 create the tables if not already present in the common data repository for data mining (CDRDM) 136 to store the data during the various stages of data management such as acquisition, aggregation and preparation of data.

As described above, the data management services component 104 comprises various modules that are part of the business task translator module 118, including the data dictionary services module 124 and the metadata repository 126, which includes the standard platform portion 128, the custom platform portion 130, and the business task dictionary. Each of these components has been described above in connection with the translation of a business task.

The data management services component 104 also includes a data acquisition services module 134 that operates in conjunction with the CDRDM 136. The data acquisition services module 134 basically is instructed, or determines, which data is required from the user's data sources 105 and then actually retrieves that data from the user's data sources 105, which are typically in the form of a table, referred to as a source table, and stores it in the data repository 136. As described above, the task execution control module 122 can either provide metadata to the data acquisition services module 134 that inform the data acquisition services module 134 which data to retrieve from the user's data sources 105, or the task execution control module 122 can simply instruct the data acquisition services module 134 to begin execution. In the latter case, the data acquisition services module 134 would then retrieve the metadata required to identify which data from the user's data sources 105 should be retrieved.

Figure 9:
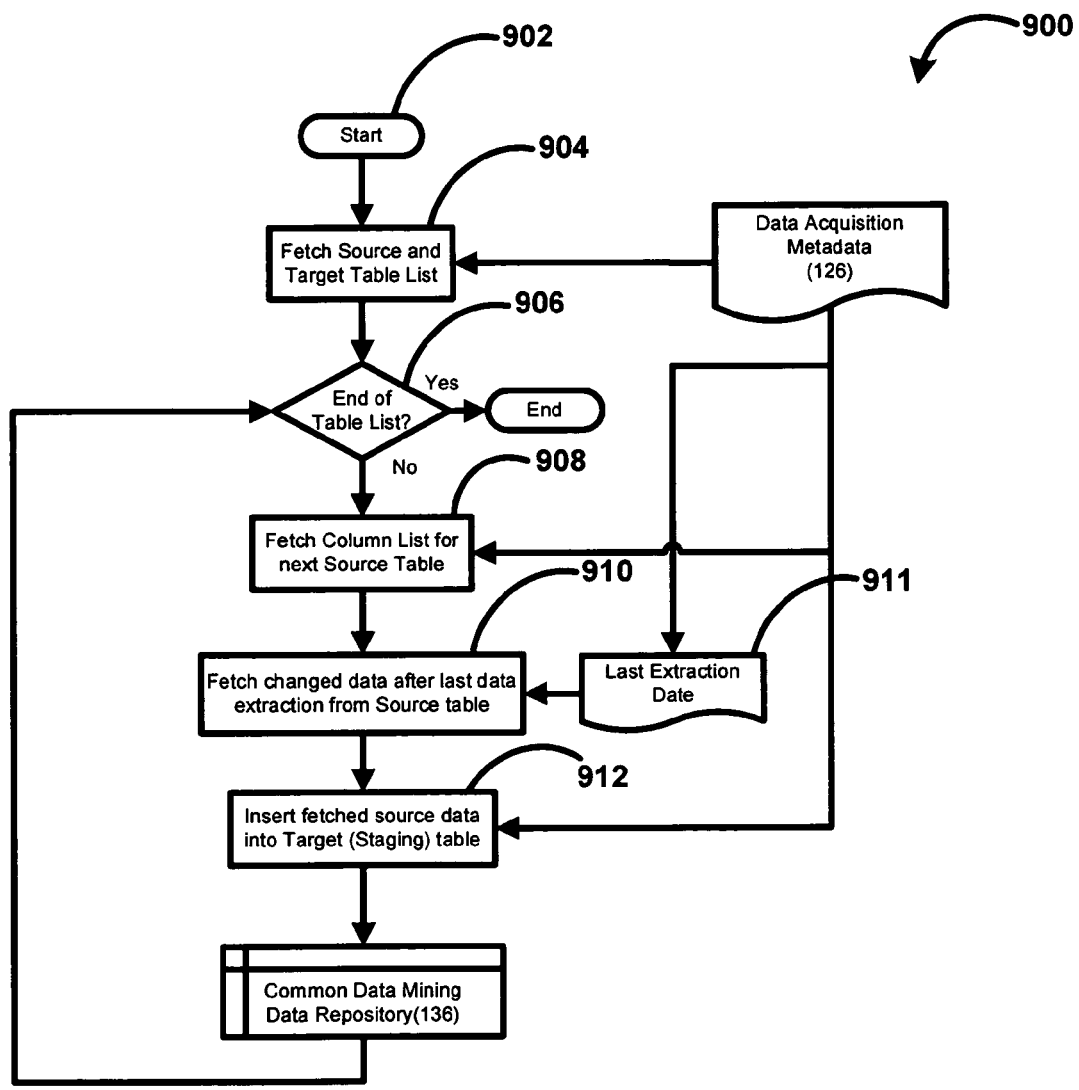
FIG. 9 is a flowchart illustrating the operation of the data acquisition services module in one embodiment of the invention.

FIG. 9 is a flowchart 900 illustrating the operation of the data acquisition services module 134 in one embodiment of the invention. In the initial step 902, the data acquisition services module 134 begins operation based upon receiving an instruction from the task execution control module 122 to begin execution. In the next step 904, the data acquisition services module 134 fetches the source and target table list, which is metadata stored in the metadata repository 126 and referred to as data acquisition metadata. It should be appreciated that in an alternative embodiment, the task execution control module 122 can provide this metadata to the data acquisition services module 134. More specifically, the task execution control module 122 will fetch the metadata from the metadata repository 126 and provide it to the data acquisition services module 134.

The source and target table list, which was constructed during translation of the business task, basically maps the columns of data to be extracted from the user's data sources 105 or, more specifically, extracted from the data source tables residing within the user's data sources 105, for use in solving the business task to the columns in a target table to be constructed by the data acquisition services module 134 and subsequently stored in the data repository 136. In other words, this table list or metadata identifies the columns in the user's data sources 105 or data source tables that have been selected based upon the business task translation to be used in solving the business task. This portion of the table list is referred to as the source table list. This table list or metadata also identifies the columns of a table to be constructed, referred to as a target table, into which the selected data from the user's data sources 105 will be stored. This portion of the table list is referred to as the target table list. It should be appreciated that the target tables or acquisition tables in some cases will have already been constructed based upon previous executions of the data acquisition services module 134. The data in this source and target table list is referred to as data acquisition metadata.

FIG. 10 illustrates an example source and target table list comprising data acquisition metadata. As shown, the first column is simply an identifier. The second column identifies the business task, and the third column identifies the task name, which in this case is data acquisition. The fourth through eighth columns identify attributes of the user's data sources 105 pertinent to the given business task, including the name of the user's data source database, the user's data source tables holding the source data and its type, the columns within those tables holding the data to be extracted, and a last change column used to identify whether data has changed within the user's data sources 105. The remaining columns identify information regarding the target table to be constructed and into which the user's source data will be stored. These columns include the identification of the database into which the target tables will be saved, the target tables' names, the columns into which the user's data will be stored, and the type of table the target tables will be. Regarding the type of table, a target table will be identified as either a Type 0, 1, or 2. The table-type attribute defines how the rules for preserving the data from the source table in the target table in the data repository. This attribute will be used by the data aggregation services module 149 while aggregating the acquired data into the data repository 136. Irrespective of the type of the source system table, it is to be noted that all acquired data will be appended into the staging table during data acquisition. It should be appreciated that a developer-user will use a user interface to read the metadata related to the user's data source tables to determine the type of the target table. Alternatively, for a known platform, the type for the target table can be pre-configured. It should be appreciated that there may be more than one table in the user's data sources 105 that contains data to be extracted based upon a given business task. Similarly, there may be more than one target table to be constructed or in existence based upon prior executions of the of the data acquisition services module 134. However, all of the source and target tables required for a given business task are identified in the source and target table.

It also should be appreciated that the use of this table or metadata provides the ability to match any user's data sources with any data mining algorithm to solve a business task, whereas in the prior art the mapping between a user's data sources and a data mining algorithm would be hard-wired together, which requires additional programming by an experienced data management programmer and which precludes the ability to use other data sources or data mining algorithms unless the program is re-coded, which again requires significant time and expertise. Accordingly, the defined columns in the source and target table can be varied depending upon the business task and the user's source data. In some embodiments, a user, such as a developer-user, may define the columns in the source and target table. Alternatively, for certain platforms and business tasks, the program can be pre-configured with a given source and target table specific to a given platform and business task. In other words, for certain platforms, the data structure or table format for the data stored within those platforms is known, and the target columns can be readily defined for certain routine business tasks that can be run for those platforms. Accordingly, the source and target table can be defined and, therefore, pre-configured in the program for such platforms and business tasks.

Referring back to FIG. 9, in a next step 906, the data acquisition services module 134 determines whether it has reached the end of the table list, which is a list of all of the user's data source tables contained in the source and target table list. If it has not, in a next step 908, the data acquisition services module 134 fetches a column list for the next table in the user's source data table list from the metadata repository 126, which is a list of the column for that particular source table from which data will be extracted for a given business task within the user's data sources 105. It should be appreciated that FIG. 9 illustrates a sequential processing of the user's data source tables; however, the data acquisition services module 134 can also be configured to process these tables in parallel.

In a next step 910, the data acquisition services module 134 fetches the data from the user's data sources 105 or data source tables. More specifically, the data acquisition services module 134 fetches any data that has been changed since the last extraction of data from the user's data sources 105 or the source tables. In other words, the first time the data acquisition services module 134 is executed, it will fetch all of the data in the specific columns of the user's data source table. Subsequent execution of the data acquisition services module 134, however, will only fetch data that has been changed since the last extraction. This step 910 is performed based upon the last extraction date 911, which is an attribute stored with the data acquisition metadata in the metadata repository 126. Data that has been added to the source tables since the last date of extraction 911 will be fetched.

In a next step 912, the data extracted from the user's data source table is inserted into the target table, referred to as a staging table, which is stored in the CDMDR 136. The columns in this staging table are defined by the information regarding the target table in the source and target table list. During the first execution of the data acquisition services module 134, this staging table is initially created. During subsequent executions of the data acquisition services module 134, any additional information is simply added to the existing staging table. The data in the staging table may also be referred to as "acquired" data. The data acquisition services module 134 then returns to the step 906 to determine whether another data source table has been identified in the source and target table list. If so, the data acquisition services module 134 will repeat the steps shown to place the user's source data into the staging table and saving that table in the data repository 136 until source data pertaining to the last table identified in the source and target table list has been acquired and stored in the staging table.

The data management services component 104 also includes a data aggregation services module 149. This module 149 basically preserves the data that have been acquired from the user's data sources 105 in connection with a given business task. It should be appreciated that execution of the data aggregation services module 149 is handled in a similar manner to that of the data acquisition services module 134. For example, the task execution control module 122 may provide the metadata required for its operation or may simply instruct the data aggregation services module 149 to begin execution, in which case, the data aggregation services module 149 would retrieve the requisite metadata from the metadata repository 126.

Figure 11:
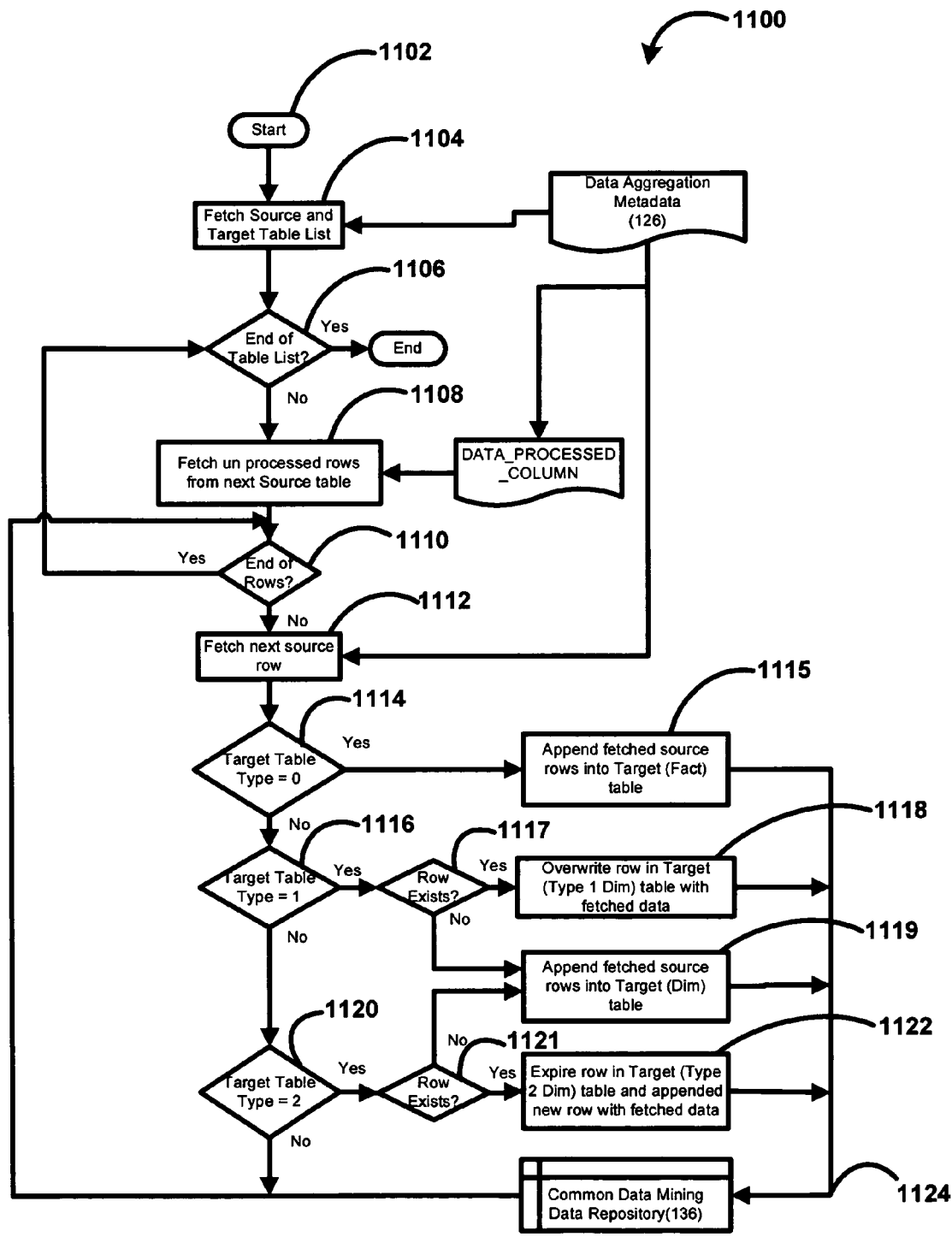
FIG. 11 is a flowchart illustrating the operation of the data aggregation services module in one embodiment of the invention.

FIG. 11 is a flowchart 1100 illustrating the operation of the data aggregation services module 149 in one embodiment of the invention. As noted, in an initial step 1102, execution of the data aggregation services module 149 begins based upon instructions received from the task execution control module 122. In a next step 1104, the data aggregation services module 149 fetches a source and target table list, which is metadata similar to that described above in connection with the data acquisition services module 134. However, in this case, the metadata contained in the source and target table list and retrieved from the metadata repository 126 is referred to as data aggregation metadata. Similar to the source and target table list comprising data acquisition metadata, the source and target table list comprising data aggregation metadata is constructed during the translation of a business task and maps columns from the staging table to another target table referred to as an aggregated data table. It should be appreciated that in an alternative embodiment, the task execution control module 122 can provide this metadata to the data aggregation services module 134. More specifically, the task execution control module 122 will fetch the metadata from the metadata repository 126 and provide it to the data aggregation services module 134.

FIG. 12 illustrates an example source and target table list comprising data aggregation metadata. This sample table contains similar columns as those described above in connection with the example source and target table list comprising data acquisition metadata, and the type of target table can be established in the same manner. This table-type attribute will be used by the data aggregation services 149 while aggregating the acquired data into the data repository 136. A Type 0 table is one in which new or changed data acquired from the source system is simply appended to the table without overwriting or deleting existing data. A Type 1 table is one in which existing data is replaced by new data when the data pertaining to the same record has changed in the source system. In the case of new data created in the source system, the new data is appended to the target table. A Type 2 table is one in which rather than replacing existing data with changed or new data, such changed or new data is appended to the table and the existing data is deemed expired, but if there is no existing data to be replaced then additional data is appended to the table. In this case, the source table list refers to a list of staging tables, and the target table list refers to aggregation tables to be constructed. It should be appreciated that the target tables or aggregation tables in some cases will have already been constructed based upon previous executions of the data aggregation services module 149.

Referring back to FIG. 11, in a next step 1106, the data aggregation services module 149 determines whether it has processed the last table listed in the applicable source and target table list. If not, in a next step 1108, the data aggregation services module 149 fetches rows of data from the next source table, which is the equivalent of a given staging table. It should be appreciated that the data aggregation metadata comprises a column (DATA_PROCESSED_COLUMN) that identifies whether a given row in the staging table has already been processed or moved to an aggregation table. Therefore, only rows of data in a given staging table that have not been processed or previously moved to an aggregation table will be moved to the aggregation table. In a next step 1110, the data aggregation services module 149 determines whether it has processed the last row. If it has, the previous two steps 1106, 1108 are repeated for the next table identified in the source list portion of the source and target table list comprising aggregation metadata. If the last row has not been processed, in a next step 1112, the data aggregation services module 149 fetches the next row from the source table to Store into the target table or aggregation table. The target table or aggregation table into which the row is inserted is identified by the target list portion of the source and target table list comprising aggregation metadata. It should be appreciated that data may be fetched from multiple staging tables and stored into a given aggregation table. Also, multiple aggregation tables may also be constructed and used depending upon the business task translation. For example, if a business task requires data from multiple tables in the source system 105 to build the observations table, then multiple aggregation tables will have to be created. Normally, there will be one-to-one correspondence between staging and aggregation tables.

In next steps 1114, 1116, and 1120, the specific storage of the fetched row in the target table is determined based upon the type of table. In one step 1114, if the target table or aggregation table is identified as Type 0, the fetched row is appended to the target table in a next step 1115. In another step 1116, if the target table is identified as Type 1, then in a next step 1117, data aggregation services module 149 determines whether the fetched row already exists in the target table. If it does, then in a next step 1118, the existing row is overwritten using the fetched row. If not, then in a next step 1119, the fetched row if appended to the target table. In another step 1120, if the target table is identified as Type 2, then in a next step 1121, data aggregation services module 149 determines whether the fetched row already exists in the target table. If it does, then in a next step 1122, the existing row is deemed to be expired and the fetched row if appended to the target table. If not, then in a next step 1119, the fetched row if appended to the target table. The foregoing steps then repeat until the last table and the last row in that table has been processed. At that point, in a next step 1124, the target table or aggregation table is written to and saved in the data repository 136.

The data management services component 104 also includes a data preparation services module 142. This module 142 utilizes the aggregated tables prepared by the data aggregation services module 149 and stored in the data repository 136 to construct the observations table, which, as described above, is a de-normalized table holding data required as inputs for a given algorithm selected to solve the given business task. In other words, the data management services component 104 prepares the table used by the data mining component 106 to perform the data mining functions for a given business task.

As described above, data needs to be passed to the data mining component 106 in a de-normalized, or "single-view," format. De-normalization of a database is method of optimizing the efficiency of a database by increasing the redundancy of the data storage. Redundancy is increased because all of the required data is located in one table, as opposed to multiple tables. Accordingly, the efficiency of the program execution is improved because all of the information required by the data mining component 106 is found in one table, as opposed to multiple tables. For example, if PRODUCT_ID is a reference key in a given table XYZ that points to a separate PRODUCT table, then replacing PRODUCT_ID with PRODUCT NAME and including the information from the PRODUCT table as an attribute in table XYZ is called de-normalizing table XYZ. In addition to in the improvement in the efficiency, creating a single view table is essential because data mining algorithms require a rectangular input to function.

Figure 13:
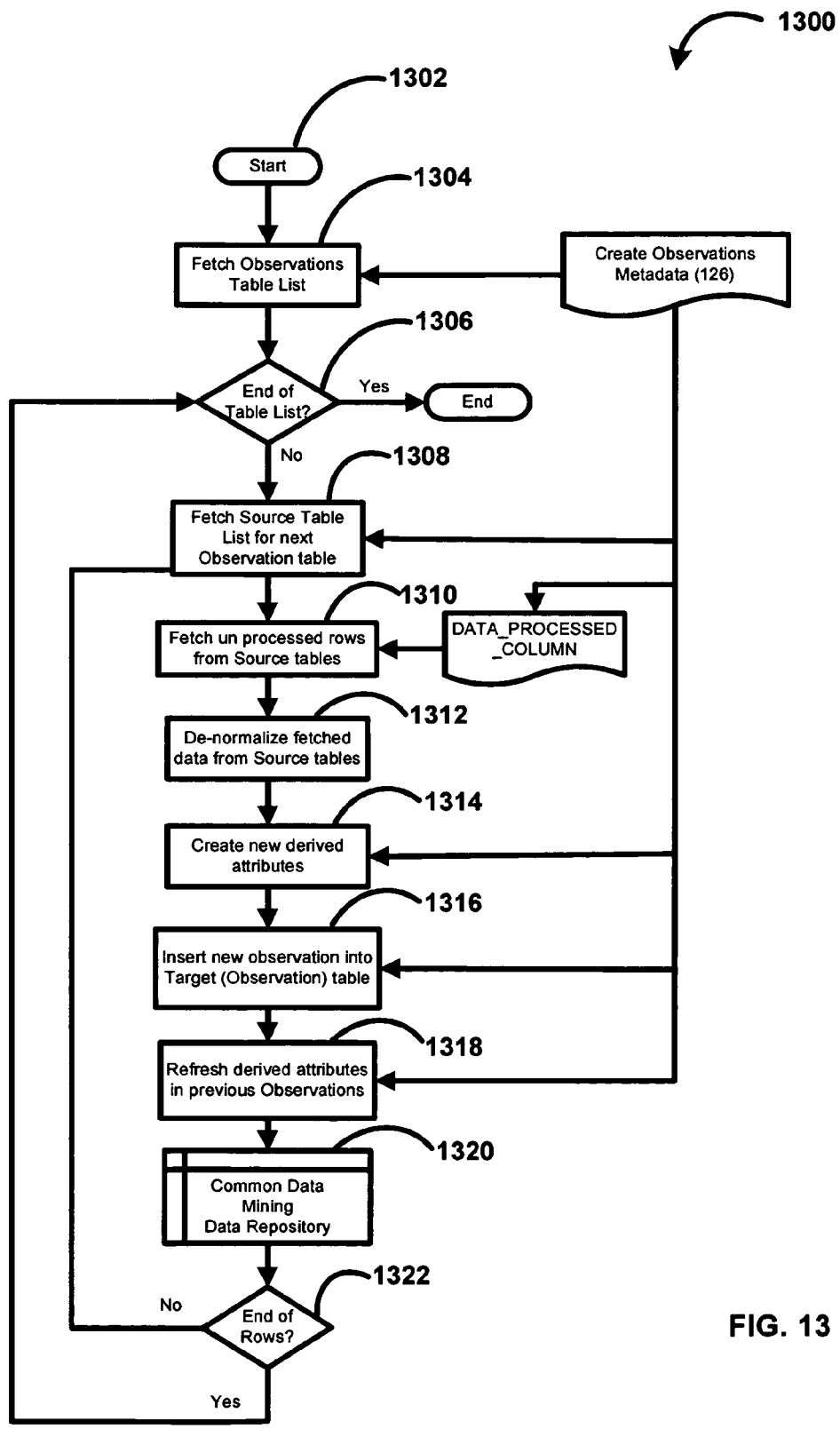
FIG. 13 is a flowchart illustrating the operation of the data preparation services module 142 in one embodiment of the invention.

FIG. 13 is a flowchart 1300 illustrating the operation of the data preparation services module 142 in one embodiment of the invention. In an initial step 1302, the data preparation services module 142 is executed. It should be appreciated that execution of the data preparation services module 142 is handled in a similar manner to that of the data acquisition services module 134 and the data aggregation services module 149 as discussed above. For example, the task execution control module 122 may provide the metadata required for its operation or may simply instruct the data preparation services module 142 to begin execution, in which case, the data preparation services module 142 would retrieve the requisite metadata from the metadata repository 126.

In a next step 1304, the data preparation services module 142 fetches an observations table list, which is metadata similar to that described above in connection with the data acquisition services module 134 and the data aggregation services module 149. However, in this case, the metadata contained in the observations table list and retrieved from the metadata repository 126 is referred to as observations metadata. Similar to the source and target table lists described above, the observations table list is constructed during the translation of a business task and maps columns from the aggregation tables to another target table, which is the observations table. It should be appreciated that in an alternative embodiment, the task execution control module 122 can provide this metadata to the data preparation services module 134. More specifically, the task execution control module 122 will fetch the metadata from the metadata repository 126 and provide it to the data preparation services module 134.

FIG. 14 illustrates an example observations table list comprising observations metadata. This sample table contains similar columns as those described above in connection with the source and target table lists. In this case, the source table list refers to a list of aggregation tables prepared by the data aggregation services module 149, and the target table list refers to a single observations table. In addition, the observations table list includes a column (DATA_PREP_FOR-MULA) that identifies certain calculations, such as statistics and metrics, to be made using the data from the aggregation table. The results of these calculations are then stored in the observations table. It should be appreciated that the observation table in some cases will have already been constructed based upon previous executions of the data preparation services module 142.

Referring back to FIG. 13, in a next step 1306, the data preparation services module 142 determines whether it has processed the last table listed as a source table (i.e., the last of the observation tables) in the observations table list. If not; in a next step 1308, the data preparation services module 142 fetches the source table list for the next table in the observations table list from the metadata repository 136 to determine the next set of source tables or aggregation tables to process. In a next step 1310, the data preparation services module 142 fetches the rows from the aggregation tables. It should be appreciated that the metadata in the observations table list comprises a column (DATA_PROCESSED COLUMN) that identifies whether a given row in the aggregation table being processed has already been processed or moved to the observations table. Therefore, only rows of data in a given aggregation table that have not been processed or previously moved to the observations table will be moved to the observations table.

In a next step 1312, the data preparation services module 142 de-normalizes the data fetched from the source or aggregation table. In this step, data from the fetched aggregation tables are joined using the relationship keys to create a single de-normalized table. In other words, the data stored in multiple tables in the aggregated tables in data repository 136 is converted into a single tabular format. For example, while creating observations for the business task "Churn Prediction," data from the aggregation tables such as Cancellations_Fact, LatePayments_Fact, Customer Dimension, and Contract Dimension are joined using the relationship keys such as Contract Key, Customer Key, Late Payment Id, and Cancellation Id to create a single-table that has all the details pertaining to Cancellation, Late Payment, Customer, and Contract in every row.

In a next step 1314, the data preparation services module 142 creates new derived attributes for use by the data mining component 106. It should be appreciated that certain data mining algorithms may use certain statistics and metrics derived from a user's raw data as inputs. The data preparation services module 142 derives these statistics and metrics (such as mean, standard deviation, etc.) as instructed by the observations metadata and using formulas stored in the metadata repository 126. As described above, the observations table list specifies the particular statistics and metrics to be calculated using the data in a given row of the aggregation table. The specification of these statistics and metrics in the observations table list occurs during the business task translation process as described above.

Referring back to FIG. 14, the column DATA_PREP-FORMULA directs the calculation of certain values based upon the data. As shown in this example column, such derived values may include averages, binning, a direct copy, a discrete value, or the result of concatenation. Other examples of these derived values may include any statistical value, such as means, standard deviation, etc. or other values such as entropy, median, mode etc.

Referring back to FIG. 13, in a next step 1316, the data preparation services module 142 inserts the processed data from the aggregation table for a given row, along with the derived attributes into the target or observations table based upon the observations table list stored in the metadata repository 126. In a next step 1318, derived attributes previously stored in the observations tables are refreshed by re-calculating their values using the formulas stored in the metadata repository 126. For example, statistical values of the existing observations such as mean, standard deviation, median, and mode will have to be recomputed as new observations are created. In a next step 1320, the observations table is stored in the data repository 136. In a next step 1322, the data preparation services module 142 determines whether it has processed the last row of the table currently being processed. If it has, then the data preparation services module 142 returns to the step 1306 where it determines whether it has reached the end of the table list and continues processing from that point. If it has not, then the data preparation services module 142 returns to the step 1310 where it fetches un-processed rows and continues processing from there.

The metadata pertaining to the calculation of these statistics and metrics are included in the mapping between tables and columns in the data aggregation repository and the single-view table in the prepared data repository. Certain columns in the single-view or the de-normalized table will be derived or calculated columns such as mean, standard deviation, etc. The derived attributes and the formulas for calculating the values of the derived attributes in the prepared data repository are defined in the metadata repository as well. It is to be noted that all the inputs provided to the data preparation services 142 including column mapping, details on derived attributes and formulas required to calculate the derived attributes are all defined and populated during the business task translation process. The step of data preparation generally occurs after data warehousing (i.e., the extraction and preserving of the data). Data prepared by the data preparation services module 142 is stored in the data repository 136.

It should be appreciated that the data aggregation services module 149 also preserves changes in the state of the extracted data or data extracted from the user's data sources 105, thereby maintaining a history, or longitudinal view, of the extracted data. For example, if a user's data includes the collection of customer addresses, a given customer will have an address stored in the user's data sources 105, which if required to be extracted by the data acquisition services module 134, that address will also be stored in the data repository 136. If that customer's address changes, the address of the customer will be overwritten in the user's data sources 105 to reflect the new address. However, upon later extraction of data from the user's data sources 105, both addresses will be stored in the data repository 136. The program accomplishes the functionality of preserving historic data by using the data acquisition services module 134 and a data aggregation services module 149. The data acquisition services 134 and data aggregation services 149 will be able to acquire all changed and new records in a user's data sources 105 and preserve the new or changed data in the data repository 136.

It should be appreciated that the capture and preservation of changes to a user's data sources 105 is an important functionality of the program. For example, having access to this historic data allows the data mining component 106 to go back in time and learn from patterns in the past, as described further below.

Lastly, the data management services component 104 comprises a model repository 150 and an analytic results database 140. The model repository 150 is database that stores the predictive models generated by the data mining component 106. As discussed further below, the program builds these predictive models using algorithmic code from the data mining algorithm library 148. This data mining algorithm library 148 contains executable code for decision tree algorithms, neural networks, self-organizing maps, regressions, and any other machine learning, statistical, or data-mining algorithm. The predictive models that the invention builds using these algorithms are also persisted and stored in the model repository 150.

It should be appreciated that the predictive models are also automatically optimized by the program as described further below, and information about this optimization is also stored in the model repository 150. Accordingly, the model repository 150 stores extensive information about the models and about how they have been derived and evolved. Such model information includes, but is not limited to, the type and version of the modeling algorithm with which the model was created, the time consumed for training, the data used for training and validation, the inputs used and measures of performance such as precision and recall.

Specifically with respect to model derivation, each model is derived from a precursor model by adding or deleting inputs, adjusting algorithm parameters, changing data that was used for training and validation, and the method that was used to select these specific changes, such as applying a genetic algorithm, performing feature selection, randomly varying model parameters, specific heuristics for selecting inputs and algorithms, and other similar methods for evolving models. All of this information is stored in the model repository 150.

Similarly, the model repository 150 also stores information about the context in which each model was built. Context information includes, but is not limited to, the identification of the installation of the program, metadata about that installation such as industry vertical, date of installation, various measures of the size of the installation, the business task for which the model was built, statistical aspects about the available input and target data columns, and so forth.

Accordingly, it should be appreciated that the model repository 150 stores any information that can be captured that may affect the best choice and configuration of model for a given business task. That is, the model repository provides a complete trace about the details of each model, the evolution history that led to the creation of each model, and the context in which the model was built. The program uses such information about the evolution history and context of each model to learn which model building and evolution strategies lead to the best models in each specific context. Therefore, the model repository 150 stores vast and broad amounts of information about models and the modeling process. Some or all of this information may be stored in Predictive Model Markup Language (PMML), XML, relational database tables, or other formats.

The analytic results database 140 stores the results or analytics generated by the predictive models. As noted, the data mining services component 106 generates the results or analytics by generated a mathematical model or predictive model to analyze a given set of data in accordance with a given business task requested by the user. The analytic results stored in the analytic results repository 140 are made available to the user through the end user interface 120 that in turn communicates with the delivery services component 110 to deliver the results in the user requested format. Various methods of accessing the results in the analytic results database 140 are provided by the program, such as a graphical user interface (GUI), a relational database (RDBMS), a file system, an electronic data interchange (EDI), web services, and other similar methods.

Figure 15:
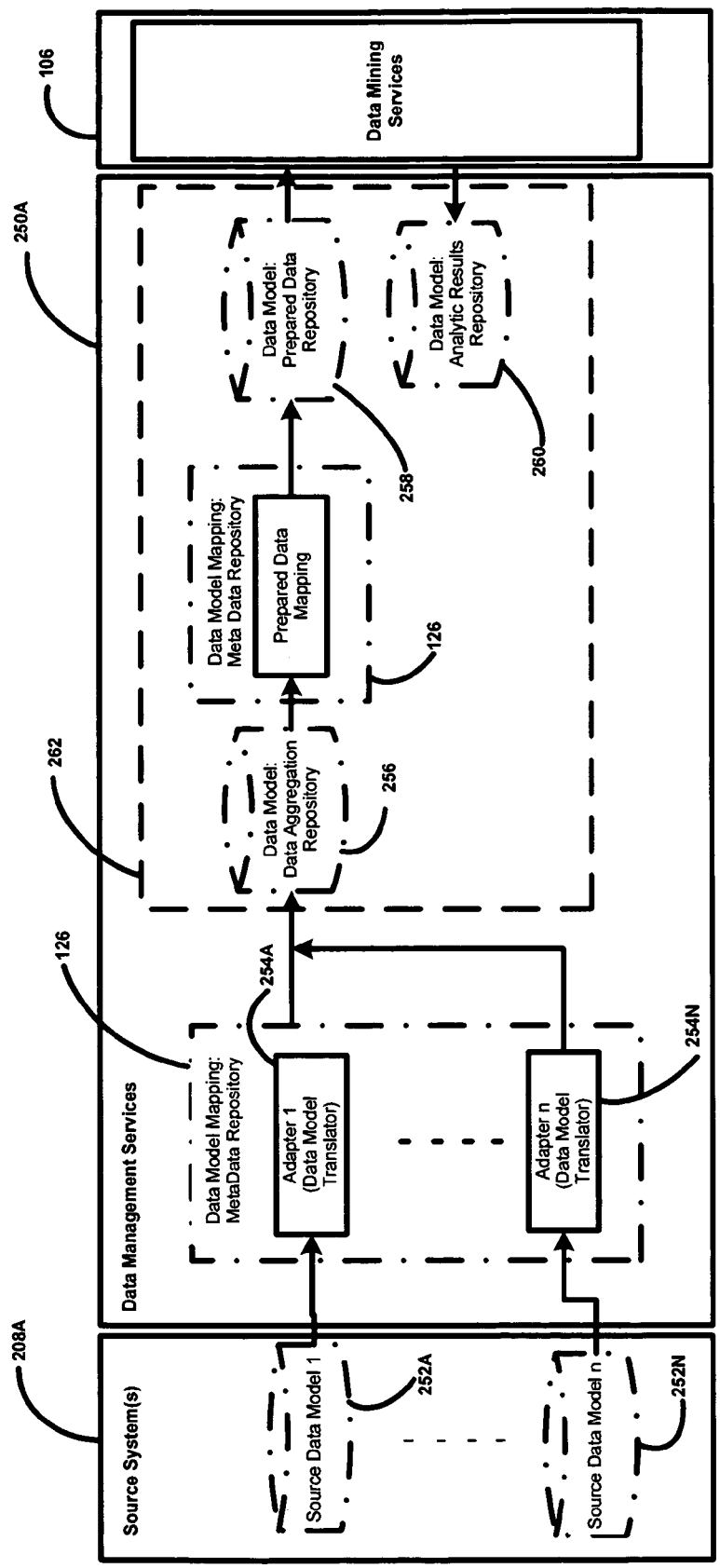
FIG. 15 illustrates a schematic logical diagram of the business data dictionary.

FIG. 15 illustrates a schematic logical diagram of the business data dictionary. FIG. 15 illustrates how aspects of the data management services 104 maps source data from various platforms to a common data model for data mining (CD-MDM) and augments this data in a uniform fashion that is independent of the source platform. This Figure further illustrates how the data mining subsystem can access information that originates from various different sources in a uniform fashion without a need to consider the platform- and implementation-specific details of the various source systems.

FIG. 15 depicts that business data dictionary 250A maps with source systems 208A and data mining component 106. The source systems 208A represent various platforms, each of which may have a separate data model. As mentioned above, the platforms can be standard platforms such a retail source system or other source system, such as, but not limited to B2C, banking, CMS, computer system management, CRM, ERP, financials, gaming, property management and hospitality, HR, marketing, POS, retail, RMS, supply chain management, travel systems, and web logs (website logs) from vendors such as APACHE, BMC, DIGITAL IMPACT, GALOR, GENESIS, INFOSYS, INTUIT, MICROSOFT, OMNITURE, ORACLE, PEGASUS, PEOPLESOFT, SALESFORCE.COM, SAP, and SIEBEL. Thus, source systems 208A depict data models 252A through 254N.

However, every source system 208A may have a unique data structure, so business data dictionary 250A provides the translation between the machine-accessible source system data and more generic business data that are referenced in the business task dictionary. The business task dictionary then identifies the tables and columns in the prepared data repository. Data-mining component 106 then accesses these tables and columns to retrieve the required data and metrics for analysis. For every platform, such as one supporting a specific industry vertical or an industry segment, the business data models in the data management subsystem 250A include a parent machine-interpretable data model. For each such platform, these machine interpretable parent data models provide data structures for data aggregation, data preparation and analytic results. The parent data model can serve as a master object for data structures, which can be inherited to create child objects for every specific component inside the data management component. For example, in FIG. 15 the data models in 250A for a generic CRM platform implementation will have a parent data model with a broad set of attributes and entities. However, when the invention is implemented for a particular CRM-based standard platform like SALESFORCE.COM, the specific source system data model of SALESFORCE.COM is mapped to corresponding attributes and entities in the data model of the data aggregation repository 256. It is to be noted that data aggregation repository 256 is the portion of the data repository that stores the aggregated data in aggregated tables. Similarly, the SALESFORCE.COM specific attributes in 256 will be mapped to the data models of prepared data 258 and analytic-results 260 repositories. As another concrete example, the parent data model for all CRM platforms may define variables for capturing both "priority" and "severity" of support cases. While some specific CRM platforms may inherit both of these attributes from the parent CRM data model, one specific CRM data model, say the model for the "ACME CRM" platform, may only inherit the "priority" attribute. Another specific data model, say the model for the "CRM 2000" platform, may only inherit the "severity" attribute. That is, data models for specific platforms may not support all data model portions defined by the parent data model. It is to be noted that data aggregation repository 256 is the portion of the data repository that stores the aggregated data in aggregated tables. Similarly, the data preparation repository 258 is the portion of the data repository that stores observations.

In the business data dictionary 250A there are three major database components: the data aggregation repository, also referred to as the business data repository 256, the prepared data repository 258, and the results repository 260. These three databases 256, 258, and 260 have different logical data structure but could be designed from the same parent data structure, i.e., the parent machine-interpretable data model. So every specific data model in the data aggregation repository 256, prepared data repository 258, or result data repository 260 is a subset, with possible overlaps, but derived from the master data model. The dashed box 262 around these three data management components reflects that these are associated and can be derived from the same parent data structure to create these specific repositories. It is to be noted that the various components in FIG. 15 represent logical data structures or data models of the corresponding components (105, 136, and 140) in FIG. 1A. It is to be noted that the parent data model mentioned in this paragraph is called the common data model for data mining (CDMDM).

In one embodiment, extracting the data structure for the repositories 256, 258 or 260 can include having pointers to columns in the parent data structure. For example, if the machine-interpretable data of the parent model has columns ABCDEFXYZ, the prepared data repository 258 could have columns ABCD, the data aggregation repository 258 could have columns ABCDEF, whereas the results repository 260 could have columns ABXYZ. So this example illustrates that there could be some overlaps, but the machine-interpretable data of the parent data model contains everything.

As mentioned above, this invention is able to interface with standard and custom source systems like, e.g., SAP, MICROSOFT RMS, or INTUIT POS, and the invention can solve the same business task across multiple source platforms. FIG. 15 illustrates that the machine-interpretable data model or CDMDM is the common language that the business services component 102 understands. The business service component 102 can retrieve data from tables and columns by parsing machine-interpretable data model items to data access services, which maps these to tables and columns in the prepared data repository and later into analytic results repository 140. The system then maps from the CDMDM to various different source databases of different source systems and platforms. For example, if the system needs to know a product ID, that product ID is going to be found in a different table and column in each different source system 108. FIG. 15 shows that for different source systems 1 through N, 252A through 252N, adapters 1 through N, 254A through 254N, map the machine-interpretable data model to the source data models. Adapters are also called mappings in the metadata repository.

When a new source system 208N is integrated to the invention, a human expert identifies where the machine-interpretable data items are located in the new data source. For example, if a new MICROSOFT RMS customer system is being integrated with the invention, the invention needs to know in which table and column is located the product ID, customer ID, the date and time of sales, etc. Thus, adapters 1 through N, 254A through 254N, provide this mapping between the customer data source and data used internally by this invention. Thus, each of the source data models 1 through N, 252A through 252N, can be mapped to a common data model. In one embodiment, this mapping can be configured manually by a human expert. For a standard platform, such as MICROSOFT RMS, the configuration is only required for the first source system of this kind. Additional MICROSOFT RMS systems can then use the same mapping. In another embodiment, standard industry data models, such as the Common Information Model (CIM), Shared Information/ Data (SD)), and the UNITED NATIONS STANDARD PRODUCTS AND SERVICES CODE (UNSPSC) are used to establish data mappings. It is to be noted that the adapters mentioned in the above paragraphs refer to software code implemented as part of the invention that can be customized to automatically map the columns and tables of a particular source database to CDMDM. The invention can deploy data mapping adaptors for specific standard platforms such as MICROSOFT RMS, INTUIT QUICKBOOKS etc. Using this process, the developer user can automate the process of mapping the multiple standard platforms to CDMDM.

Figure 16:
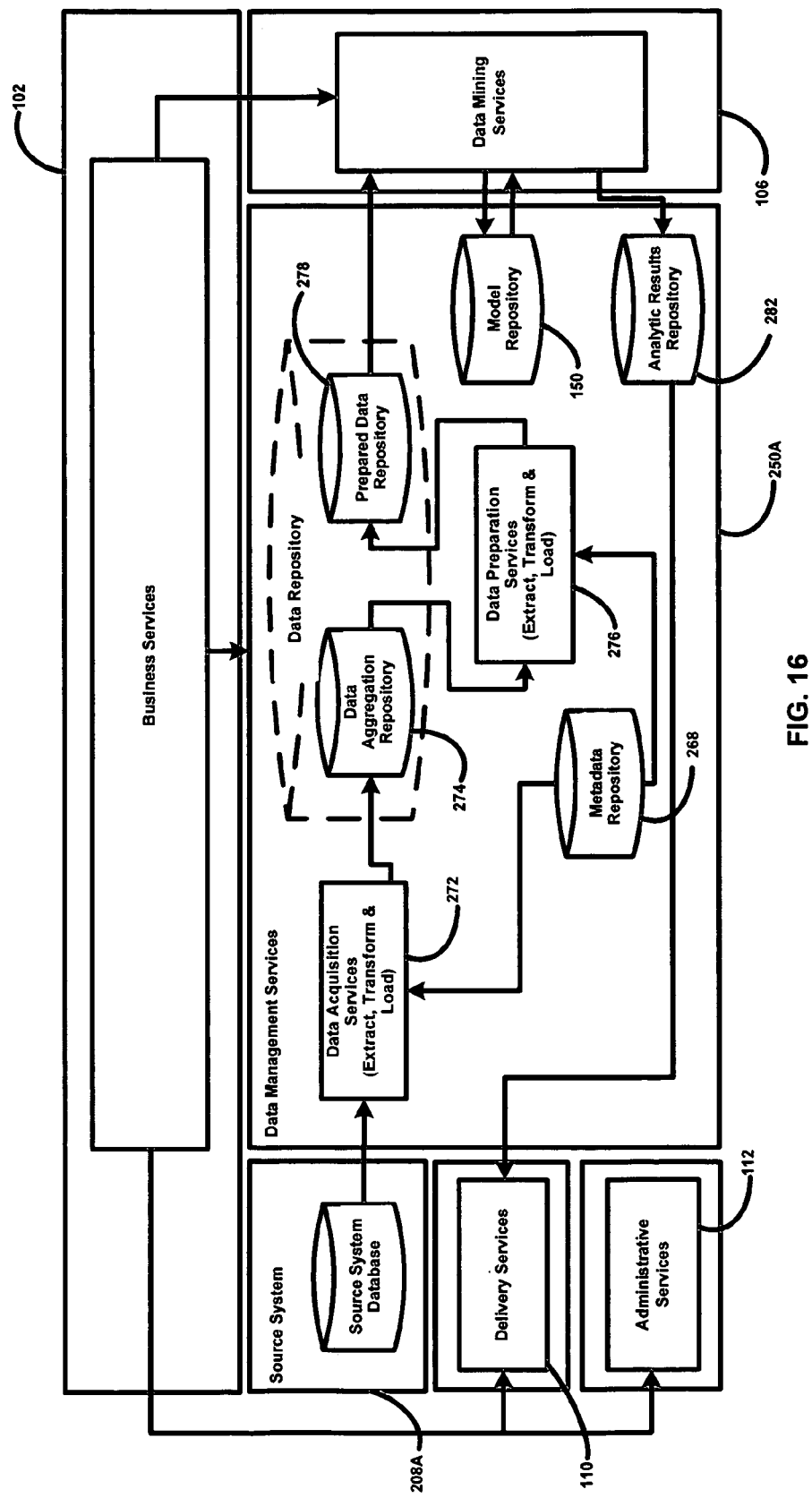
FIG. 16 depicts another physical implementation of aspects of the data management component in FIG. 1A.

FIG. 16 depicts another physical implementation of aspects of the data management component in FIG. 1A. FIG. 16 depicts a physical implementation of the business task dictionary 200, which FIG. 8A depicts conceptually. While FIG. 15 uses graphical icons to represent data structures or data models, FIG. 16 uses graphical icons to represent physical components, such as computer servers and databases, of different aspects of the data management component 104. The source system database 208A in FIG. 16 stores data corresponding to one of the source systems. This database 208A can be related to its corresponding data model, 252A in FIG. 15. Similarly, all other physical components in FIG. 16 relate to their respective counterparts in the logical representation shown in FIG. 15.

With regard to the source system database 208A in FIG. 16, the extract transform and load component (ETL) 272 will perform the adapter translation or mapping to CDMDM, (254A through 254N) of FIG. 15. This translation is an integral part of the translation performed by the configuration wizard 114 in FIG. 1A. As a part of this translation, the data or data structures of the source system are mapped to the CDMDM. Utilizing the mapping and translation provided by the adapters (254A through 254N) of FIG. 8B, the ETL component 272 will translate the source data into business data and stores the translated and transformed data in the data aggregation repository 274. Data aggregation repository 274 in FIG. 16 preserves raw data from the data sources.

Then, the data dictionary services map the common model to tables and columns in the prepared data repository 278 in FIG. 16, which will be input into the algorithms. In one embodiment, a second ETL component 276 performs another translation to move the data from data aggregation repository 274 into a prepared data repository 278 of FIG. 16. This translation utilizes the mapping and other required metadata stored in the metadata repository 268 and/or source data model 208A, shown in FIG. 16. That is, the data dictionary services maps the source metadata (represented by the source data model 208A in FIG. 16) with the business metadata 268. The translation performed by ETL component 276 converts the business data into one or more single-view datasets stored in the prepared data repository 278.

Then, as shown in FIG. 16, the data-mining component 106 accesses the prepared data repository 278 to provide inputs to the data-mining and machine-learning tasks. Thus, in FIG. 1A, the business task services 116 in business services component 102 accesses the metadata repository 126 for the source, business, and data-mining interpretable metadata. It is to be noted that "data mining interpretable metadata" is the metadata of the prepared data repository 278. Business data, i.e., the extracted data from source systems, is stored in the data aggregation repository 274, while the machine-interpretable technical data is stored in the prepared data repository 278. On completion of the data-mining tasks, the Data Mining component 106 writes data-mining results to the analytic results repository 282 in FIG. 16, which corresponds to the results data repository 260 of FIG. 15. The analytic results repository 282 in FIG. 16 is the output from the algorithms that corresponds to and includes the raw and prepared data.

One of the beneficial aspects of this invention is that the metadata repository components 126 and 128 in FIG. 1A may contain predefined mappings and translations between the components 208A, 274 and 278 in FIG. 16 for standard platforms or source systems like SAP, MICROSOFT RETAIL MANAGEMENT SYSTEM and the like. Similarly, this invention can enable installing a product at a Customer location with predefined and pre-programmed business tasks (in 132 in FIG. 1A) for the same above-mentioned standard platforms.

Data Mining Services Component

In one embodiment, the program organizes various components of the program into three general areas: business services and user interactions, data management, and data mining. This method of organization facilitates implementation and maintenance of the program, because components in each area do not require knowledge of or functionality for aspects related to any of the other components of the program. The program accomplishes this through the business task translator 118, which it uses to mediate communication between these three areas.

Generally, the data mining services component 106 performs the data mining functions for the program to develop a predictive model in response to the business task selected by the user. More specifically, the data mining services component 106 executes one or more data mining algorithms provided by the invention that are capable of providing a solution for the selected business task. The data mining algorithms are contained in a library of algorithms, described further below, which organizes algorithms by category. The data mining component specifies the category of each data mining algorithm, and selects algorithms for specific business tasks, based upon the algorithm category recorded for each translated business task. The data mining component selects algorithms and executes these using data from the observations table, which the data management component 104 constructed using the appropriate data from the user's data sources 105, as specified by the business task translation. In execution, however, each algorithm, process different subsets of data from the observations table as inputs, and different algorithms may process data in different formats. In addition, each algorithm may execute using different parameters that serve to adjust and fine-tune its operation. For example, in certain neural network algorithms, a parameter indicating the momentum or the learning rate η, affects how neural network learns or performs, along with similar other parameters. Accordingly, each selected algorithm can execute with different inputs and different parameters to build multiple models that could provide a solution or results for the given business task. As a result, the data mining component can construct multiple models from each algorithm using different inputs and different parameters for that particular algorithm, and it can construct multiple models using different algorithms within the identified category of algorithms. As the data mining component builds each model, it measures and records their performance relative to the business task needs and compares it to that of previously built models to determine whether its performance is better than that of previously constructed models. Thereby, the data mining component is able to optimize automatically the selection of a single model that provides the best solution for the business task. Accordingly, the data mining components selects only one of the models, referred to as the deployed model, out of the many that it builds to provide the user with a response or solution to the business task.

The data mining component controls the process of optimizing and selecting the best model using certain performance or evaluation criteria, referred to as an objective function. The data mining component may use various different alternative objective functions to evaluate the performance of a given model. For example, when a financial institution desires to predict the risk of customers defaulting on loans, it may use different objective functions to accomplish different goals. One objective function, known as "precision" minimizes the rate of incorrect predictions where the model predicts default when the customer does not default. In the art, this type of error is a "false positive." In contrast, another objective function, known as "recall," minimizes the rate of incorrect predictions where the model predicts no default when the customer does in fact default. In the art, this type of error is a "false negative" error. In selecting the deployed model from the various models constructed, the program allows the user to select, or assists the user in selecting, as described above in connection with the configuration wizard 114, the appropriate or desired objective function.

In summary, the data mining component builds models based upon selecting a particular algorithm within the algorithm category determined during business task translation or changing either one or more parameters for a given algorithm or the data inputs. In this manner, the data mining component builds multiple models from which it selects the best model based upon the objective function of the translated business task.

For the following discussion, it should be appreciated that the term "input" sometimes refers strictly to "inputs" of a data mining model, which the model uses to make predictions, as opposed to, and distinct from "outputs" or "targets" of models, which the model predicts. However, sometimes the term "input" also refers to any data a model processes, including inputs used for prediction as well as outputs, or targets, that the model predicts, because during the construction of models, data mining algorithms must process outputs, or targets, in order to learn patterns of how inputs may predict outputs or targets. Therefore, when not clear from the context, the term "input data elements" indicates that "outputs" are part of and include the input data elements to the data mining algorithm. This distinction only applies to those data mining techniques that predict an outcome, known as "supervised" techniques. In contrast, other data mining techniques, known as "unsupervised" modeling techniques, do not predict outcomes but rather extract patterns among inputs, so that these techniques process inputs but do not process any outputs or targets.

In addition, some modeling techniques can use input data elements both as inputs and as outputs. For example, this is the case with association modeling algorithms, which identify associations between data elements. For instance, when performing market basket analysis, one may search for products that customers frequently purchase together in a retail environment. In such an analysis, a given data element may serve as both an input and an output. For example, one data element may be a flag column that indicates whether a purchase transaction included the purchase of "bread." Then, the association algorithm may produce association rules in some of which bread can appear as an input and it other it may appear as an output. For instance, one rule may express that when a purchase transaction includes "bread", as a rule input, then the purchase transaction is likely to include "wine", as an output. Another rule may express that when "butter", as a rule input, is part of the transaction, then "bread" is likely to appear in the purchase transaction, as an output of the rule. Therefore, data element inputs may also simultaneously serve as inputs and outputs of the model.

The data mining services component 106 comprises a data mining algorithm library 146 and a model manager 144. The model manager 144 further comprises an automatic optimization module 148, a deployment module 173, a model execution module 174, and a performance monitoring module 171. The discussion below describes each of these modules.

The data mining algorithm library 146 is a library of data mining algorithms comprising various categorized data mining algorithms. The library categorizes algorithms by type, where some types include estimation algorithms, classification algorithms, association algorithms, and segmentation algorithms. Estimation algorithms estimate numerical outcomes, such as the price of a retail product. Classification algorithms predict categorical outcomes, such as predicting whether a borrower "will" or "will not" default on a loan. Association algorithms predict associations between items, such as whether purchase transactions that include "bread" will also include "wine." Segmentation algorithms identify clusters of similar items, such as which groups of customers are similar in their purchase behavior. The specific algorithms used may be any algorithm known in the art that will provide a model based upon data. Some algorithms known in the art include, for example, decision tree algorithms, neural networks, self-organizing maps, regressions, and any other machine learning, statistical, or data-mining algorithm. It should be appreciated that in some embodiments, a particular category of data mining algorithms may include more than one algorithm. Also, it should be appreciated that certain algorithms may be categorized into more than one type. Further, variations of a given algorithm may also be categorized into the same type, thereby providing more than one implementation of the same algorithm in a given category or type. Therefore, the program can use multiple versions of the same algorithm for solving a business task, and it may use the same algorithm for solving different types of problems. It should also be appreciated that new algorithms can be added easily to the data mining algorithm library 146 and made available for use by the data mining component 106.

Such algorithms are available from a variety of sources, including textbooks, journals and magazines, conference proceedings, web sites and blogs, open source, and commercial software licenses. These algorithms may come in various formats, such as executable binary software code, software source code, textual descriptions, mathematical formulas, spreadsheets, pseudo code, software source-code libraries, compiled binary code libraries, database packages, and others. These algorithms can then be incorporated into the program. For example, for software source code or software libraries of executable code, one can directly incorporate the algorithms in the format in which they appear, potentially after compilation, in the case of source code that one cannot execute directly via an interpreter. In other situations, it is possible to convert an algorithm in a certain format into appropriate software source code that can be incorporated into the program. For example, if an algorithm is described as text, as pseudo code, in mathematical notation, or other similar formats, software programmers can translate that information into working software code that can be incorporated into the program.

Some example sources and descriptions of algorithms that can be used in the program, include: Programming Collective Intelligence: Building Smart Web 2.0 Applications [Illustrated] (Paperback) by Toby Segaran (Author), Paperback: 360 pages, Publisher: O'Reilly Media, Inc. (Aug. 16, 2007), Language: English, ISBN-10: 0596529325, ISBN-13: 978-0596529321; AI Application Programming (Programming Series) (Paperback) by M. Tim Jones (Author), Paperback: 473 pages, Publisher: Charles River Media; 2 edition (Jun. 3, 2005), Language: English, ISBN-10: 1584504218, ISBN-13: 978-1584504214; Data Mining: Practical Machine Learning Tools and Techniques, Second Edition (Morgan Kaufmann Series in Data Management Systems) (Paperback), by Ian H. Witten (Author), Eibe Frank (Author), Paperback: 560 pages, Publisher: Morgan Kaufmann; 2 edition (Jun. 10, 2005), Language: English, ISBN-10: 0120884070, ISBN-13: 978-0120884070; Data Mining: Concepts and Techniques, Second Edition (The Morgan Kaufmann Series in Data Management Systems) (Hardcover), by Micheline Kamber Jiawei Han (Author), Hardcover: 800 pages, Publisher: Morgan Kaufmann; 2 edition (Nov. 3, 2005), Language: English, ISBN-10: 1558609016, ISBN-13: 978-1558609013; The Elements of Statistical Learning (Hardcover), by T. Hastie (Author), R. Tibshirani (Author), J. H. Friedman (Author), Hardcover: 552 pages, Publisher: Springer; Corrected edition (Jul. 30, 2003), Language: English, ISBN-10: 0387952845, ISBN-13: 978-0387952840; and Machine Learning (McGraw-Hill International Edit) (Paperback), by Thomas Mitchell (Author), Paperback: 352 pages, Publisher: McGraw Hill Higher Education; 1st edition (Oct. 1, 1997), Language: English, ISBN-10: 0071154671, ISBN-13: 978-0071154673.

Other sources include: Machine Learning, Editor-in-Chief: Foster Provost, ISSN: 0885-6125 (print version), ISSN: 1573-0565 (electronic version), Journal no. 10994, Springer US; Journal of Machine Learning Research, available electronically (ISSN 1533-7928), in print (ISSN 1532-4435) from MIT Press, and in paper volumes (ISSN 1532-4435) from Microtome Publishing. http://jmlr.csail.mit.edu/; Example Conference Proceedings; Kdd-2006: Proceedings of the Twelfth ACM Sigkdd International Conference on Knowledge Discovery and Data Mining: August 20-23, 2 (Hardcover), Hardcover: 962 pages, Publisher: Association for Computing Machinery (ACM) (January 2006), Language: English, ISBN-10: 1595933395, ISBN-13: 978-1595933393; and Advances in Data Mining—Theoretical Aspects and Applications: 7th Industrial Conference, ICDM 2007, Leipzig, Germany, Jul. 14-18, 2007, Proceedings (Lecture Notes in Computer Science) (Paperback), by Petra Perner (Editor), Paperback: 353 pages, Publisher: Springer; 1 edition (Aug. 24, 2007), Language: English, ISBN-10: 3540734341, ISBN-13: 978-3540734345.

Other sources include certain websites and blogs, such as: http://www.kdkeys.net/; http://www.kdkeys.net/forums/thread/8290.aspx; http://www.public.asu.edu/~huanliu/; and http://www.public.asu.edu/~huanliu/FSBOOK/CODE/WSBG/. Other sources include certain open source projects, such as: http://www.cs.waikato.ac.nz/ml/weka/index_top.html; http://www.r-project.org/; and http://rapid-i.com/content/view/10/32/lang,en/. And, other sources include commercially available software, such as software available from SPSS (http://www.spss.com/); SAS (http://www.sas.com/); and SALFORD SYSTEMS (http://salford-systems.com/). All of the foregoing books, journals, articles, websites, blogs, and open source projects are hereby incorporated by reference in their entirety.

The model manager 144 retrieves translated business tasks from the metadata repository 126 creates and creates, optimizes, deploys, and executes data mining models, and monitors their performance. The model manager 144 interacts with the data mining algorithm library 146, the automatic optimization module 148, the performance monitoring module 171, and the feature selection module 172 to select algorithms, build models, and optimize or select the deployed model with the overall purpose of providing the best possible solutions for a given business task. Generally, the model manager 144 is a technical data mining component that does not have the ability to interpret business tasks, and it relies instead on business task translation to receive descriptions of data mining problems it can process and solve. The model manager 144 receives requests to construct data mining models of certain types using specific data sets from the observations table. It can obtain data mining algorithms of the appropriate type from the data mining algorithm library 146, and it is able to apply such algorithms to the data specified by business task translation. The model manager 146 executes these algorithms to build various models for the given business task.

The automatic optimization module 148 builds one or more data mining models for each translated business task, and optimizes these models by selecting the best algorithm, and algorithm parameters to construct models, and selects the best subset of available inputs for use by the model. The deployment module 173 retrieves the best model available for each business task, at a given time, and deploys it for execution to solve each business task. The execution module 174 executes deployed models, supplies input data, receives output data, and makes the resulting output available for use by storing it in the analytic results repository 140. The performance monitoring module 171 evaluates the objective function of each translated business task on an ongoing basis, as the deployed model generates outputs to continuously measure model performance. As it monitors model performance, it compares the performance data to performance policies and triggers the refreshing of deployed models and continued optimization of models as required.

In operation and as described above, the task execution control module 122 will initiate the business task translation. As a result, the business task translator module 118, in connection with specifying the observations table, identifies a category or type of data mining algorithm to be used to provide a solution to the requested business task. In one embodiment, the definition of each business task also specifies the objective function that is to be optimized. In another embodiment, described below, the invention discovers an appropriate objective function automatically. The task execution control module 122 then reads the business task catalog within the business task dictionary 132 and extracts certain metadata from the algorithm metadata portion 133 of the metadata repository 126. The extracted metadata pertains to the type or category of algorithm to use for the given business task, and the types of inputs required for that category of algorithm and usable for the specific algorithm. For example, some categories of algorithms require "target" data, while other categories do not, some specific algorithms are able to process string-type inputs, such as, certain implementations of neural networks, while other algorithms may not be able to process string-type data, such as certain implementations of "ordinary least squares" (OLS) regression algorithms. This algorithm metadata is then passed to the model manager 144, which retrieves the appropriate algorithms from the data mining algorithm library 146. In another embodiment, the model manager 144 may initiate the same process based upon actively monitoring the data mining repository for translated business tasks requiring model building and optimization or refreshing. The model manager tracks the status of each translated business task to record which models it built and optimized for which translated tasks, and when each such activity occurred. The model manager stores this information in the data mining section of the metadata repository 126 and through this tracking of its activities, together with information about optimization and model refreshing policies, it is able to determine which next steps are required at which time for each translated business task.

The business task translator 118 communicates to the data mining component 106 by storing translated business tasks in the metadata repository 126. Specifically, the translated business tasks provide information about which specific source data or prepared data, available from observations tables, to use as input data elements to the modeling steps. This communication includes referencing observations table data for use in analytic processing. As described above, the data in the observations tables originates from data rows and columns directly available from source systems 108, as well as augmented data, both of which are available in prepared data in the data repository 136. It should be appreciated that in this communication between the business task translator 118 and the data mining component 106, the business context becomes somewhat disassociated with the data mining process because the work of finding the data in the context of the business task already has been performed by the business task translator 118. The business task translator 118 also identifies to the data-mining component 106 which of the data elements are inputs, which are outputs, and which serve as inputs and outputs simultaneously. For example, the monthly sales volume per item could be a column in the database that could serve as a target to build a model to predict that value and the price of each item could be an input column. As described above, columns may also serve as inputs and outputs simultaneously, for example for use with association algorithms.

Figure 17:
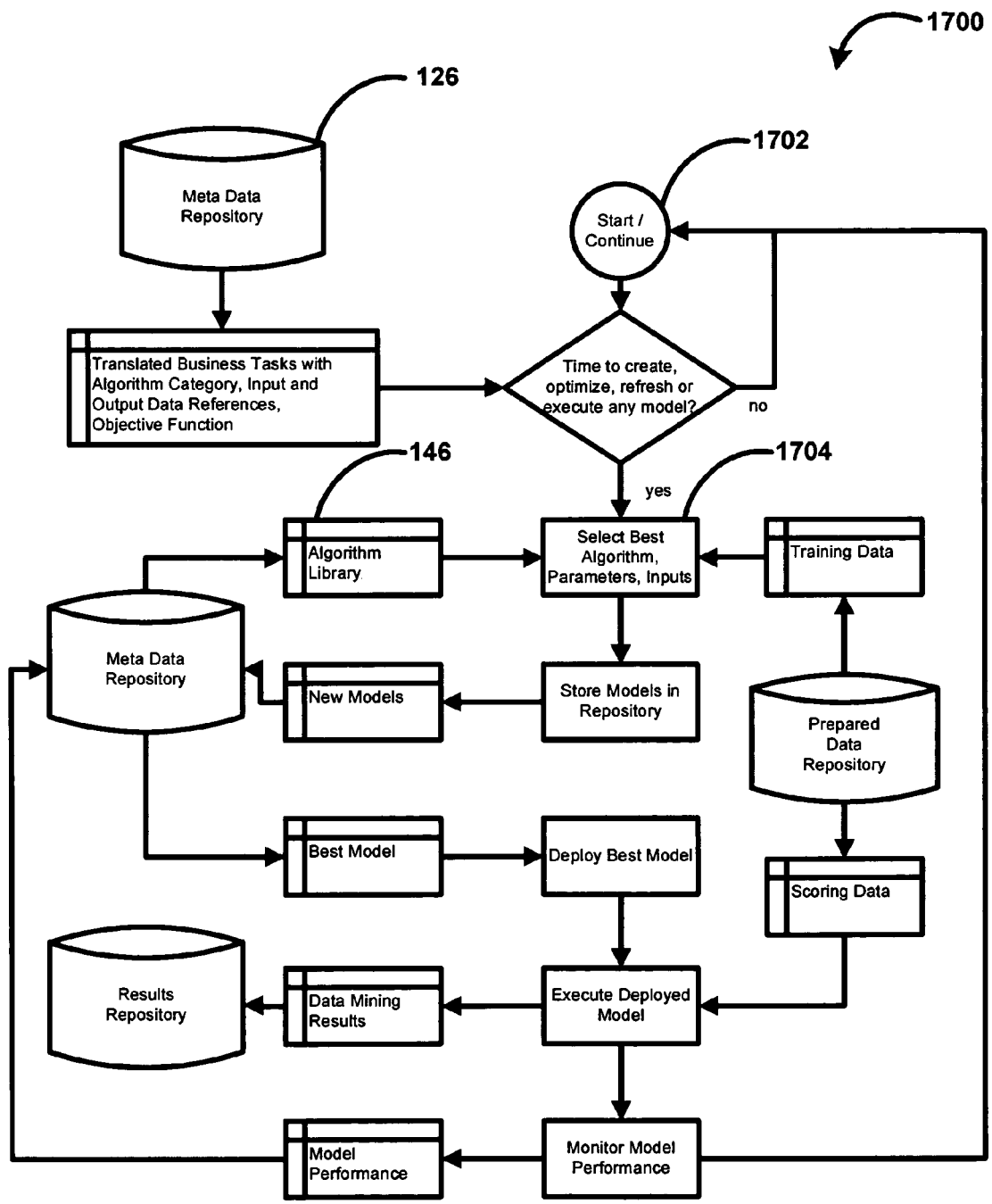
FIG. 17 is a flowchart illustrating the process performed by the model manager in one embodiment of the invention.

FIG. 17 is a flowchart illustrating the process performed by the model manager 144 in one embodiment of the invention. In this process 1700, in a first step 1702, the model manager 144 monitors the metadata repository 126 to discover translated business tasks containing specifications of the algorithm category, input and output data references, and the objective function. The model manager 144 then iterates through all translated business tasks and services them. For each translated business task, it reads data mining-related metadata to determine which if any actions it has already performed to service that translated business task. By comparing completed activities and their time stamps to model creation, optimization, refreshing and execution requirements, and policies it determines whether it is now time to create, optimize, refresh, or execute a model for this translated business task. Based on these needs, the model manager 144 performs some or all of the steps illustrated in FIG. 17.

Before discussing the steps performed by the model manager 144 it is useful to discuss some concepts and components utilized in FIG. 17. Regarding the observations table, in the context of a given translated business task, the associated observations table contains four types of columns. First, the observations table contains identifiers that identify the entity described by each row in the observations table, such as the account number or customer number of customers, as well as the date of the observation. Second, the observations table contains data elements available for use as predictive inputs to algorithms, such as recently purchased items, amounts, prices and payment methods. Third, the observations table may contain outputs or targets, such as whether the customer has made one or more additional purchases within the next 30 days following the purchase described in a given row of the observations table. And, fourth, the observations table may contain miscellaneous other data elements, not specified for use in the translated business task but potentially in use by other translated business tasks and available for use as appropriate by this translated business task and other such tasks. As described above, the developer user identifies inputs based upon business task.

The prepared data portion of the data repository 136 may contain observations tables serving one or more business tasks. For example, to translate a new business task, a developer user may utilize an existing observations table that already contains observations of interest. In the event that the new business task requires more data columns in addition to those already available from the observations table, the developer may specify to add those additional columns to the already specified observation table. The already existing business task that was already previously associated with that observations table does not require modification because all data elements it references continue to be available from the thus expanded observations table. Alternatively, the developer user may specify a second, new observation table for use with the new translated business task.

The model manager 144 obtains references to prepare as part of the translated business tasks from the metadata repository 126. By passing such a reference to data management services component 104, the model manager 144 can request various types of information and services, specific to each unit of prepared data. The invention provides such prepared data in observations tables. However, data mining algorithms generally do not process observations tables and instead typically process prepared data in the form of specific data structures containing rows and columns of certain data types. Therefore, the model manager retrieves the prepared data contained in observations tables and provides it in specific formats to various data mining algorithms, as appropriate for each specific algorithm.

The model manager 144 determines the appropriate data format for each algorithm by interpreting the metadata associated with each algorithm. For instance, data mining algorithms provided by the WEKA open source data mining tool can process JAVA data structures, whereas ORACLE data mining algorithms can process ORACLE relational data tables. By making requests to data management services, the model manager can thus obtain the prepared data in various formats, including ORACLE relational tables or views, JAVA data structures, C or C++ data structures, EXCEL spreadsheets, and other such formats.

The purpose of the automatic optimization module 148 is to find the best possible model for each translated business task, given an objective function and prepared data. By generating models, measuring their performance and optimizing models for best performance the automatic optimization module 148 allows the model manager 144 to deploy the best possible model for each business task and to execute these models to provide data mining results to the user. As described in more detail below, the automatic optimization module 148 performs optimization by applying data mining techniques to select the best algorithm, select the best parameters for the algorithm, and select the best subset of available input elements for use as model inputs. The selection of input elements is known in the art as "feature selection." As is the practice in the art, the automatic optimization module 148 provides data to each algorithm so that the algorithm can extract patterns from the data and represent them in the form of an executable model. The data that algorithms use for model construction is known in the art as "training data." The model manager 144 can then use the best model, supply new data, known in the art as "scoring data," and make predictions for the scoring data.

It should be appreciated that the term "best model" as used herein refers not to the best theoretically possible model, but rather to the best model the invention is able to construct. While it is not always practically possible to construct the theoretically best possible model for a given task, the model manager 144 uses data mining techniques to approximate the theoretically best possible model as closely as practically feasible. The same interpretation applies when referring to the "best parameters," "best subset of available inputs," or other similar uses of the term "best." However, in some cases, the model manager 144 may be able to construct the theoretically best possible models.

The automatic optimization module 148 automates evaluating quality metrics using an "objective function" that determines which model among the classes of models works best. Various technical metrics have been developed in the art in order to determine how well a model works. Metrics that the automatic optimization module 148 may use as an objective function include such metrics as the mean squared error (MSE), mean average percentage error (MAPE), lift, recall, precision, receiver operating characteristics (ROC), f-score, and other similar metrics. All of the exemplary metrics describe here above, measure various aspects of the ability of the model to make correct predictions. In addition to correctness metrics, the objective function may also consider cost, as describe, for example, in Elkan, C. (2001) "The Foundations of Cost-Sensitive Learning" in Proceedings of the Seventeenth International Joint Conference on Artificial Intelligence, pp. 973-978, which is incorporated by reference herein in its entirety.

Similarly, the objective function may also consider the amount of CPU cycles, memory, disk I/O, and other resources the algorithm has consumed to build the model, as well as the resources required to score data, such as the training data and scoring data, and the average resources required per training record and scoring record. The objective function may also specify to cross-validate the performance of the model, that is, to use multiple iterations of choosing one subset of the training data to construct the model, and to use a different subset of the training data to test model performance. This technique, which is known in the art, can help prevent "overfitting" the model to accidental patterns of noise in a particular data set that are unlikely to be present in the scoring data, which may lead to incorrect predictions.

The selection of the best model depends in large degree on the choice of objective function. For example, if the system has sufficient information to optimize for cost and the user wants to optimize for cost, then other quality metrics may be of secondary importance. In as much as known in the art, this invention also evaluates the statistical confidence level of the results and evolves models to try to achieve or exceed a user-defined or pre-set threshold confidence level.

To find the best possible model, the automatic optimization module 148 chooses various combinations of algorithm, algorithm parameters, and subsets of available inputs to develop multiple different models. For example, using even only a single regression algorithm and regression parameters, the automatic optimization module 148 can construct many different models to solve the same problem, each of the different models requiring different inputs. Similarly, the automatic optimization module 148 can use different combinations of algorithm parameter settings to construct many different models with a single algorithm and subset of input data. The same applies again to varying the subset of input data to construct different models with the same algorithm and parameters.

As the automatic optimization module 148 constructs different models it determines which of these models best solves each particular business task. The model manager 144 then compares the performance the best currently known model to the performance requirements the translated business task may specify. At any given time, the automatic optimization module 148 may or may not have discovered a model that meets such requirements specified in the translated business task. The model manager 144 component may then either continue constructing more models in the search for an appropriate model, it may use the model currently providing the best performance and indicate that the model does not meet performance requirements, or it may stop, depending on how the configuration of the translated business task and system defaults.

Figure 20:
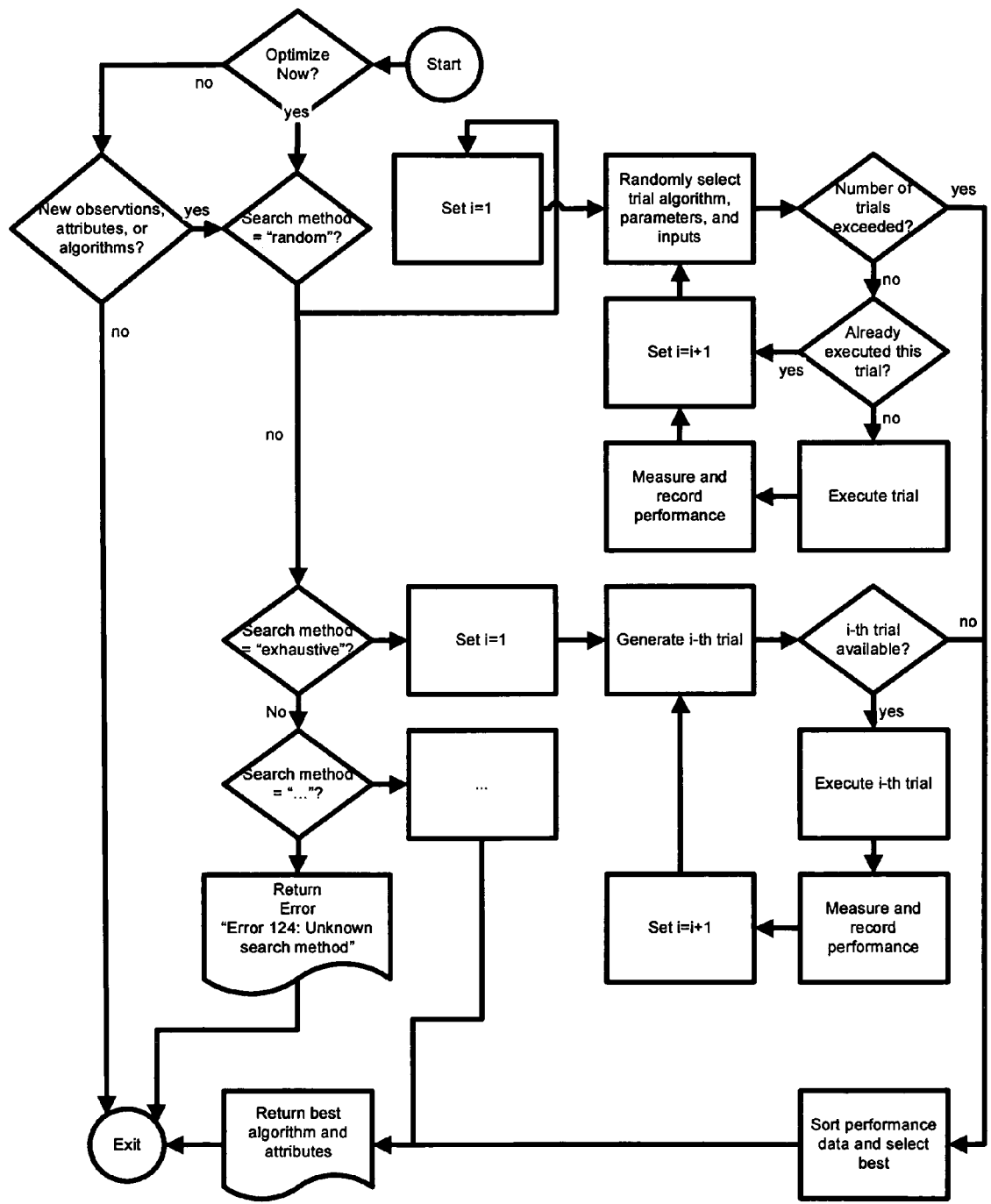
FIG. 20 is a flowchart illustrating a process to select the best algorithm according to one embodiment of the invention.

When the model manager 144 needs to create or optimize models, it uses a process to find the best possible model setup, which is described below in connection with FIG. 20. To do so, the model manager reads translated business tasks from the data mining repository, algorithms from the algorithm library 146 and training data from the prepared data portion of the data repository 136. As it builds one or more models during this search, it stores generated models ("new models") and their performance data for future use in the model repository 150. As described below, the automatic optimization module 148 can use these results to evolve the analytics models in the model repository 150. As new models are evolving, the model manager 144 adds these optimized models to the model repository 150, and these models can then be used to provide predictive results in response to a given business task. The results produced by the models are stored in the data repository 136 in the data management component 104.

Figure 18:
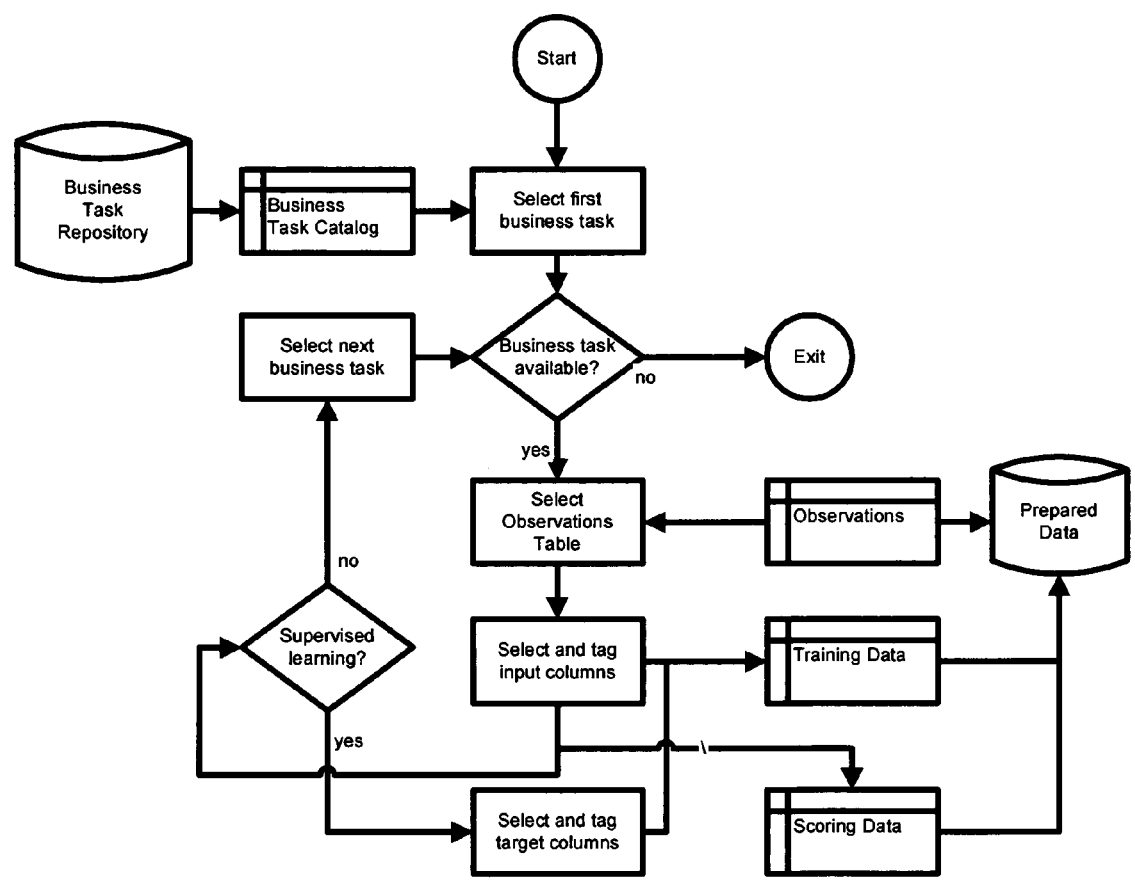
FIG. 18 is a flowchart illustrating the process for selecting data to be used by the data mining component in one embodiment of the invention.

Returning to FIG. 17, the model manager 144, in another step 1704 selects and retrieves training data from the prepared data portion of the data repository 136. FIG. 18 is a flowchart illustrating the process for selecting the training data to be used by the data mining component 106 in one embodiment of the invention.

The automatic optimization module 148 executes selected algorithms using data in the observations table that the data preparation services module 142 constructed from the prepared data. As described above, each observations table is a single table having one row of prepared data per observation, including raw data coming from the source systems 108, associated derived data, and including statistics. For example, when a customer makes purchases, raw data may include the product names, quantities and prices of the items purchased. Then, although the user's data sources 105 may not indicate how long ago the previous purchase occurred, the "recency" of the previous purchase can be calculated or derived from the source data, and such derived data would be stored in the observations table. Similarly, statistical metrics, such as the mean, standard deviation, etc., could be statistical values about the data, for example, the mean number of purchases per month made by each customer. Such statistics also represent derived data, and they would be available in the observations table, thereby being available as inputs to an algorithm.

Generally, any computational procedure that provides information based on or about the available input data may be used to prepare derived inputs. In a variation of this capability, the program can allow a user to enter other information that may be used as inputs, such as performance measurements or data from available external data sources or services, such as data from GOOGLE, YAHOO!, REUTERS, DUN & BRADSTREET CORPORATION and other similar providers. Data may also be acquired through commercial agreements, downloading data free of charge, web site scraping, or other means.

The model manager 144 retrieves the required inputs for a given algorithm from the observations table, where the columns in the observations table holding such inputs have been defined during the business translation process.

One aspect of model optimization is feature selection, that is, to determine the data elements to use for training the algorithm in building the model, which it then tests in a subsequent step. Similarly, the automatic optimization module 148 determines and optimizes which data records to use to train a model, for example, by defining a subset of observations corresponding to a specific time window. Such subsets of records may be, for instance, data from a particular year, data from a particular quarter, a subset of data such as a certain subset of customers, or a random sampling of data from a particular year or other subset of data. Then, using the trained model, the automatic optimization module 148 uses different historical data to test the model. Therefore, if the system develops a model that predicts what each customer wants to purchase, the system uses separate portions of the available data to train the model and to measure how well that model works against data.

In order to provide data to algorithms in formats that each particular algorithm can process, the model manager 144 can request information about specific data elements that are part of a unit of prepared data, such as the data type of the data element, say an ORACLE "VARCHAR(2000)," a C "long," or JAVA "String" type. Depending on algorithm requirements, the model manager 144 can then request from data management services to perform certain data type conversions, such as converting ORACLE "CHAR(2000)" into ORACLE "VARCHAR2 (2000)," or into a JAVA "String." The model manager 144 can thus analyze the types and contents of the prepared data, convert the data as needed, and feed the prepared data to various algorithms in formats appropriate for each algorithm. Naturally, limits exist as to the possible conversions, for example, it is not possible to convert a real-typed data element into an integer-typed data element without loss of information.

As new source data becomes available over time from the source systems 108, the automatic optimization module 148 obtains such data using the services provided by the data management component. Based on this new data, the automatic optimization module 148 evaluates new patterns that may emerge with respect to a given business task to further identify a better model based upon this new data. The automatic optimization module 148 accomplishes this by following the same steps it performed with the previously available data.

This is an improvement over the prior art, where once the data mining expert selects the final data mining model for use, there is no additional improvement of that model unless the data mining expert takes additional affirmative steps to reevaluate the performance of that model, all of which are time and effort intensive. In contrast, as the automatic optimization module 148 identifies a business task for which the best model is not performing as well as desired, the automatic optimization module 148 will likely find a better model than the model previously identified as the best model. For example, as new information becomes available to solve a business task, the automatic optimization module 148 may improve the model by including new inputs or by manipulating algorithm parameters. Alternatively, a different algorithm may be selected as the basis for multiple new models that can be further compared to the existing best model for a given business task.

Figure 19:
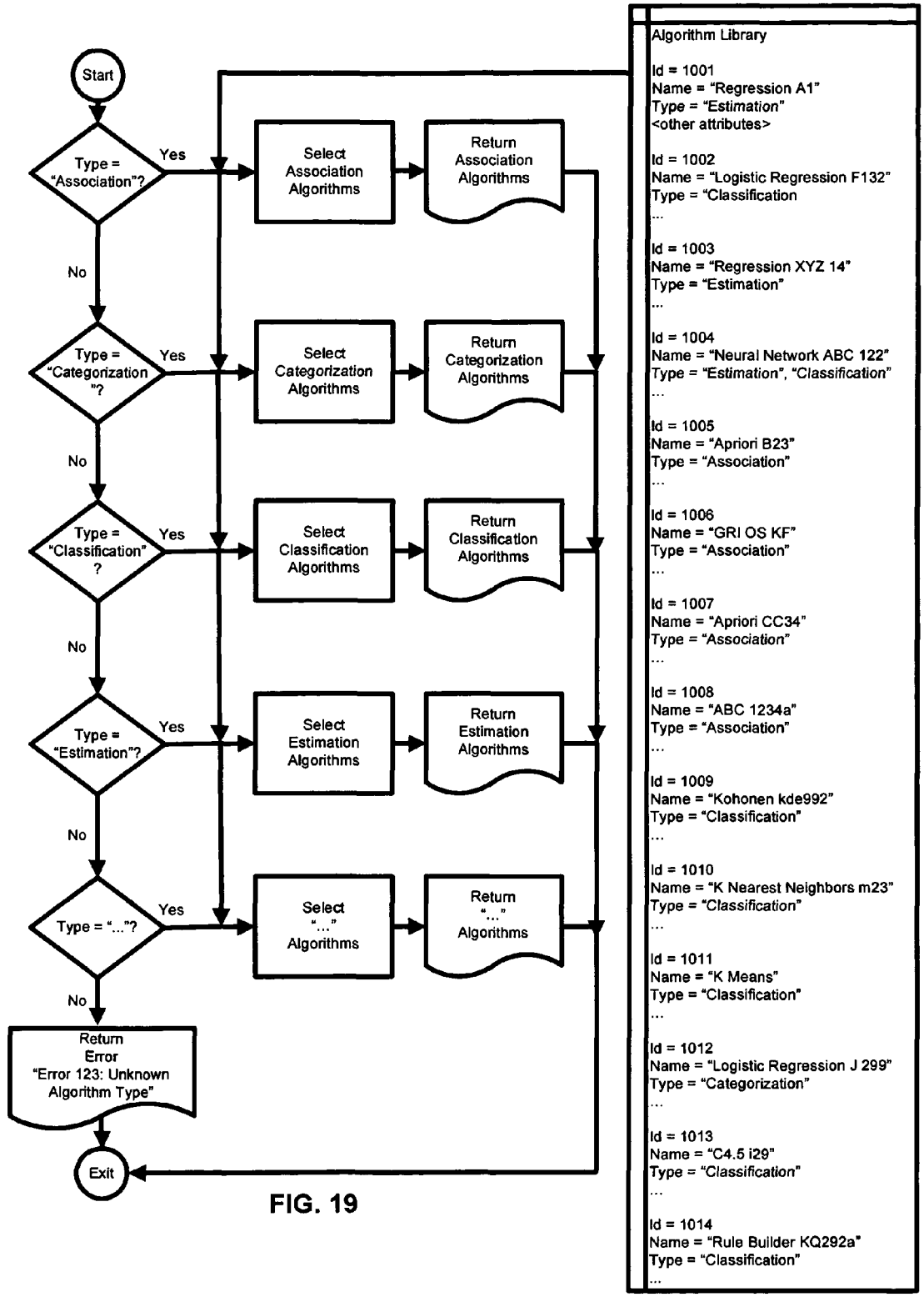
FIG. 19 is a flowchart illustrating the process of selecting algorithms from the algorithm library in one embodiment of the invention.

In addition, the model manager 144 in another step matches the algorithms in the algorithm library 146 with the selected category or type of algorithm identified during translation of the business task. FIG. 19 is a flowchart illustrating the process of selecting algorithms from the data mining algorithm library 146 for use by the model manager 144 to construct models in response to the business task in one embodiment of the invention. As shown, in a first step 1902, the model manager 144 determines, based upon the algorithm type specified in the algorithm metadata, if the algorithm type is "association." If it is, then in a next step 1904, the model manager 144 retrieves each algorithm having an attribute of "association" from the data mining algorithm library 146. When the model manager selects and returns an algorithm, it passes a reference to a function that implements that algorithm for use and dereference in further processing. That is, after receiving a reference to a returned algorithm the model manager can subsequently execute that algorithm, using that reference. If the algorithm type specified by the algorithm metadata is not "association," then in a next step 1906, the model manager 144 will determine if the algorithm type is "categorization." If it is, then the model manager 144 will execute steps similar to those described here in connection with the "association" type of algorithm to retrieve the algorithms categorized as "categorization." Similarly, the model manager 144 will proceed in this way through each algorithm type until it has identified all applicable algorithms for use. It should be appreciated that new types of algorithms can be added to the program and easily incorporated into the process of FIG. 19.

Returning to FIG. 17, the model manager 144 proceeds to construct various alternative models for each translated business task, and optimizes these models by selecting the best algorithm, algorithm parameters and subset of available input elements and records. FIG. 20 is a flowchart illustrating a process in which the model manager 144 via the automatic optimization module 148 selects the best algorithm, algorithm parameters, and subset of inputs according to one embodiment of the invention. More specifically, automatic optimization module 148 selects the best algorithm, parameters for that algorithm, and input data elements, as all of those aspects, together with the training data, determine the training setup for the resulting model. However, note that some algorithms contain an element of randomness, for example, neural networks are typically "seeded" with random weights at the beginning of the model building process, and so, even with a fixed setup of specific algorithm, parameters, and input data elements, one may obtain functionally different models when using the same setup multiple times to build a model. Again, it should be appreciated that the model manager 144 utilizes the automatic optimization module 148 to automate the process of building models and determining whether a newly built model is better than previously built models.

Generally, the automatic optimization module 148 automates the process of continuously improving a solution or finding the best model that provides a solution for a given business task by continually building multiple models based on multiple algorithms. Each time the automatic optimization module 148 builds a new model, either based on the same algorithm as a previously built model but with different inputs or parameters or based upon a different algorithm, the results of that new model are compared to the existing best model. If the automatic optimization module 148 determines that the new model is better, based upon the performance criteria or objective function selected by the user or by the program for the user, then the new model becomes the best existing model and subsequently built models will be compared to it until a better model is identified. Therefore, as time progresses, the model used to solve a particular business task will be optimized.

With regard to optimizing algorithm and algorithm parameters, it should be appreciated that very different data mining algorithms may be used to solve a given business task. Frequently, for example, regression, neural network, and support vector machines models can all solve the same data mining problem. Further, each algorithm may use certain inputs; however, depending upon data available from the user's data sources 105, which ultimately become available in an observations table, the inputs used in the best model change as new, better models emerge through the model optimization process. For example, a new best model may not utilize all of the inputs the previous best model used, and it may use additional inputs. As new data elements may become available in the observations table from time to time, a new best model may also use inputs that were not available when the automatic optimization module 148 constructed the previous best model.

The model manager 144 uses various techniques for changing selections of algorithms, algorithm parameters, and subsets of input data elements for each successive model building operation. The model manager 144 first determines a subset of algorithms that match the algorithm category required for a given business task. Then, in order to select a specific algorithm, the model manager 144 can use simple techniques, such as iterating through all applicable algorithms or randomly selecting one of the applicable algorithms. Similarly, the model manager 144 may use default orderings of algorithms based on knowledge of the developer user, or knowledge known in the art, of which algorithms typically perform better than other algorithms, in terms of the correctness and effectiveness, as well as cost of different algorithms. For example, evaluations of various algorithms is contained in: Rich Caruana and Nikolaos Karampatziakis and Ainur Yessenalina, "An Empirical Evaluation of Supervised Learning in High Dimensions", ICML, 2008, pp 96-103, http://doi.acm.org/10.1145/1390156.1390169, DBLP: conf/icm1/2008, DBLP, http://dblp.uni-trier.de, which is incorporated by reference herein.

The model manager 144 can also track statistics about how algorithms perform in use during the operation of the invention, and try better performing algorithms earlier and more frequently than algorithms that perform more poorly, as it builds many models in the search of the best possible model. The model manager 144 stores such statistics in the meta data repository 126, with the help of data management services component 104. The model manager 144 can also track and utilize statistics about the performance of various algorithms within the scope of searching for the best algorithm for a specific business task, in addition to statistics considering algorithm selection across multiple business tasks, and external information known to the developer user or known in the art.

As the model manager 144 builds various trial models with different algorithms, it generates data about each algorithm and about how well it performs. For example, data about each algorithm includes the name of the algorithm, which organization or entity developed the algorithm, such as Stanford University, and which entity developed the software code that implements the algorithm, such as SPSS Inc. Further, the model manager 144 tracks information about the size of the software program that implements the algorithm, the nature and number of known limitations of defects ("bugs") of the algorithm, how many columns of data the algorithm can process, which types of data elements, such as numeric or string type, the algorithm can process. The model manager 144 also tracks how the algorithm has performed on benchmark tasks, the amount of CPU cycles, memory, disk I/O and other resources the algorithm has consumed on benchmark tasks, or in the operation in the invention, when the algorithm software code was developed, and other similar information about each algorithm. The model manager 144 also keeps information about specialized data mining techniques known in the art that some algorithms may implement, while other do not, such as whether each algorithm performs "bagging," "boosting," "input data normalization," and internal conversion of string data into numerical data.

Similarly, the model manager 144 has at its disposal information the nature of the task for which it is building a model, such as the number of input data elements, the number of observations, the age of observations, the type of input data elements (e.g., string or numerical). Other such data includes, the statistical distributions of each input variable, the number and distribution of missing input values ("NULLs"), the number, size, and distribution over time of outliers, the industry using the business task, such as "retail" or "manufacturing," and a multitude of other similar data about the nature of the business task and its associated data.

The model manager 144 can then employ its data mining capabilities to build models that predict which algorithm is best suited to solve a given task. For example, it may learn that those data mining algorithms that can process string-type data may have advantages over those that cannot, when the available input data elements contain string-type data. Similarly, it may learn that a given decision tree algorithm that performs boosting may outperform a similar algorithm that does not perform boosting. Naturally, complex patterns may exist between the characteristics of the algorithms, the characteristics of the business tasks and their data, and the performance of specific algorithms for specific tasks. In summary, the model manager 144 uses data mining to select algorithms by assembling information about algorithms and the task at hand as model inputs, and information about the performance of algorithms as outputs. Further, the techniques that the model manager 144 employs to search for the best model for a business task, such as exhaustive search, random search, genetic algorithms, simulated annealing, and other such techniques also apply to the search for the best algorithm.

In other words, the model manager 144 builds models of which algorithm would likely perform best for a given task, and select algorithms with good predicted performance to build trial models for solving business tasks. Then, in a separate operation but using the same general set of techniques, the model manager 144 uses those selected algorithms to build models that best solve a given business task, such as predicting churn, or cross selling or up selling opportunities. In a first operation, the model manager 144 uses information and observations about algorithms to predict the performance of algorithms, and in the second operation, it uses information and observations about business tasks, such as customer information to solve business tasks, such as predicting customer churn.

In addition, the automatic optimization module 148 may also alter certain parameters each algorithm utilizes. By altering the inputs to an algorithm and by altering the parameters for that algorithm, better models can be derived. For example, in neural networks, parameters indicating the momentum, learning rate $\eta$, and other similar parameters affect how the neural network algorithm operates to construct models. By altering the momentum for a given set of inputs, a better model based upon a neural network algorithm may be identified. Conventionally, a human data mining expert would run the various algorithms and then select a best algorithm, which can be a time-intensive, complex process and does not allow for the subsequent selection of a different algorithm that may more effectively model patterns in newly available data. The program of the present invention addresses these limitations by allowing the inputs and parameters to be changed, thereby automatically continuing to monitor model performance and select better models.

The model manager 144 uses data mining techniques also to set the parameters for a selected data mining algorithm, and to select subsets of available inputs. For example, a given neural network algorithm may provide, say, twelve tuning parameters for a neural network algorithm, including parameters such as "alpha," "initial eta," "high eta," "eta decay," "low eta," "number of layers," "number of nodes in each layer," "persistence," and others. The model manager 144 can then use simulated annealing to optimize these parameters and then vary their values, initially varying them by large amounts, and then varying them by smaller amounts, as performed by the simulated annealing algorithm known in the art. Similarly, a genetic algorithm may also create "genomes" of parameter settings, have these compete in "tournaments" and "breed" better and better generations of parameter settings by using genetic operations, such as mutation and crossover, as performed by genetic algorithms known in the art. One skilled in the art would be able to define and implement the required operations for techniques such as simulated annealing and genetic algorithms. For example, the allowed range for the "alpha" parameter for a given neural network parameter may be real values between 0.0 and 1.0 and the default parameter value may be 0.9. Simulated annealing may then vary "alpha" initially by, say 15% in each step, and then reduce the rate of change gradually to, say 0.01%. Similarly, the "mutation" operation required for implementing a genetic algorithm for parameter optimization could set the "alpha" parameter to a random value between 0.0 and 1.0. The cross over operation of the genetic algorithm could select two "parent genome" parameter settings, and apply some of the parameter settings, including, say, the setting for "alpha" from the first parent, and apply the remaining settings including, say, the "persistence" parameter, from the second parent.

The model manager 144 uses feature selection to select subsets of available inputs for use in data mining models the model manager builds. It is useful to apply feature selection because one can frequently build better models faster when using a subset of high-value inputs as opposed to using all available inputs. The feature selection module 172 interacts with the model manager 144 to apply feature selection techniques known in the art to determine which inputs are going to be most useful to solve a business task. In other words, selecting useful inputs from among a set of potential inputs is known as "feature selection."

The inputs available for mining include inputs that come directly from source systems, referred to as "raw inputs," inputs that the invention derived from these raw inputs, referred to as "derived inputs, and inputs that the invention derived from statistical and longitudinal analyses of raw inputs, referred to here as "statistics." As mentioned above, the business task translator 118 determines the set of all available inputs for optimization, such as raw source data, derived inputs and statistics needed to perform an analytic task for a business task. As described above, "derived inputs and statistics" refers to inputs that do not come directly from the user's data sources 105 but which the data management component calculates from the user's data sources 105. All of this information may be used in the feature selection process.

Many techniques for feature selection are known in the art. For example one survey of such techniques is provided by "Feature Selection Algorithms: A Survey and Experimental Evaluation", L C Molina, L Belanche, A Nebot, Data Mining, 2002. ICDM 2002. Proceedings. 2002 IEEE International Conference on (2002), pp. 306-313, which is incorporated by reference herein in its entirety. The feature selection module 172 in coordination with the model manager 144 will select subsets of data from the observations table to be used as inputs to a given algorithm. Through the use of different methods of feature selection, and through the use of different parameters of certain feature selection methods, the automatic optimization module 148 can provide different subsets of available input data elements to a given algorithm, and thereby generate different models from that algorithm.

The use of feature selection goes beyond the prior art as it applies machine learning or data mining to learn which feature selection methods work best for a given business task, based on the characteristics of the available data, characteristics of the context in which the program is deployed, and based on other relevant data. For example, a specific feature selection method that uses, say, Spearman's rank correlation coefficient (Spearman's ρ) may work better than another feature selection method for business task "A" in retail deployments of this invention. In contrast, another feature selection method that uses, say, Kendall's tau rank correlation coefficient (Kendall's t) may work better than other feature selection methods for business task "B" in manufacturing deployments of this invention.

A variety of complex factors may affect the best choice of feature selection method and the use of machine learning or data mining can help discover complex relationships that affect the best choice.

Finally, the model manager 144 can apply data mining capabilities it provides for solving business tasks to select a subset of available data elements as inputs to the model it is building. That is, the model manager 144 builds models that perform "feature selection" for use by a different set of models that solve the given business task. In order to find the best selection of business task inputs as inputs to the model to solve a business task, the model manager 144 must represent each selection of inputs for business task models as a set of inputs to the feature selection model.

For doing so, the model manager 144 represents each business task input as a flag-type input for the feature selection model that can take two possible values, "on" or "off". If the feature selection value is "on" the corresponding business task input is used, whereas, it is "off" the business task model does not use the corresponding input. The model manager thus constructs a feature selection model that takes as inputs a set of flags to represent the business task inputs. Using these flag inputs, the model manager can then build a feature model that predicts which business task inputs it should next use to build a business task model.

In this supervised learning task, the output that the feature selection learns to predict is which combination of flag values will lead to which level of performance of the business task model. The model manager 144 builds multiple business task models with different selections of business task inputs, and measures the performance of each combination of inputs, to generate appropriate training data for the feature selection model. For instance, the model manager 144 might generate two sets of input combinations, say, one set of one thousand combinations, and one set of one million different combinations of inputs. It would then build one thousand models using the input combinations corresponding to the first set. Next, it would build a model using performance data from the one thousand models it constructed as training data. Finally, it would score the second set of one million input combinations to predict which of these would most likely lead to the best business task model. The model manager 144 may execute this sequence of steps repeatedly to identify the best possible selections of inputs to the business task model. The model manager 144 also applies other data mining techniques, such as genetic algorithms and simulated-annealing, to generate promising combinations of available inputs, thus performing feature selection.

For example, the model manager 144 may build a decision tree model to determine which of a set of one thousand available inputs it should use to build the best possible business task model to predict churn for mobile phone service contracts. For this business task, there may be "interactions" between multiple business task inputs. For instance, models may benefit from using both the price per payment period and the duration of each payment period, but it may be less beneficial to use only one of these two inputs without the other. That is, knowing the contract price is either $29.99 per month or $349.99 per year may be beneficial, but knowing only that the price is $29.99 or $349.99 without knowing the duration of the billing period may be less beneficial. In building a the decision tree model for feature selection, the model manager 144 may learn that if it uses only one of the inputs the performance of the business task model could be predicted to be lower than if it uses both inputs together. Similarly, a decision tree feature selection model may learn that if the business task model uses the social security number as an input, performance in terms of correctness of predictions may be not be better than without this input, but the cost of building such a model may be greater than without this input. Of course, this example about the social security number not being useful but costly for predicting churn assumes that the social security number is generally random and does not contribute useful information to the business task, which may or may be true in practice.

The selection of algorithms, algorithm parameters and model inputs generally exhibits interdependencies in that algorithm parameters that apply to one algorithm may not apply to another algorithm. For instance, "momentum" may apply to a given neural network algorithm, while not applying to another regression algorithm. Similarly, the selection of the most beneficial inputs generally depends on the algorithm into which these inputs feed. For instance, a string-valued input may be beneficial to a neural network algorithm that can process string-valued inputs, while not being beneficial to another neural network algorithm or regression algorithm, which cannot process string-valued inputs. However, inputs also have different degrees of predictive value, independent of the algorithm choice. For instance, the input "price of service contract" may generally have higher value than the input "social security number of subscriber", when predicting the risk of mobile phone service contracts churning.

Because of this complex interdependency between the selection of algorithms, algorithm parameters and inputs, the model manager uses various strategies when it makes these selections. For instance, one such strategy is to by performing a feature selection technique known in the art to estimate the predictive value of all available inputs. Then, the model manager selects those inputs with the highest estimated value for further processing. Following this step, the model manager 144 selects a specific algorithm, and predicts which further subset of the previously determined subset of available inputs would likely be most valuable when using that algorithm, thus producing a second, smaller subset of inputs. Finally, the model manager 144 optimizes the parameters of that algorithm for this second subset of inputs. The model manager 144 then uses the resulting selection of an algorithm, a subset of inputs and specific parameter settings for this algorithm to build a model and measure its performance. After this, the model manager 144 proceeds to the next iteration of model building where it uses again the first subset of high-value inputs, but potentially a different algorithm, a different smaller subset of inputs and different parameter settings. The model manager 144 can also use different selection strategies, such as selecting the algorithm first, followed by selecting algorithm parameters, and then performing only one feature selection step. Similarly, the model manager 144 can perform general feature selection independent of the algorithm and then select an algorithm and its parameters, which may lead to passing some inputs to the algorithm.

In order to build new models efficiently, with the goal to find models with better performance than the current best model, the model manager 144 uses various other techniques for evolving models. One simple technique is to generate models randomly, based on random selections among the algorithms of the appropriate type, random settings of their parameters, and randomly selected subsets of the available inputs as inputs to the algorithm. Another simple method of evolving models is to iterate through all algorithms, parameter settings and subsets of inputs. Other, more sophisticated methods for evolving better models are "greedy" hill-climbing, genetic algorithms, and simulated annealing.

As discussed above, not only the models themselves, but also extensive information about the models, and about how the model manager 144 derived and evolved them are stored in the model repository 150. Such model information includes, but is not limited to, the type and version of the modeling algorithm used to create the model, the time consumed for training, the data used for training and validation, and inputs used.

Importantly, information stored about each model also includes how each model was derived from precursor models. For instance, the automatic optimization module 148 may construct one model, by using a certain method of selecting an algorithm and its parameters, adding or deleting inputs relative to a previously built model. The model manager 144 records the method it applies to select these specific changes, such as applying a genetic algorithm, performing feature selection, randomly varying model parameters, specific heuristics for selecting inputs and algorithms, and other similar methods for evolving models. Similarly, the model repository 150 also stores, information about the context in which it built each model. Context information includes, but is not limited to the identification of the installation of this invention, metadata about that installation, such as industry vertical, date of installation, various measures of the size of the installation, the business task for which the model was built, statistical aspects about the available input and target data columns, and so forth.

Generally, the model repository 150 stores any information that can be captured and that may affect the best choice and configuration of a model for a given business task. That is, the model repository 150 provides a complete record, or trace about the details of each model, the evolution history that led to the creation of each model, and the context in which the model was built. Such information about the evolution history and context of each model allows for the application of data mining to learn which model building and evolution strategies lead to the best models in each specific context. Therefore, the model repository 150 stores vast and broad amounts of information about models and the modeling process. Some or all of this information may be stored in Predictive Model Markup Language (PMML), XML, relational database tables, or other formats.

Once a given set of inputs and parameters are selected for a given algorithm, a model can be generated. Thereafter, the objective function is used to measure the performance or quality of each model and to ultimately select the best model. In other words, as models are generated they are compared based upon the selected objective function to the previous best model.

The model manager 144 can also provide deployable software code for models that other components of the program may embed into other applications. For example, while the model manager 144 may run on a server computer in a data center, it may generate software code that can be embedded into programmable integrated circuits for deployment into certain electronic devices.

In one embodiment, all software components of the invention are deployed as software code that executes on Windows server computers, running the Windows Server 2008 operating system. As the model manager 144 builds and deploys a model, it generates software code that can execute on such a Windows server computer, and the model manager 144 can conveniently execute these deployed models to service data scoring requests. In another embodiment, some of the software components of the invention execute in the Windows environment as above, but models must be deployed into automobiles to make predictions about the risk of breakdown of various parts of the automobile. Other electronic components in the automobile can then take advantage of these predictions to adjust the various settings that control the operation of the automobile, to alert the driver via dashboard signals and displays, or to suggest or schedule maintenance. For example, in response to risk predictions made by a model, the vehicle might limit the speed of the vehicle, prevent starting the engine, or take other measures to protect the security of the driver and passengers.

After the model manager 144 constructs an appropriate model, the model will be deployed by "ECU flashing", that is, storing, or reprogramming executable code that represents the model in Electronic Control Units (ECUs). Such a deployment may require that deployed models do not exceed a certain size of executable code, say 1K byte, and it may require that the software be compiled into a certain type of executable binary code, such as certain types of assembler or machine code. To accomplish this, the invention imposes limits on the algorithms that the model manager may use to build models and on the size of the models generated. In such a scenario, the model manager 144 uses only algorithms that can produce models in the usable languages or in formats that it can convert to those languages. The model builder then uses the appropriate algorithms, generates executable models in the appropriate language, measures the size of the executable code that implements each model, and discards those models that are too large in terms of the size of the associated executable code.

The model manager 144 then selects the best model meeting all requirements and having the best performance, and facilitates deployment of the best model by making the executable representation of the model available in the model repository. The delivery services component can then retrieve the executable and provide it to a third party software system for deployment into automobiles. In this manner, the invention also supports other similar applications with model deployment needs into electronic devices, other than automobiles.

When the model manager 144 needs to deploy models, it reads models and their performance data from the data mining repository 150, selects the model with the best performance characteristics, including objective function and cost, and deploys this best model.

The model manager 144 also applies existing models to new data to obtain analytic results, such as categorizations, estimations, and classifications. When the model manager 144 needs to score data, it reads the scoring data from the prepared data portion of the data repository 136, applies it to the deployed model, and stores results in the analytic results repository 140.

As described above, in order to provide the best possible results, the model manager 144 also builds new models and compares their performance to the performance of the currently best known or deployed model. If it finds a better model it replaces the previous best model with the new model. When the model manager 144 receives a request to score data or to execute the deployed model to evaluate data, it uses the currently best or deployed model at the time of servicing the request. The model manager 144 may also build new models continuously, as computing resources are available, or on a schedule, depending on user preferences.

The invention uses performance monitoring to track how the performance of models changes over time during the ongoing use of models, after they have been deployed, which is similar to but distinct from evaluating model performance during the construction and selection of models. Monitoring the performance of deployed models is beneficial because it is known that processes about which one wishes to make predictions change over time, thus leading to a risk that models that initial perform well may deteriorate in performance over time. For instance, a model that predicts the behavior of online shoppers may change from season to season, or from a period general economic prosperity to a period of recession, or as the online shopping site changes. Such changes and associated deterioration of model performance is known as "concept drift" in the art.

The performance monitoring module 171 interacts with the model manager 144 to evaluate the performance of data mining models using techniques known in the art and based on various performance metrics for data mining models known in the art. For instance, surveys and evaluates techniques for measuring the performance of models include Rich Caruana, Alexandru Niculescu-Mizil, "Data Mining in Metric Space: An Empirical Analysis of Supervised Learning Performance Criteria", Proceedings of the tenth ACM SIGKDD international conference on Knowledge discovery and data mining, 1-58113-888-1, Seattle, Wash., USA, pp 69-78, 2004, http://doi.acm.org/10.1145/1014052.1014063, ACM, which is incorporated by reference herein in its entirety.

Note that the performance monitoring module 171 is different from monitoring performed by the monitoring component 168 within the administrative services component 112, which is described further below. However, the administrative services component 112 provides information that allows the performance monitoring module 171 to provide valuable results, such as information about the cost of the model in terms of time, CPU cycles, and I/O operations the system required to extract certain data from source systems, to compute derived inputs and statistics, or to build specific models."

The model manager 144 periodically tracks and records the performance of each model by updating and tracking the performance metrics, such as each time it builds a new model, scores a new row of data, scores a new batch of multiple data rows, or on a pre-determined periodic schedule. The model manager uses data management services to store and preserve this information for future reference, such as, when it compares the performance of various alternative models for a given business task.

In addition to measuring the degree to which each model makes correct predictions, the model manager also takes into account the cost of building and executing models, using data that the monitoring component 168 provides, as described above. Different objective function may differ in whether and how they consider correctness and cost of various models. Similarly, the model manager 144 may evaluate performance using an objective function that considers the correctness of predictions, and then consider the cost of building each model as a secondary criterion, which may lead to different preferences for models that exhibit similar performance with regard to correctness of predictions.

When the model manager 144 needs to monitor model performance, it analyzes the performance of recently scored data and historical performance information for the deployed model. The model manager 144 compares this performance data to the performance of other alternative models that are available from the data mining Repository. The model manager 144 also retrieves and interprets default and custom policies for model refreshing and triggers model refreshing as needed. When the model manager 144 refreshes a model, it applies the same algorithm, parameters and input data elements to build a new model, but it uses more recent observations than were available when it built the currently deployed model. Because new data is now available, the model manager 144 may also optimize the model further, by building alternative models with potentially different algorithms, parameters and subsets of available inputs, again applying newly available observations, potentially in addition to older, previously available observations.

Figure 21:
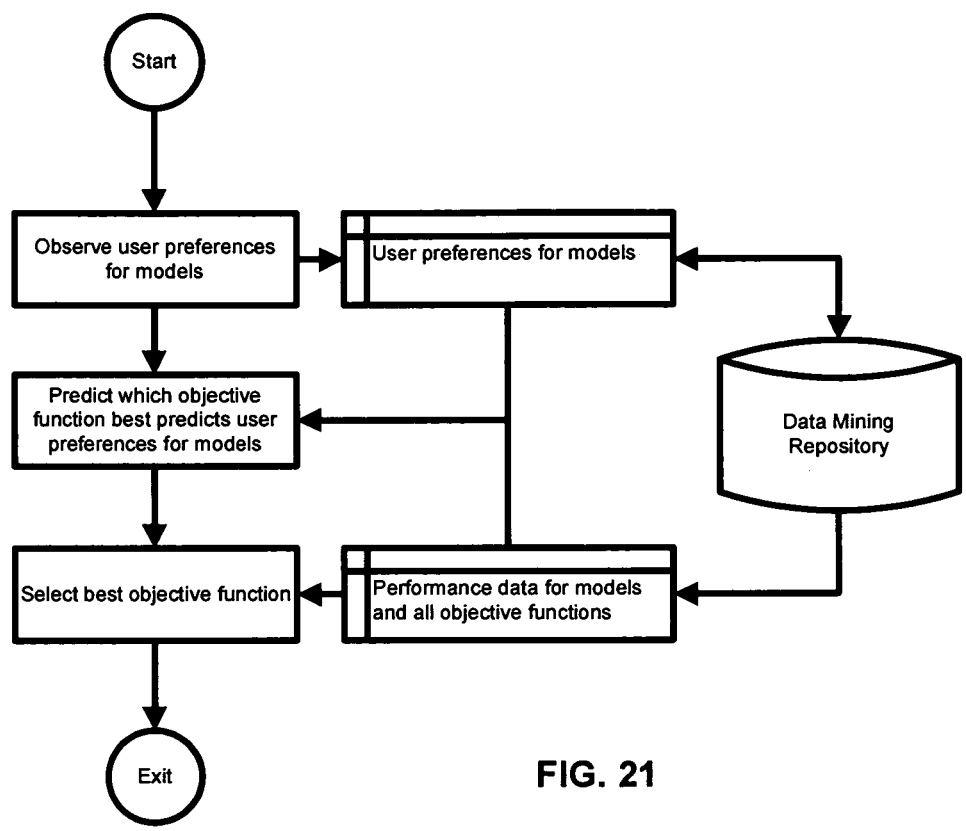
FIG. 21 is a flowchart illustrating a process for selecting the objective function according to one embodiment of the invention.

FIG. 21 is a flowchart illustrating a process for selecting the objective function according to one embodiment of the invention. One of the components of a business task as configured by the developer user is the objective function that the model manager is to use for optimization of the model that solves the business task. In one embodiment, the user selects a specific predefined objective function, or even a custom, potentially complex objective function consisting of a combination of performance and cost metrics, which may require that the user specify exact weightings of these metrics. However, since one of the objectives of the program is to limit the amount of information needed from a user, while still being able to produce the best results, another embodiment of the program avoids having the user specify any objective function. Instead, the program is able to determine automatically the best objective function using a composite quality metric (CQM) to determine model quality.

The model manager 144 learns appropriate metric weights for a given business task as follows. The system offers two or more models for the business task and allows the user to select one of these alternative models as preferred. The user may make multiple preference selection steps, choosing one model from a set of alternative models in each such step. Different selection steps may concern entirely different sets of models, identical sets of models, or some of the same models that the model manager 144 offered in a different preference selection step. That is, any combination of models for a given business task is possible in each selection step.

Figure 22:
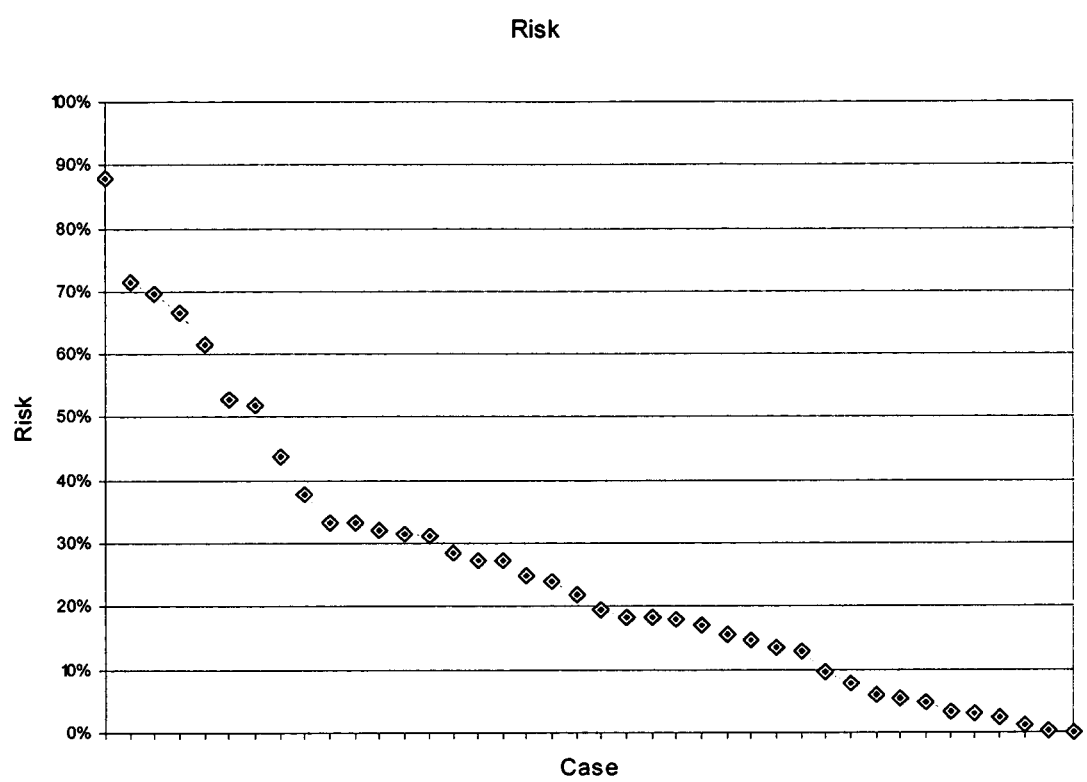
FIG. 22 illustrates example business solution data according to one embodiment of the invention.

The following illustrates in further detail how the Model Manager presents alternative model choices to the user, to allow the user to consider characteristics of alternative models, and to select that model, which the user most prefers. User preferences are determined as the system presents solutions to a user and a user selects a preferred solution based on the user's preferences, such as business strategy. The predictive system asks the user which model is preferred, for example, by showing business solution data such as that depicted in FIGS. 22, 23, and 24. In the example of FIGS. 22, 23, and 24, model 1 favors precision while model 2 favors recall, as described below in more detail.

FIG. 22 depicts an example of various types of data relating to different business solution scenarios that are presented to a user to allow a user to select a preferred scenario. Each scenario provides a user with model performance characteristics and metrics to assist a user in evaluating a model. To illustrate how users can select preferred models, consider the following two alternative models depicted in FIG. 22, both of which assess the risk of a defect becoming escalated, the risk of a service call being reopened, the risk of an automobile incurring a warranty claim, or some other similar risk.

Generally, different models may assess risk differently for each case. However, for this simple example, assume both models assess risk for each case similarly as shown below. FIG. 22 depicts the risk for each model graphically in the graph. As shown, the highest-risk case has a risk of just below 90%, the next most risky case has a risk of just over 70% and so on. Assume that model M1 predicts that cases with a risk over 65% are "positive predictions," meaning that it predicts a "positive" outcome for such cases so that the risk will occur. In contrast, model M2 uses a threshold risk of 20%. These two models represent different trade-offs between precision and recall. Precision is the ratio of true positive predictions to positive predictions, and recall is the ratio of true positive predictions to positive cases. Model M1 favors precision, whereas model M2 favors recall.

The "table of confusion" in FIG. 23 illustrates the coincidence of positive and negative predictions with positive and negative cases. Note that the numbers given are greater than the number of cases shown in the above line chart. This table and the precision and recall calculations given below in the scenario summaries shown in FIG. 24 illustrate that model M1 is more efficient as it provides for a higher precision and a higher rate of 97.6% of the positive predictions are positive cases, as compared to 90% for model M2. However, model M1 is less effective, as it provides for a lower recall of 15%, compared to a recall of 71.4% for model M2. Based on such information, a user can select a preferred model from among two or more alternative models.

In the particular example of FIG. 24, suppose a new user wants to discover which of their service calls that come into their call center have a high risk of getting reopened or escalated. Initially, the program does not know how to judge the quality of a given model. Therefore, the program performs analytic processes such as those described above and allows the user to select a preferred business solution. For example, if a user wants to look at service calls to figure out which service calls have risks of becoming escalated, the invention could present the performance of two different models to the user in the form of scenario summaries or model summaries that are easily understood by a non-expert user.

Next, suppose an engineering manager has 5,000 defects logged against a particular product, and the manager wants to push the product out to the market as soon as possible. However, the time to market must be balanced with the shipping of a high-quality product (i.e., a product with as few bugs as possible, with the most risky ones preferably being resolved before it is shipped). Therefore, the engineering manager must make a trade-off between the time-to-market and the quality of the product.

FIG. 22 shows visually the effects of these two scenarios. The first scenario only has a small number of bugs to fix, shown as r1 in graph 300. The first scenario has, on the X axis, only a small number of bugs to fix, and on the Y axis, the escalation risk of each bug is high. The first scenario has one bug close to 90% risk, and a small number of bugs around 70% risk. With regard to this first scenario, metrics are provided in FIG. 24 via a scenario summary 304 that indicates that by fixing a small number of high-risk bugs the ratio of prevented escalation to bugs fixed is very high, i.e., a high precision of 97.6%. However, the first scenario also has a lower recall, meaning the percentage of actual escalation prevented in this case is only 42 out of 280 or 15%.

Thus, if time to ship is more important to the engineering manager, the engineering manager may select the first model that indicates that 43 bugs can be fixed with a high precision. However, if quality is more important and the engineer has the option to select the second model, the engineer can select the second alternative model which indicates that 200 escalations can be prevented by fixing 220 bugs.

So, in this example, the first model favors precision and has a lower recall, and the second model has a higher recall but lower precision. This is a technical way of saying that for the first model, the engineer would be required to do less work to get the product to market faster, but there will be more problems with the product long term based on the lower quality thereby incurring possibly higher costs to support the product. The opposite is true for the second model.

Depending on which model the business user selects, that particular selection by the user will tie into the automatic optimization processes with the choice of metrics used to evaluate the model. That is, by monitoring user selections, for example, if the user selects the first scenario, the system can infer that the user values precision over recall and can learn to put a higher weight on the precision metric and lower weight on the recall metric. The model manager accomplishes this using data mining techniques, as described below.

This particular manner of providing solutions allows a business user to easily determine how many bugs would have to be fixed to prevent a certain number of escalations. Of course, it will be appreciated that various parameters and metrics can be presented to a business user depending on the particular business task being solved. Such as bar charts of true positives vs. false positives, scatter plots of actual numerical outcomes vs. predicted estimated outcomes, lists of values of performance metrics, and the like.

Any combination of FIGS. 22, 23, and 24, and other similar information can be presented to a user. These figures illustrate one example of information that is presented to a user so that the user may make such a selection based on any or all of the information presented here. Scenario summaries shown in FIG. 24 including the numbers of bugs to fix and escalations prevented may appeal to more business-oriented users rather than technical users, the table of confusion in FIG. 23 may appeal to users of slightly more technical inclination, and the graph in FIG. 22 may appeal to users that are more technical as well.

Other similar methods of evaluating models and presenting model evaluation data to the user may also be used. For instance, Rich Caruana surveys and evaluates techniques for measuring the performance of models: Rich Caruana, Alexandru Niculescu-Mizil, "Data mining in metric space: an empirical analysis of supervised learning performance criteria", Proceedings of the tenth ACM SIGKDD international conference on Knowledge discovery and data mining, 1-58113-888-1, Seattle, Wash., USA, pp 69-78, 2004, http://doi.acm.org/10.1145/1014052.1014063, ACM]. Further, see Rich Caruana and Nikolaos Karampatziakis and Ainur Yessenalina, "An empirical evaluation of supervised learning in high dimensions", ICML, 2008, pp 96-103, http://doi.acm.org/10.1145/1390156.1390169, DBLP: conf/icml/2008, DBLP, http://dblp.uni-trier.de. Similarly, Zhu and Xingquan provide some presentation techniques using tabulated model performance data in: Zhu, Xingquan (2007), Knowledge Discovery and Data Mining: Challenges and Realities, IGI Global, pp. 114-138. Soukup and Davidson present visual data mining techniques in: T. Soukup, I. Davidson, Visual Data Mining: Techniques and Tools for Data Visualization and Mining, John Wiley and Sons, Inc., 2002, each of the foregoing being incorporated by reference herein in their entireties.

The CQM is a performance metric that the model manager 144 uses to discover objective functions that approximate user preferences for alternative models. Using the CQM, the model manager 144 can do so even for the most undeveloped circumstances where developer users may know little or nothing about the user's preferences for various objective functions.

The CQM is a linear combination of different quality metrics and calculates a weighted average across all of those metrics. The CQM assumes that a larger weighted average is indicative of a better model, and if required, quality metrics are transformed and normalized, so that larger values indicate higher model quality. However, as indicated above, in some applications, certain quality metrics may be more important than others. For example, for some business tasks, the lift may be more important, while in other business tasks, the recall may be more important. The program also automates the process of finding the best weighting, which results in the best CQM definition for a specific application.

In one embodiment, the automation process begins by using a default composite metric where each quality metric is normalized to a range of 0 to 1 and CQM is defined as follows and can be applied to a given model:

$$CQM_i = \sum_{i=1}^{n} w_i * q_i \text{ with } \sum_{i=1}^{n} w_i = 1; q_i \in [0 \ldots 1] \text{ initially, } w_i = \frac{1}{n}$$

where
  qi=quality metric
  wi=weight
  n=number of metrics.

The initial CQM starts by assigning each quality metric, qi, equal weight, wi. Each wi may be set to 1/n initially, or other simple or more sophisticated default settings are also possible.

The program then modifies the weightings for each quality metric in order to determine, implicitly or explicitly, which weighting best represents the observed user preferences for model results. That is, the program adjusts wi according to observed user preferences. The system observes user preferences for alternative sets of results, which have been generated by alternative models, and each model is associated with a set of performance metrics. Therefore, the system can learn patterns of how user preferences correspond to preferences for weighted performance metrics. By learning which specific weighting scheme best matches user preferences, the system learns to optimize weighting to optimally match, represent and predict user preferences. Different models may then best match user needs, based on different choices for the weights, wi. The system observes which models are preferred by the user. The system uses machine learning techniques to optimize the best choice of wi based on user preferences as discussed below.

When the user selects one of a set of n models, in one model selection step, the model manager 144 records this selection by setting the variable "preference" to 1 for the selected model and setting "preference" to 0 for all other n−1 alternative models that the user did not prefer.

Given a set of results from one or more model selection steps, the model manager 144 then creates a table for the business task representing all preferences for models the user has specified for that business task. For example, if the user performed two preference selection steps, choosing as preferred model 1 from among models 1, 2, and 3 in the first selection, and choosing model 4 from among models 2, 3, 4, and 5 in the second selection step, then the Preferences Table contains the data as shown in FIG. 24A.

In order to accommodate changing user preferences, the model manager 144 applies an adjustable limit to the age or number of recent model preference selections to use for weight optimization. For example, the model manager 144 may only consider the last 20 recorded user preferences for alternative models, or it may only consider user preferences recorded within the last 90 days. This process can then continue to operate in order to adjust system performance to ongoing changes in user preferences.

The model manager 144 then adds additional columns to represent the performance metric values it has recorded for each model. For simplicity, in this example, we consider only two performance metrics, "precision" and "recall." These values are shown in the Performance Table in FIG. 24B.

The model manager 144 then applies a technique known in the art as "optimization" to this table to find appropriate weights that let the model manager 144 approximate the observed user preferences. For example, optimization is described in: Programming Collective Intelligence: Building Smart Web 2.0 Applications [ILLUSTRATED] (Paperback) by Toby Segaran (Author), Paperback: 360 pages, Publisher: O'Reilly Media, Inc. (Aug. 16, 2007), Language: English, ISBN-10: 0596529325, ISBN-13: 978-0596529321, which is incorporated by reference herein in its entirety.

To apply optimization, the model manager 144 performs the following steps. The model manager 144 defines the cost function required for optimization as follows, where represents the $i^{th}$ row in the above table and j represents the $j^{th}$ performance metric. That is, for the above example i would run from 1 to 7 to iterate through all rows, and j would run from 1 to 2 to iterate through the metrics:

$$c = \sum_{i \ in \ rows} \text{abs}\left(p_i - \sum_{j \ in \ metrics} w_j * m_{i,j}\right)$$

For the above example, i would run from 1 to 7 to iterate through all rows, and j would run from 1 to 2 to iterate through the metrics. For example, for the above exemplary performance table, $p_5=0$ because the users preference for row 5 is 0, $w_1$ is the weight for the performance metric "precision", which the model manager 144 optimizes, and $m_{3,2}=0.75$ because the value of the second performance metric "recall" in row 3 is 0.75.

After applying optimization to the performance table and the above cost function, the model manager 144 obtains values for the weights that approximate the user preferences for models, expressed in terms of CQM. After applying optimization to the cost function, the optimization module normalizes the discovered weights, as needed, to total 1.0 to ensure that values originating from CQM calculations across different optimizations are comparable. The model manager 144 then applies the weights to the CQM and uses the resulting function as the objective function for the business task. To find the best model for the business task, the model manager 144 then computes the CQM with the weights it discovered through optimization, and selects that model as the best model, which receives the highest CQM score. Thus, the choice of the best model approximates the patterns observed from the user's model preferences, and allows the model manager 144 to approximate the user's model preferences, based on the measured performance of each model.

In alternative embodiments, the model manager 144 allows the user to select multiple models, to rank models in order of preference, and the model manager 144 can apply the optimization technique described above essentially without modification. In addition, when multiple users perform model preference selections for the same business task, the model manager 144 can also pool observations across users and perform optimization to learn an appropriate weighting. For example, if multiple users of INTUIT QUICKBOOKS ACCOUNTANT in different and potentially unrelated organizations use the business task "predict churn", the model manager 144 learns weights from any of these users who select preferred models, and apply the resulting weighting to select the best model even for users who never expressed any model preferences. Thus, all users benefit from the preferences that some of the users express, without the need of an expert or developer user to define the objective function for the business task.

In one embodiment, the CQM for different models for solving the same business task can be ranked and used to display which model results should be presented first to the user. If user preferences are fairly consistent or otherwise predictable or learnable, then over time, the CQM approximate user preference and will thus present the model most likely to be selected as preferred by a user. However, if a user selects another model that is ranked lower in CQM than the first one presented, this is an indication to the system that user preferences indicate that the CQM weightings should be recalculated, and the models should possibly be re-ranked. Thus, over time, the model manager 144 will tend to discover CQM weightings that best approximate user preferences.

In an alternative embodiment, model quality and model characteristics are defined in the form of rules, directives, or other such methods that administrators or users set up, rather than by learning the weights of a model quality metric through user interactions with a GUI. Similarly, rules, directives, or other such methods can also be learned from observing user preferences for models with specific characteristics. For example, when the program observes that users preferentially choose models with high precision over models with high recall, automatic optimization 148 can learn to select the best model through the directive "maximize precision". This means that the user is interested in models that exhibit best performance as measured with the performance metric "precision" as opposed to other, alternative performance metrics. For a discussion of model performance metrics, see, for example, Caruana and Zhu as cited above. Similarly, automatic optimization 148 may learn a rule, such as "if cost data available then maximize ROI, else maximize precision."

As described above, the invention selects algorithms, algorithm parameters and inputs to maximize the objective function, and the user can either specify the objective function directly, or the model manager 144 can discover the objective function using CQM and Optimization. Generally, the automatic optimization module 148 optimizes six aspects of data management and data mining. These are data selection aspects, such as source system selection, data cleansing, and data integration strategies; algorithm selection and algorithm parameters setting; inputs selection, including raw source data, derived inputs, and statistics; selection of training and test data sets; objective function discovery; and methods, strategies, and heuristics used for model optimization.

Delivery Services Component

The data management component 104 stores and provides access to modeling results in the analytic results repository 140. The analytic results stored in the analytic results repository 140 are made available to the customer through the end user interface 120 that in turn communicates with delivery services component 110 to deliver the results in the user requested format. Various different methods of accessing results are provided by the invention, such as using a graphical user interface (GUI), a relational database (RDBMS), a file system, an electronic data interchange (EDI), web services, and other similar methods.

The delivery services component 110 fetches and prepares data for access by the user via the end user interface 120 in the business services component 102. Importantly, the delivery services component 110 allows the results of predictive analysis from the data mining services component 106 to easily feed into and affect a user's business processes in an automated, plug-in like fashion. This interface allows the user's business process to adjust immediately based upon the predictive results. For example, a retail management system could use the delivery services component 110 to interface predictive results (e.g., a suggestion to sell certain products in combination) and automatically implement that suggestion into the retail management processes. Similarly, as a CRM system displays information about a subscriber at a call center, the CRM system could import predictive results using the delivery services 110 about the risk that this particular subscriber will escalate a call, or the opportunity for up-selling and cross-selling specific items as determined by the data-mining component 106. This interaction could occur in real-time to enable a CRM system customer-service representative to engage in up selling and cross-selling and retention activities to prevent an escalation or to prevent churning.

The delivery services component 110 comprises a user access module 154 and a delivery services module 152 that handles end-user requests for analytic results from the analytic results repository 140. It should be appreciated that the delivery services component 110 is a general delivery capability that allows the results to be provided to a user, including an external system. The delivery services module 152 provides various data delivery implementations such as, but not limited to, email, web services, direct database access, open-database connectivity (ODBC), and the like. For example, the delivery services component 110 interacts with the user access module 154 that interfaces with the end user interface 120 to service requests from a user to view the data or analytic results.

However, a customer could access the delivery services component 110 via a separate web browser interface or separate network interface. In one embodiment, the end user interface 120 could be a web client GUI, a client application GUI, or any interface that allows a third party customer to access results from any location. The predictive, statistical, analytical, data mining, data management, and other results of the invention can be presented to the end user in various ways such as tables, graphs, numerical results, text-based descriptions of the results, images, and the like.

In another embodiment, the delivery services component 110 could interface programmatically or via a relational database containing the results. For example, the user could have a CRM system and the invention as separate applications. In one embodiment, end user interface 120 may then represent a delivery interface that is part of a standard CRM application so that, for example, when call center representatives open their portal, the churn risk is readily visible on a display. To accomplish this, the delivery services component 110 could write results data into a results table in a database. For example, one results table may have the label "churn risk" and would provide the identification of specific cases having various levels of churn risk. After the invention writes results to the results table, the CRM application would then read the results from the "churn risk" table. That is, the CRM system could read the churn risks from a relational database that the invention populates.

Alternatively, to accomplish the integration with the CRM application, the delivery services component 110 could offer results through an application-programming interface (API) and the source CRM application could use the API to embedded API calls to the invention into the CRM application software, and thus serve the user interface of the CRM application. To accomplish this, the CRM system could offer configurable "hooks" that an administrator could set up to read churn risk data via an API call that the invention offers via its API. With the API integration method, the invention could compute results online, store results in memory, in a relational database, or provide results in some other appropriate fashion, and the underlying method providing results would be transparent to the CRM application. The foregoing would also apply to systems other than CRM systems, as described earlier.

In another embodiment, the delivery services component 110 delivers predictive results to customers via various messaging technologies, such as, but not limited to, email, alerts, instant messaging, text messaging, and the like. For example, the delivery services component 110 can deliver identifications of customers with high churn risk to a sales manager.

In yet another embodiment, users can obtain useful analytic information from the invention via embedded devices, such as a semiconductor chip, an electronic control unit (ECU), or similar device. Such devices might embed into a stationary or mobile device, such as an airplane, automobile, engine, complex machinery, electromechanical device, cell phone, and the like. The embedded electronic device is also one embodiment of a data source 105 that can provide performance data to the data management component 104, which the data-mining component 106 can use for analytics processing, such as predicting the risk of a specific component breaking down or for predicting other events, quantities and other concepts. In one embodiment, the data delivery services component 110 can send results through interrupt calls to the embedded device. The embedded device could then display the results on a panel or interface of the stationary or mobile device.

Additionally, the invention can support other non-predictive analytic solutions. Based on analytic results, the user could take an appropriate action to take advantage of the information. For example, an owner or operator of a device, machine or other equipment, could initiate communication with another service for repair or maintenance. Alternatively, the invention might automatically take such as action. For example, the invention might make a call to a central service station at the same time as the delivery to the stationary device to automate the notification of repair or maintenance.

Administrative Services Component

The administrative services component 112 generally provides various administrative functions relative to operation of the invention. This component 112 includes a scheduler 156, a licensing management module 158, an administrator user interface 160, a policy management module 162, a messaging module 164, a logging module 166, a monitoring module 168, and a debugging module 170.

The scheduler 156 enables different components of the invention to function on a given schedule. For example, the scheduler 156 can be responsible for periodically executing the data acquisition services 134 to extract data from a CRM system to create a longitudinal history of data. Alternately, the data extraction can execute upon invoking triggers on data changes in the source CRM system.

The scheduler 156 also schedules data mining tasks performed by the data-mining component 106 on a given schedule. For example, the scheduler 156 could schedule certain types of business tasks, such as determining the risk of customers churning, the opportunity for product combination offers, etc., on a fixed schedule, such as hourly, daily, weekly, or any other schedule. In addition, accessing of information and business tasks can also occur on a more ad hoc or reactive basis if preferred for a given implementation. For example, the reactive mode could activate based on triggers, such as changes or events in a source database. A source data update could trigger an update to the data repository 136, which could then trigger a refresh of the predictions generated by data mining component 106, which could also trigger a search for models with improved performance.

The licensing management module 158 interacts with the configuration wizard 114 of business services component 102 to identify the license data required from a customer in order to activate the license of a product. The license management module 158 also monitors the use of the invention over time to ensure that a license is active anytime the predictive system is engaged for a particular customer.

The administrator user interface 160 allows administrative users to access the administrative services component 112 and gain access to more detailed analytic functionalities of the invention, such as the ability to fine-tune the system, troubleshoot defects in the functions of the systems, investigate bugs, and keep the system safe from errors that users might make. For example, an advanced user with specialized training in a customer organization may obtain access to the administrator user interface 160, thereby providing that user with the ability to exercise some of the more advanced functionalities of the invention. In a typical case, an administrator of the invention would be able to gain access to all the details related to a particular customer, such as inspecting raw data in the data repository 136 and/or metadata repository 126. The administrator might also gain access to logs generated by the data-mining component 106 that contain information, such as actions performed, identifications of the models and model types used and/or generated by the data-mining component 106, along with other administrative information such as date, time, and originating user, process, component, and module.

The policy management module 162 defines roles for various different types of users and assigns privileges and access levels for different types of users. For example, a call center may provide a specific customer service representative access to only a specific result from the invention, such as the churn risk of a particular subscriber on the representative's monitor. Whereas, a sales manager may also be able to see predictions of churn risk for multiple subscribers at the same time, call volume of a sales team, and revenue from successful up-selling and cross-selling.

The messaging module 164 helps the components of the invention send, receive, and interpret messages between the different components. The messaging module 164 also enables the system to be more scalable. For example, where many servers are running multiple instances of the data-mining component 106, each instance of the data-mining component 106 could fetch any existing request for, the data-mining component 106 to build new models and make new predictions. Since mining data can be very computationally intensive and I/O intensive, the invention might need to read, write and statistically process large amounts of data. Thus, it would be advantageous to enable multiple instances of the data-mining component 106 at the same time. The messaging module 164 can coordinate the communication of all of these instances with a single data management component 104 through messaging capabilities.

For example, in one embodiment, the major components of the invention communicate over a system bus with requests that have identifiers. The system bus allows the major components to listen for requests to which they subscribe and to respond to those requests via the bus. For example, with multiple instances of data mining component 106, the messaging component 164 would coordinate requests pertaining to multiple business processes that utilize the multiple instances of data mining component 106. Multiple instances of other components of the architecture 100, such as data management component 104, or other components, are also possible. In each case, the messaging component would receive and route messages among components and modules, and perform load balancing when multiple instances of components or modules are available but might provide different performance levels.

The logging module 166 enables the different components of the invention to generate and interpret logs. For example, logging could occur on three levels: 1) log exceptions, 2) log critical task details, and 3) detailed state and trace logs. Other level groupings are also possible. An administrator can set various verbosity levels for the logging through the administrator user interface 160, and based on the verbosity level, the logging module 166 can log different details. Usually, the data management component 104 would store the log data; however, part of the log data could reside in the file system of the operating system, a relational database, XML database, or other database. This method of logging would serve as a fallback, should a failure happen on any component of the invention. For example, if the whole system crashes, an administrator may need to review the files in the file system to discover the cause. Therefore, if the data management component 104 is not available, for example, due to a malfunction or a networking problem, the other components will be able to log their activity.

The monitoring module 168 monitors the activity of the different components. As mentioned above, there can be multiple processes running at the same time and multiple instances of each of those processes running at the same time. The monitoring module 168 looks at a process being executed, tracks starting times of processes, the sequence in which processes were executed, and tracks end times of processes, as well as what tasks were processed and performance of the system in absolute terms or relative to business goals, benchmarks, or other systems. Thus, the monitoring component 168 tracks, at a macro-level, statistics such as execution times and completion status of different processes and jobs in the system, and it provides a ledger of processes that are presently running, that have executed in the past, and that are scheduled to execute in the near future or within other time frame. Accordingly, the monitoring component 168 monitors the processes rather than the components or modules themselves, which the logging module 166 tracks on a more granular level.

The debugging module 170 allows an administrator or advanced user to interface with software debuggers using the administrator user interface 160. The analytic debugger has knowledge about the process of accessing, preparing, mining data to solve business tasks, and deploying such solutions. Based on this knowledge, the analytic debugger provides advanced debugging services, such as tracing an analytic result all the way back to various source system data items. With a debugger, an administrator can trace the execution of the various processes within the invention and examine the contents of the memory and storage to understand where bugs are coming from and where problems could have originated. The debugger module 170 is supported by of the logs generated by the logging module 166 and/or the monitoring module 168 that trace what each component has been doing, at what time, and how they interacted with each other. For example, the data-mining component 106 could write into a log that it requested data from data management component 104 with a certain time stamp, what data it requested, and an identification of the business task whose execution was the reason for requesting the data.

Typical debugger functionality displays the computer code on a screen, and it highlights a certain line in the code that is currently executing and then provides the ability to step through the code to see which line in the code is executing. When there is execution of a procedure call, the user could step into that call or step through the call. The user could set break points at certain lines in the computer code and have the system run until it hits that break point. When combined with the components of the present invention, however, the debugging module 170 allows a user to step through the log of the execution system, business task, an individual business task step, or through the source code of the system to review how they interact and how each of the steps in a business task are executing. For example, when a user debugs the execution of a business task "predict churn" to predict the risk of subscribers cancelling their subscription, the user might find that the invention incorrectly executed an incorrect model for cross and up selling instead of the correct model for predicting churn. The invention would support such investigations by displaying the identification of the business task executing and the associations of specific models with business tasks. Similarly, the user might find that the invention incorrectly used data records for building a model that it should not use for this purpose, such as data records that the invention should only use for testing the model. The invention would support such investigations by displaying row identifications of data records that feed into the model building process, as well as information about which data records the business task reserved for training and testing models. For example, the business task might reserve data from the year 2007 for training and data from 2008 for testing, and the user might then find that the invention incorrectly used data from 2008 for training a model. Another example is a situation where a business task forbids the use of certain data attributes for modeling, such as the use of the customer social security number for predicting churn, when the business task did not specify this attribute as a legal predictor. In these examples, the invention supports debugging in a fashion that improves over the current art by interpreting the invention's actions in the context of information about business tasks and data mining technology.

One aspect of the invention is that all of the components of the invention provide traceability to their actions in various different ways provided by the logging module 166, the monitoring module 168, and the debugging module 170. The administrative user interface 160 allows a user to view the activities of the invention in various different ways. For example, it allows viewing logs created and managed by the logging module 166, and monitoring the ongoing execution of the system. It further allows reviewing historical performance of the system, as provided and managed by the monitoring module 168. In addition, it provides debugging capabilities through the debugging module 170 to trace how requests flow through the system, and how the system generates data. An administrator could therefore monitor every step at a high or detailed level, as he or she could follow the details of the execution of a model, storage of data in the data management services component, or a message sent to a particular CRM application.

Example

The following is an example of one embodiment of the invention. Specifically, the following example describes execution of the program to predict churn for QUICKBOOKS, specifically QUICKBOOKS PREMIER ACCOUNTANT EDITION 2009. This example refers to the following figures. An integration embodiment is describe in FIG. 2. Another alternative integration embodiment is described in FIG. 4. A flow chart for the first embodiment is described in FIG. 3. A flow chart for the other alternative embodiment is described in FIG. 5. QUICKBOOKS screenshots are provided in FIGS. 25 and 26. Metadata is described in FIGS. 26A through 26H. Source data content is described in FIGS. 27 through 32.

Figure 25:
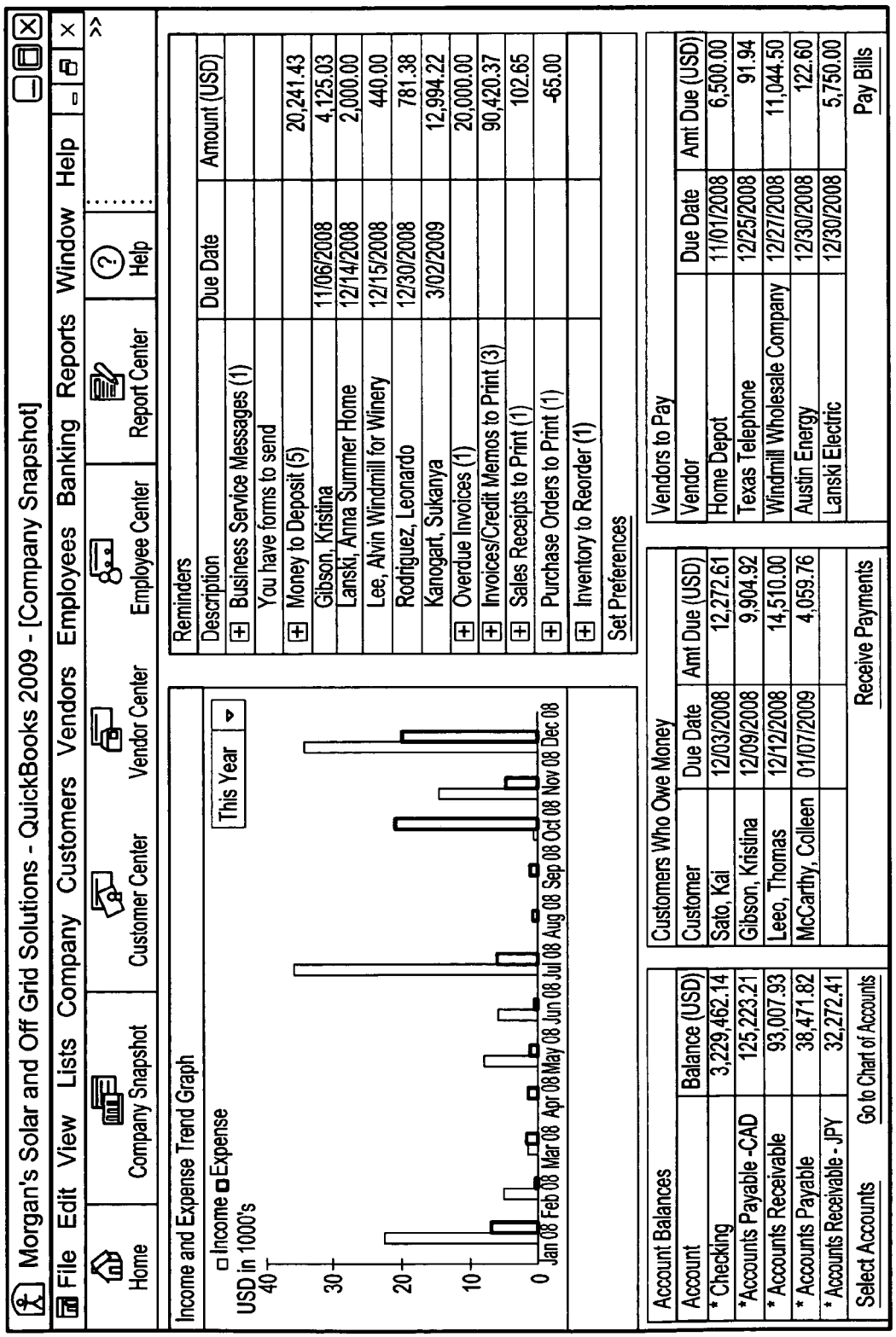
FIG. 25 is a screen shot that shows a QUICKBOOKS user interface for "Keep customer contact and transaction information," illustrating how QUICKBOOKS manages customer information related to cancellations or "churn;"

FIG. 25 is a screen shot that shows a QUICKBOOKS user interface for "Keep customer contact and transaction information," illustrating how QUICKBOOKS manages customer information related to cancellations or "churn".

Figure 26:
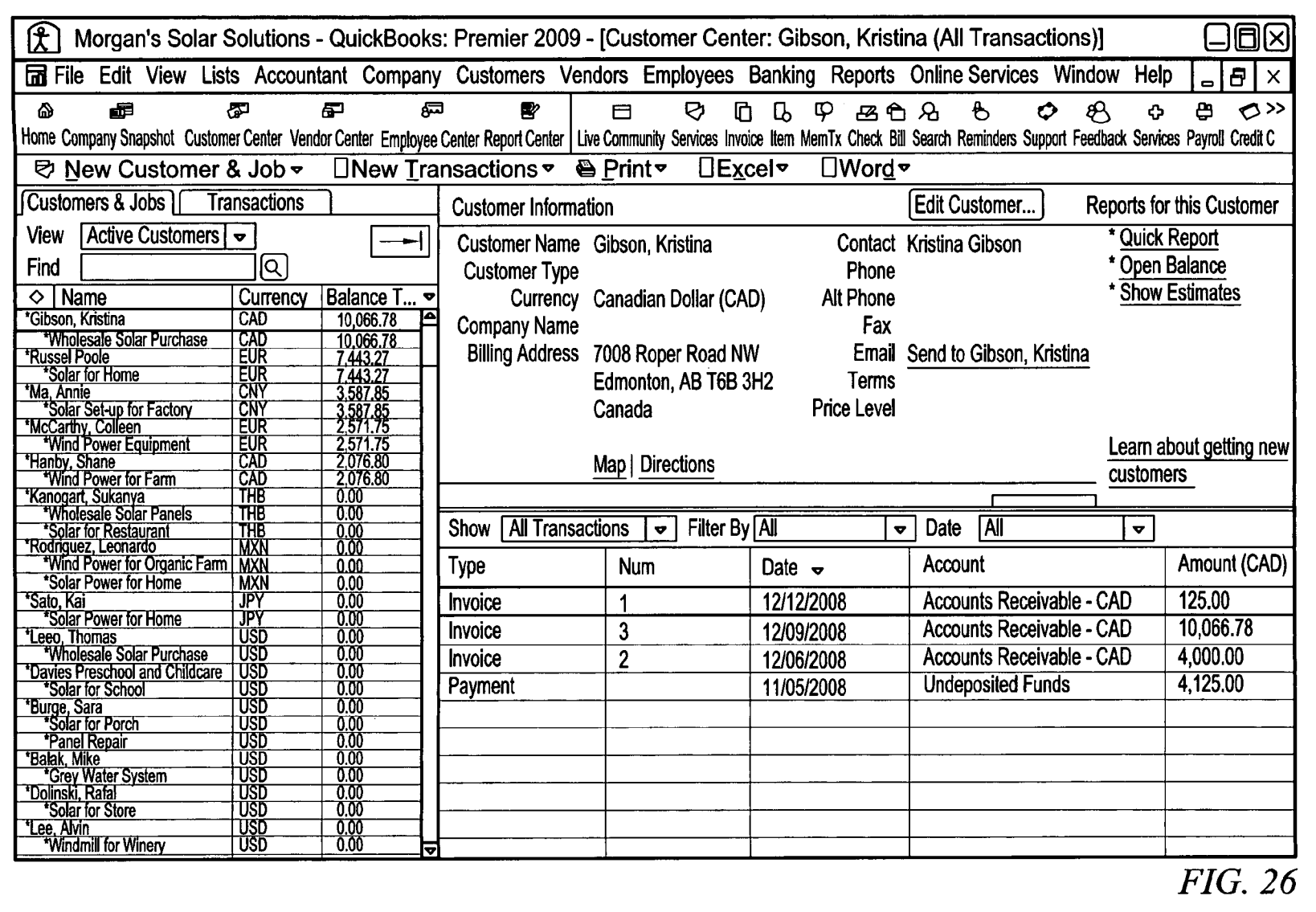

FIG. 26 is a screen shot that shows how QUICKBOOKS tracks information for monitoring business performance, including the tracking of which customers owe money and when and how often they pay invoices late.

Two types of users of the invention include a "developer-user," who uses the invention to integrate new analytic capabilities with a third-party platform, and an "end user," who uses the analytics capabilities in conjunction with the platform. With the example of QUICKBOOKS used here, the developer-user would create a churn-risk estimation capability for QUICKBOOKS. The end user would use QUICKBOOKS to manage their accounting business, and they would use the churn-risk estimation capability to understand the risk of each of their customers canceling their subscription to the end user's accounting services, that is, the risk of "churning." The end user could then take steps to prevent churn, by offering discounts, free services, communicating proactively with at-risk customers, or other similar measures.

In this example, a developer-user of the invention prepares an embodiment of the invention for the QUICKBOOKS platform. After integrating the invention embodiment into QUICKBOOKS, Intuit provides the QUICKBOOKS software, which is now enhanced with the invention, to the end user. The end user then installs the software in his or her business environment. On a day-to-day basis, QUICKBOOKS stores the transactional data of the business, such as customer information, details of contracts from customers, payments and time of the payment from customers and customer cancellations in the QUICKBOOKS database. As new data becomes available in QUICKBOOKS, the invention embodiment retrieves and aggregates the data recorded by the QUICKBOOKS software. The invention embodiment then processes the aggregated data to execute the "Predict Churn Risk" business task. This is shown in FIG. 26A under the heading "BUSINESS TASK". By doing so, the invention embodiment executes the business task at a default frequency of daily, or as defined by the end user. When the end user wants to predict the risk of any customer cancelling the service, the end user opens the customer profile and finds the churn risk of the customer as part of the profile. Alternatively, the end user may also view a report that provides the churn risk of all customers working with the firm. The following materials describe this example in more details, beginning with the installation of the invention and ending with the invention presenting reports to the user.

There are two installation options: pre-integrated plug-in installed with QUICKBOOKS and separate software installation that integrates with QUICKBOOKS. Each of these is described below.

In the pre-integrated plug-in installed with QUICKBOOKS. In one embodiment, the developer user supplies to Intuit, the software vendor of QUICKBOOKS, an embodiment of the invention in the form of pre-compiled software object code. The developer-user may also provide the embodiment of the invention in other forms of code, such as source code, executable binary, or other forms, as most appropriate for the technical requirements of the platform partner. Intuit links the invention object code into the QUICKBOOKS software code and ships it to customers.

In another embodiment, the plug-in code binds to QUICKBOOKS at run time, when a QUICKBOOKS end user requests to install or activate a plug-in embodiment of the invention. In this example, the object code that the developer user provides to INTUIT thus contains a configuration file, which may be part of the object code, that specifies the platform as QUICKBOOKS PREMIER ACCOUNTANT EDITION 2009. The QUICKBOOKS code provides access information to the invention embodiment that allows the invention to access QUICKBOOKS data. Providing access information can occur in different ways. In one embodiment, the QUICKBOOKS code passes access information, including a password to the invention. As part of the object code, the business task services module identifies the "Predict Churn Risk" business task as required for this installation. Thus, the object code of the invention identifies a required business task "Predict Churn Risk" for this platform. Intuit, the vendor of QUICKBOOKS, offers the "Intuit Partner Platform," which allows third parties to integrate new functionality into Intuit products. Such partner programs generally simplify the process of integrating new functionality with a platform, and the steps outlined above may differ somewhat depending on the details of partner programs. Developer-users of the invention may use such partner programs to integrate capabilities that use the invention with various platforms conveniently.

In the separate software installation option, the user invokes the configuration wizard. Configuration wizard scans accessible media to detect supported platforms. The configuration wizard detects QUICKBOOKS PREMIER ACCOUNTANT EDITION 2009 (QUICKBOOKS), using information, such as WINDOWS registry entries and directories and files on attached hard disks. Alternatively, the user may specifically request the invention to interface with the QUICKBOOKS platform, such as by selecting this platform from a list of supported platforms. The configuration wizard requests and receives access information, such as login and password, for QUICKBOOKS from user. The configuration wizard identifies supported business task "Predict Churn Risk" as a default business task for this platform. Alternatively, the user may specifically request this business task, such as by selecting this business task from a list of supported business tasks for this platform. The configuration wizard makes a request to the business task services module to identify the "Predict Churn Risk" business task as required for this installation. As the "Business Task Catalog" illustration in FIG. 26B shows, the default execution frequency for this business task is daily. Alternatively, the user may specifically request an execution frequency, such as weekly, by making a selection from a list or typing a desired frequency, such as "weekly."

Turning to execution by the task execution control module, in one embodiment referred to as decentralized control, the task execution control module executes a set of service processes, or demons, which continue to execute throughout the run time of the invention embodiment, and these service processes exchange data via data management services. These service processes are shown under the heading "SERVICE PROCESS" in FIG. 26A. In addition, the task execution control module comprises a separate process, such as a UNIX demon process or WINDOWS service process that periodically executes and checks for any service processes requiring execution, termination or restart. As FIG. 26A shows, Task Execution Control Jobs defines jobs to run. The task execution control module reads and executes these jobs. The task execution control module reads and executes instructions that specify to carry out the following steps: identify business tasks for execution ("Read_Business_Tasks"); translate business tasks into translated business tasks ("Translate_Business_Tasks"); determine which observations tables, as well as data attributes that constitute the observation tables, the invention requires to process the translated business tasks ("Identify_Observations_Tables"); schedule tasks for periodic execution ("Read_Business_Task_Schedule", and "Schedule_Tasks"); and process the translated business tasks, which will make analytic results available to the user ("Execute_Tasks"). In turn, execution of tasks involves the following steps: build and update observation tables that support the required business tasks ("Update_Observations_Tables") and execute business tasks as scheduled ("Task_Scheduler").

In another embodiment, referred to as centralized control, the task execution control module executes each business task, as well as all related processes, provides object identifiers and parameters to these processes, and receives return values and object identifiers from these processes. The specific items which the task execution control module executes are shown under the heading "JOB NAME" and their execution sequence is shown under the heading "SEQUENCE", in FIG. 26A. The type of job is shown under the heading "TYPE" in the same figure, and it indicates whether each job requires user interaction or can be executed automatically. The following describe the details of this processing. The task execution control module requests the required business tasks from the business task services module. The business task services module identifies the "Predict Churn Risk" business task as required for this installation. Specifically, the task execution control module requests the identification of the observations table from the business task services component. The task execution control module receives observations table identifier "Churn Observations" from business task translation services module (details below). The task execution control module provides observations table identifier "Churn Observations" to data management component and requests from the data management component to build "Churn Observations" (details below). The task execution control module provides the data in the observations table, including input and target data attributes, to the data mining services component to calculate the "Churn Risk." FIG. 26B shows the metadata, which the data management component uses to determine these details. The column under the header "IDENTIFIER" provides an identifier that the invention uses for internal purposes, such as joining this table with other data tables. The column under the header "BUSINESS TASK" provides the name of the business task. The column under the header "INPUT IDENTIFIER" provides an identifier that the Data Management component can use to retrieve further information about each input, which it may store in additional tables. The column under the header "INPUT NAME" provides the CDMDM data element identifier, which the developer user refers to when specifying the translated business task for the business task, and which the data mining component uses to request prepared data from the data management component. The column under the header "TYPE" provides the type of the data element described in each row, and data mining does not use "IDENTIFIER" type data but uses "DATA INPUT" type data as inputs to algorithms and "OUTPUT" type data as outputs, or targets. It further uses "ALGORITHM CATEGORY" type data to determine the algorithm category of the business task and "OBJECTIVE FUNCTION" type data to determine the objective function for the business task.

The task execution control module schedules periodic execution of business task "Predict Churn Risk." FIG. 26B shows that the business task catalog in the business task services module defines default frequency for periodic execution of Predict Churn Risk business task as "daily." The task execution control module triggers execution of Predict Churn Risk business task daily, according to specified execution frequency.

At this point, the observations table is built. The task execution control module provides observations table identifier "Churn Observations" to data management component and requests from data management to build "Churn Observations" data management component logs into QUICKBOOKS, extracts source data and builds Churn Observations table. QUICKBOOKS would contain the following set of tables, or a substantially similar set of tables: FIG. 27 illustrates an example QUICKBOOKS table regarding customer information. FIG. 28 illustrates an example QUICKBOOKS table regarding contract types. FIG. 29 illustrates an example QUICKBOOKS table regarding contracts. FIG. 30 illustrates an example QUICKBOOKS table regarding contracts and customers. FIG. 31 illustrates an example QUICKBOOKS table regarding late payments. And, FIG. 32 illustrates an example QUICKBOOKS table regarding cancellations. The invention might extract these tables from a relational database, a non-relational database, an application programming interface (API), a screen scraper, or another data extraction mechanism.

Figure 26E:
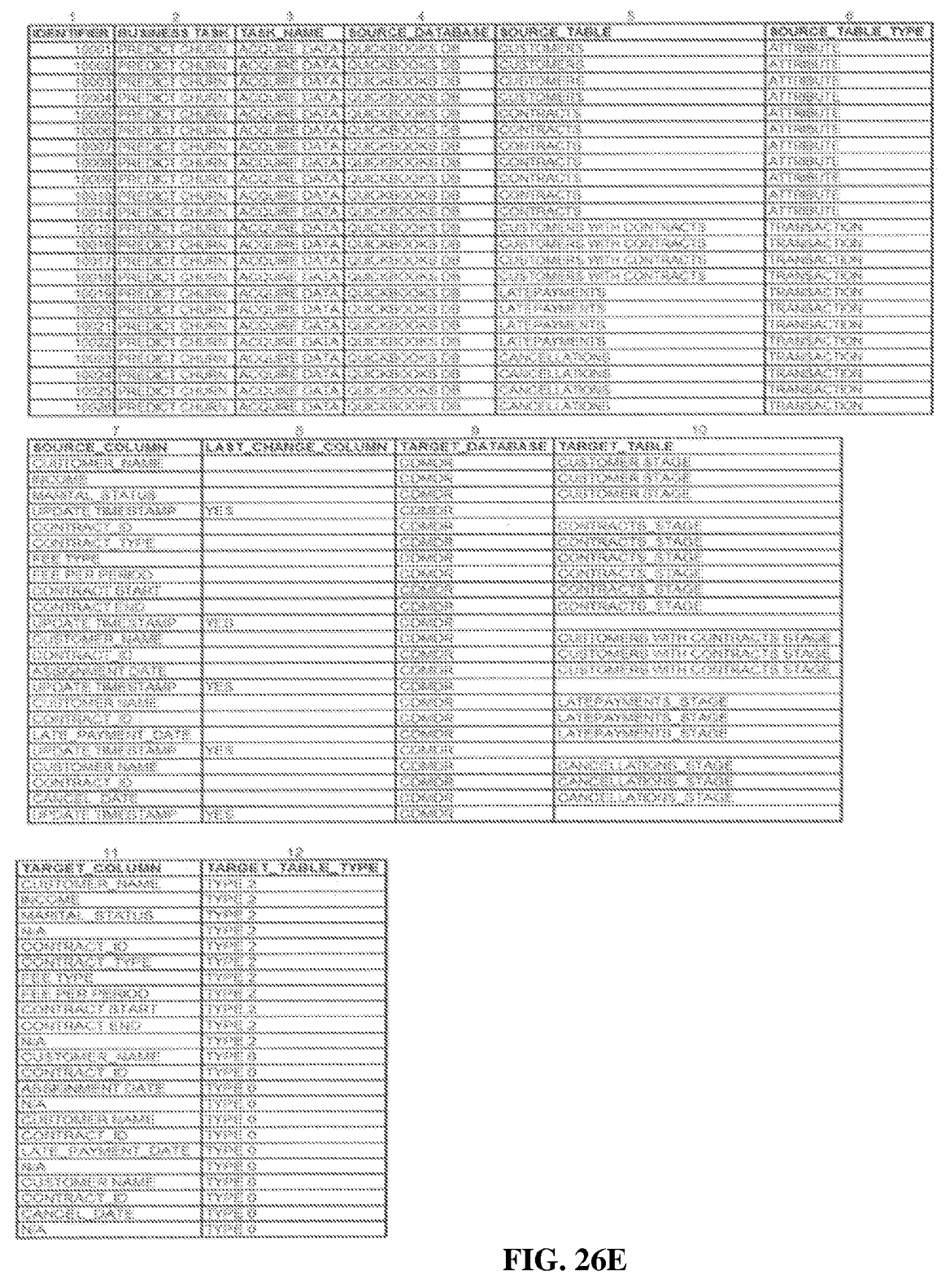
Figure 26F:
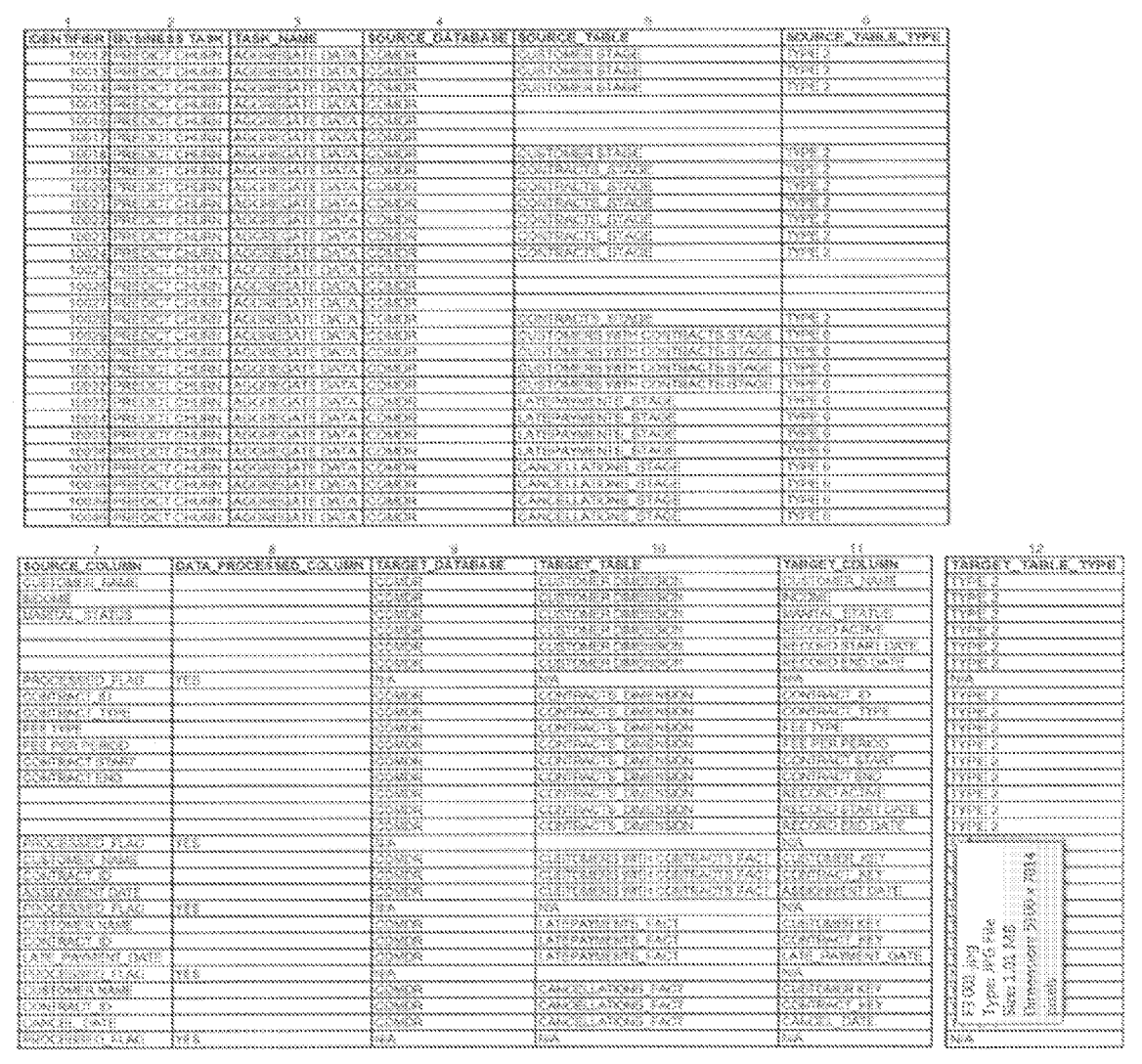

The metadata repository 126 has pre-configured information about which tables the QUICKBOOKS platform contains, and which columns to use for joining these tables into one or more observation tables, which derived attributes to compute, and which dimensions and granularities to build. FIG. 26F shows how the invention represents this information. A developer user of this invention would prepare this information and store it in the inventions meta-data repository so that it becomes available to the other components of the invention via meta-data services.

The task execution control module provides identifiers for the source tables in the QUICKBOOKS database to data management component and requests from the data management component to extract source data. The source tables include customer, contracts, contract types, late payments and cancellations as shown above. The task execution control module also provides identifiers of the tables in the data repository of the invention that needs to store the source data along with the format. The task execution control module requests the data management component to preserve and aggregate source data from QUICKBOOKS into the data repository of the invention. FIGS. 33 through 36 illustrate various tables showing the format of the data stored in the data repository. The format of the data in the data repository facilitates to preserve historic changes in the source data in QUICKBOOKS. FIG. 26D depicts the metadata used for this purpose. The data under the header "IDENTIFIER" is used for internal data management purposes. The data under the header "SOURCE_DATABASE" provides the identity of the source data base. The data under the header "SOURCE_TABLE" provides a catalog of source tables. The data under the header "SOURCE_TABLE_TYPE" identifies the type of source table. The data under the header "SOURCE_COLUMN" provides the relevant data columns in these tables. The data under the header "DATA TYPE" specifies the data element data type of each column. The data under the header "LAST_CHANGE_COLUMN" tracks when the data management component last extracted new data from the source. FIG. 26E shows the metadata the data management component uses to transport the source data into staging tables, as is the practice in the art for extract transform and load (ETL) processes. The metadata shown in FIG. 26F allows the data management component to map, or transform the staged data into the CDMDM data model. The metadata in FIG. 26G allows the data management component to further process the data in CDMDM format to provide prepared data. Specifically, the column "DATA_PREP_FORMULA" shows how the data management component derives additional prepared inputs from the transformed raw source data. Lastly, the metadata in FIG. 26H allows the data mining component to evaluate functions, such as objective functions and data preparation formulas.

Figure 26G:
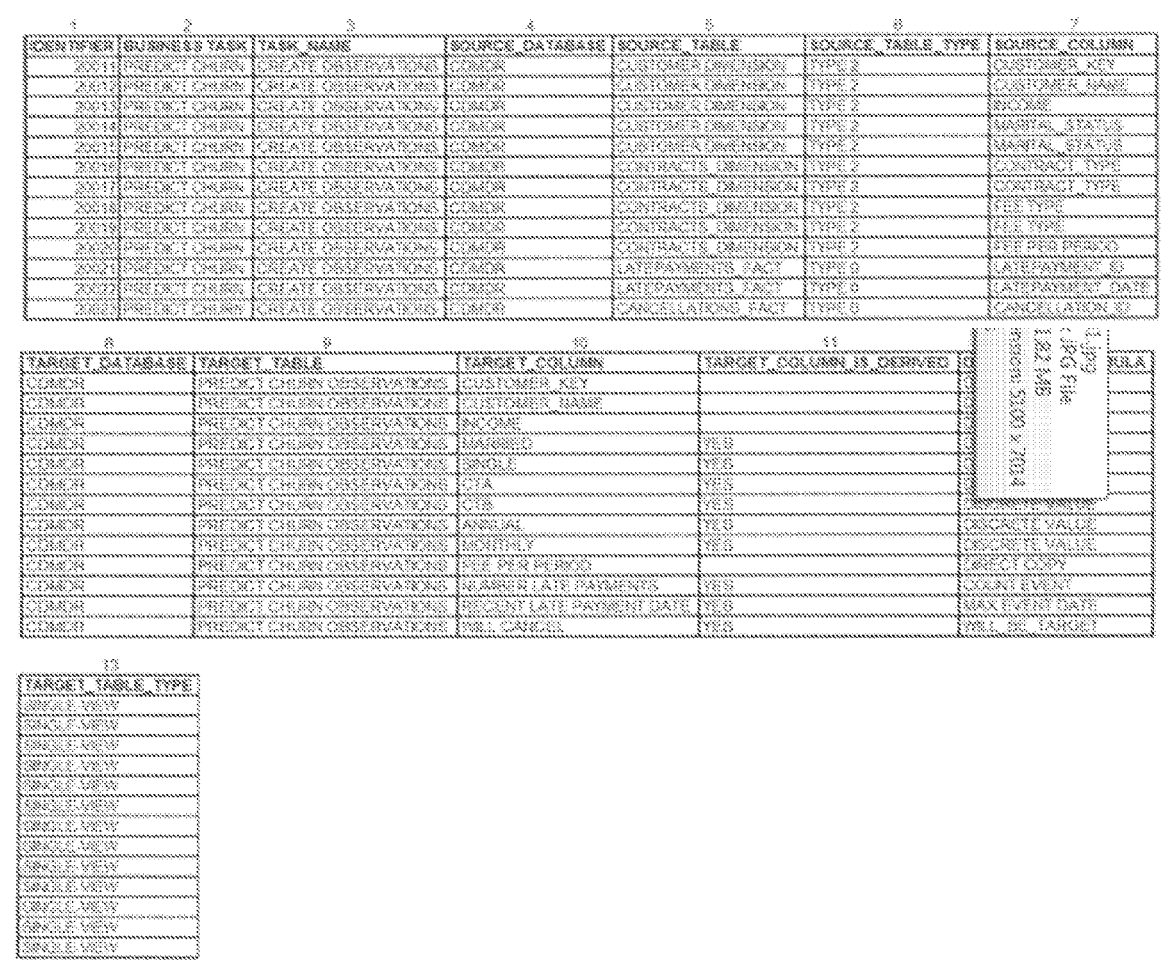

The task execution control module specifies to the data management component the metadata information in the metadata repository that stores the attributes of the "Churn Observations" table and the methods of deriving the attributes from the data stored in the data repository. FIG. 26B shows how the invention represents the metadata identifier in the business catalog which the invention provides to the task execution control module. FIG. 26G shows how the invention represents the metadata information in the metadata repository.

The data management component creates a "Churn Observations" table with the attributes specified by the task execution control module. FIG. 39 illustrates an example observations table. The derived attributes such as "Number of Late Payments" and "Will Cancel" are created using the formulas specified in the metadata information.

The task execution control module executes the above-mentioned data extraction and aggregation process based on the frequency defined in the business task catalog. The data management component extracts new and changed data during repeat execution of data extraction and aggregation process. FIGS. 37 and 38 illustrate example tables that have been revised after a repeat execution of the data extraction and aggregation process as stored in the data repository. As a new customer entries appear, and previously existing customer data changes in the source system, the data management component processes associated data as follows. As these tables show, the data management component extracts and preserves the new customer (customer id=1000009) in addition to storing the changes the changes made to profile of an existing customer (customer id—1000001). The records corresponding to Customer_Key Nos. 11 and 12 are the data stored during the first repeat extraction of data.

After extracting the new information from QUICKBOOKS, the task execution control module requests the data management component to add new observations to the observations table.

The data management component acquires source data on the frequency specified by the task execution control module. New and changed data are acquired during every data acquisition. Churn Observations table is now available from the data management component.

Turning now to execution of the business task, business task execution is a process that occurs during the run time of the invention, and it occurs through the interaction of the task execution control module and the business task translation module. The task execution control module continuously executes during the run time of the invention. As time passes, and the scheduled time arrives, the task execution control module finds that daily execution of Predict Churn Risk business task requires execution at present time. In this example, the Predict Churn Risk business task has not executed the task previously during the current day, and so the task execution control module triggers execution of scheduled business task "Predict Churn Risk."

During the processing of business tasks, the task execution control module requests translation of business task "Prediction Churn Risk" from the business task translation module.

In an alternative embodiment, business task translation occurs during the initial configuration rather than during the execution of business tasks, and the invention then updates translations when required to respond to any updates of business tasks.

Business task translation module translates business task "Predict Churn Risk" into Translated Business Task "TT1001". The task execution control module issues request to process translated business task TT1001 to the data mining component.

Turning to business task translation, the task execution control module receives observations table identifier "Churn Observations" from the business task translation component. FIG. 26B shows that the business task catalog in business task services module defines the observations table for the business task "Predict Churn Risk" as "Service Status." The task execution control module requests translation of business task "Prediction Churn Risk" from the business task translation module.

A developer user now specifies the translated business task that corresponds to the business task.

The data mining component obtains from the metadata repository translated business task ID "TT1001" from the business task translation as the appropriate translation of business task "Prediction Churn Risk."

Turning to the processing of the translated business task, the data mining component processes translated business task TT1001 and obtains results.

The data mining component finds that the algorithm category specified by the developer user in the translated business task is "CLASSIFICATION," extracts available algorithms of that type from the algorithm library and finds one matching decision tree algorithm with ID "Decision Tree 2898" and one matching neural network algorithm with ID "NEURAL NETWORK 115". FIG. 26C shows this information. The data mining component selects the decision tree algorithm to build the first model, and it requests the inputs and outputs specified in the translated business task, in the format required by each algorithm, as specified in the metadata repository, from the data management component. The details of identifying the inputs were discussed above. The data mining component then sets algorithm parameters, such as default values or randomly chose values, and applies that data to the parameterized algorithm and constructs an executable model. In a first step, the data mining component selects all available inputs as the subset of available inputs to provide to the algorithm for model building. As this model is the first available model, the data mining component finds that this model is the best available model and generates results using the executable model. In subsequent steps, the data mining component optimizes the choice of algorithm, algorithm parameters, and subsets of available inputs, using techniques, such as random search, genetic algorithms, and simulated annealing.

The data mining component sends results to the data management component for storage in the analytic results repository.

The results indicate, among others that customer 1000009 has a churn risk of 56%. This information is stored in the analytic results repository and the QUICKBOOKS application extracts this information for presentation to the end user in the form of tabular reports, graphical charts, and other such representations.

Turning to managing the results, the data mining component sends results to the data management component for storage in the analytic results repository. The data mining component stores the churn prediction for every customer in the analytic results repository.

The data mining component stores the "Churn Prediction Risk" for every customer in the analytic results 140 repository. This component also records the "Churn Prediction" and applies a time stamp to each prediction. FIGS. 40 and 41 illustrate the "Churn Prediction" results recorded during two separate analysis iterations. The analytic results repository provides results to requester. FIG. 26I illustrates the delivery metadata that provides information where the results and how they can be presented to the user.

Turning to providing the results to the user, in the case of a plug-in installation, the user clicks "Churn Risk" button in QUICKBOOKS. Using INTUIT PARTNER PLATFORM, a developer-user of the invention could make functionality of the invention available to QUICKBOOKS end users. For example, a developer user of the invention could add a control, such as a clickable button, to QUICKBOOKS that would allow a QUICKBOOKS end user to interact with the invention to view a report of Churn Risk for subscribers.

In the case of a plug-in installation, the Churn Predictions are available when the use clicks a button or a link in the customer profile screen of the QUICKBOOKS user interface. QUICKBOOKS requests data for "Churn Risk" from invention by executing a "QUICKBOOKS Churn Risk Hook" into invention to obtain Churn Risk data. QUICKBOOKS Churn Risk Hook references the function "send HTML page with Churn Risk results formatted for QuickBooks" in the analytic results repository. The data management component reads raw results data from the analytic results repository and assembles an HTML page with Churn Risk results.

The analytic results repository returns results to QUICKBOOKS. QUICKBOOKS displays results.

In the case of a separate installation, the churn prediction results are available as a report created from the data stored in the analytic results repository, and the user could view the report on a dedicated web page that is outside of and separate from QUICKBOOKS. However, this page would show analytic results that arise from processing QUICKBOOKS data with the invention.

The results displayed show for each subscriber the predicted outcome with respect to churn, in terms of "will cancel" or "will maintain subscription". Depending on the details of the business task definition, the results may also show other information, such as the probability of churn within 7 days, 30 days, and 90 days, the characteristics of each subscriber that make them more or less likely to cancel their subscription, and so forth.

Uses and Advantages

The following provides a further overview of the methods and systems of the present invention and its uses and advantages. However, the following should not be construed as limited. The present invention concerns systems, methods for creating, deploying, optimizing, and scaling data mining solutions for multiple industries and multiple platforms. The invention concerns data mining for business users and data mining for consumers. In this context, the invention provides technologies for domain-specific data mining solutions, shared business tasks, platform-independent business tasks, and custom platform support for un-standardized markets. The invention also provides technologies for deploying data mining solutions with various solution topologies. Taken together, the technologies provided by this invention enable rapid and efficient creation of data mining solutions.

In addition to these technologies, the invention also provides a technology for the discovery of the objective function from user behavior or preferences, and this technology has applicability beyond discovering objective functions for business tasks, as it is applicable to any situation where one can observe user behavior or preferences with respect to data mining solutions.

Data Mining for Business Users

Traditionally, organizations have had to hire or employees with rare and advanced technical data mining skills to take advantage of data mining technology. There are several disadvantages associated with this situation, specifically related to high cost, long development and deployment cycle times, and uncertainty of success. Because of these disadvantages, there is a market demand for data mining solutions that business users, rather than data mining experts, can use, without a need for in-depth training and specialized skills in data mining technologies.

For example, organizations that sell service contracts may be interested to predict the risk of each specific customer canceling their service contract. Such cancellations are known as "churn". With such a capability to predict churn, organizations would be able to take proactive steps to retain customers at high risk of churning. With traditional data mining technology, data mining specialists with advanced skills in statistical analysis, mathematical modeling and data management could build such churn models. A preferred solution would allow a business user in the service organization, such as a sales or support manager or similar professional, to observe the churn risk of each customer without the need for the specialized skills mentioned above. For example, a customer relationship management (CRM) application could analyze customer data, product data, transaction data, and other data to automatically apply a pre-configured churn model and display churn risk. Similarly, the service organization might purchase business software that would interact with the CRM application to display churn risk.

In addition to the commercial "business" environment, substantially similar needs exist for all organizations that may benefit from data mining, such as governments, non-profit organizations and institutions. Although this description often discusses "business users" and "business needs" we intend the information we present to apply equally to such other organizations and individuals.

The following Gartner report articulates this market need for the data mining market sub-segment of "customer data mining", however, the same market need exists generally wherever data mining can add value to organizations or individuals: "Traditionally, organizations have used generic data mining tools to support marketing, sales and service analysis. However, the growing interest in deploying data mining capabilities beyond a narrow team of specialists, to users without an established background in data mining, is attracting attention to packaged applications, which provide more guidance as well as a process for business users to conduct customer data mining." [Source: "Magic Quadrant for Customer Data Mining, 2Q07," Gartner RAS Core Research Note G00114568S, Gareth Herschel, 4 May 2007, R2297 06092008]

The following inventions, or aspects of the invention, allow the user of the invention to construct data mining solutions for business users.

1) Business Tasks

The business task technology is an aspect of the invention that allows providers or users of data mining solutions to create data mining solutions that business users can use without specialized training or skills. The data mining solution presents a business task to the business user in terminology and format that the business user is familiar and comfortable with.

For example, integrated into a CRM report, which business users may already use, the solution might insert a new data column, data row, data field, or similar presentation of data that presents churn risk. The business user may review a report of account activity for the most recent month and show the churn risk for each account, to indicate the risk that the customer would cancel the service within the next 30 days. The data may show in the report represented as "12.3%" under header "Churn Risk", and documentation and "Help" features may specify how to interpret the risk value, such as "Risk that the customer will cancel service within the next 30 days." Business users without specialized skills and training can easily interpret all of this information.

The business task technology allows the solution provider to map the above business information to a "translated business task" that represents a traditional data mining solution. Therefore, the business task technology effectively bridges the gap between business user and data mining technology. A key advantage of the business task technology is that the solution provider uses the business task framework that automates and re-uses the repetitive elements of translating a business task to a technical data mining task, and the solution provider can thus build many data mining solutions and business tasks with modest effort. Moreover, when the solution provider improves the business task technology, all business tasks and data mining solutions that utilize the business-task framework benefit from the improvement.

2) Business Task Translation

Business task translation technology is an aspect of the invention that translates business tasks into technical data mining tasks in a flexible and automated fashion. While there are many and complex differences between different data mining solutions, many data mining solutions also share common properties.

For example, many data mining solutions may share the property that an "ordinary least squares multiple linear regression" algorithm can extract relevant data patterns and generate a mathematical model that provides the predictive functionality of a business task, such as estimate churn risk, or estimate purchase propensity. In contrast to those solutions, an "apriori" association rule algorithm can build such mathematical models for many other data mining solutions, such as suggest cross and up-sell items, where regression algorithms would not apply.

The above example illustrates the mapping of data mining solutions, represented by business tasks, to mathematical modeling algorithms that are part of a technical data-mining task. Similarly, other properties of technical data mining tasks may or may not differ among a set of technical data mining tasks. Some such properties are: which input data elements the algorithm may validly use, whether the algorithm should model a target data element or extract patterns from data that are independent of any specific pre-existing data element, which target data element the algorithm should model, which performance metric of the mathematical model the solution should optimize, whether there are restrictions on which data rows the mathematical modeling algorithm may and may not use in constructing a model and what those restrictions are, what execution parameters the algorithm should optimize, such as CPU utilization, response time, disk space requirements, memory requirements, network traffic, or other parameters, what data elements the user of the business task may or may not access, whether or not the user of the business task desires to understand how, why and how well the mathematical model behaves, and many other properties of the data mining solution.

The business-task translation technology automates the selection of algorithms. To do so, the business-task translation technology takes into account the above mentioned solution requirements and specifications and selects one or more possible configurations of translated business tasks that can implement the business task. The business-task translation technology accomplishes this by automatically matching business task specifications via a mapping framework to translated business task configuration details.

Data Mining for Consumers

One example of industry-specific data mining solutions are solutions that providers offer directly to consumers, on the interne, embedded in devices, as software packages, or through other delivery mechanisms. Consumer-facing predictive services technology is an invention that enables providers to construct and deploy such capabilities, and to do so efficiently.

1) Consumer-Facing Predictive Services

Consumer-facing predictive technology is a framework and a system, method, and software program that consists of a presentation layer, a user interaction framework, and a mapping mechanism that allows the provider to map a set of consumer needs to a set of business tasks. These technologies allow the provider to construct consumer-facing predictive capabilities efficiently and effectively. For example, in one such implementation, a PC service provider could license the invention and use the predictive technology framework to offer reliability-based prediction to its consumers.

2) Predictive Services for Social Networks

In the social networking industry, there are numerous common and less common user needs and provider needs that data mining technology can enable, facilitate, and optimize. For example, users may face the following needs that data mining can support: find specific individuals, such as old childhood friends, lost college mates, and former business partners, in the network about which the user has only partial information so that many potential matches exist; find any individuals who are most likely to respond to a specific need, such as responding to a sales opportunity, answering a question, or forwarding a request to another individual; or estimate the likelihood that a specific individual will accept an invitation to connect to the user.

When social networks focus on specific groups of users, more specialized user needs and interests will likely also exist, such as: cardiac health predictions for a network of consumers who share their details about heart, lipids, and blood pressure. Similarly, social networking providers experience needs such as the following that the invention can support: estimating the risk that a transaction on the social network was initiated by a computer program, such as a "bot," rather than by a human user; estimating the risk that a user has violated an agreement such as a user agreement, for example soliciting sales when selling products or services is not permitted; and extracting groups of users, or subnets of users with similar interests. Social network providers and users can benefit from predictive services for social networks, by expressing and implementing these and other social network-related needs as business tasks.

Domain-Specific Data Mining Solutions

One need in the market for a data mining solution is the need for domain-specific data mining solutions for business users, users in other organizations, and consumers. Domain-specific solutions facilitate adoption of data mining technology by presenting capabilities to users in specific industries, scientific fields, consumer-related activities, or other domains in terminology and formats that are common in the domain and with which these users are already familiar. In addition to terminology and formats, when some or all of the solutions offered address issues that are well known and significant in the industry, it will facilitate adoption of these solutions and tend to increase their value).

The following quote from a 2007 article in "intelligent enterprise" articulates this need for industry-specific data mining solutions: "In theory, the smaller Advanced Analytics segment has greater potential for growth, 'but we're just not producing enough statisticians and quantitative analysts for organizations to buy into this technology, [ . . . ].' The results suggests there's even more demand for analytics, but to bring it to a broader audience of business analysts, I think we'll have to dumb it down a bit by packaging canned models for specific markets such as retail." "(IDC Report Sees Steady Growth for BI, Pent-Up Demand for Analytics," by Doug Henschen, intelligent enterprise, http://www.intelligententerprise.com/print_article.jhtml?articleID=208802671, © 2007 CMP Media LLC).

The following inventions represent technologies that enable and facilitate efficient development of effective industry-specific data mining solutions.

1) Domain-Specific Business Task Catalog

The invention provides technology that facilitates the creation and use of catalogs of business tasks for specific industries. The business-task catalog is a technology that allows providers of industry-specific data mining solutions to offer packages of related business tasks for specific industries. The technology provides a collection of business task catalogs and maps each business task to a meta-catalog of non-industry specific business tasks, providing mappings to industry terminology for each pair of meta-business task to a business-specific business task via business terminology technology, and efficiently implementing and deploying each industry catalog of business tasks.

2) Standard Platform

Software vendors have created standard platforms for many industries. Such standard platforms include platforms that support formal, cross-industry standards put forth by professional associations, such as IEEE, ANSI or ISO, or other independent bodies. Such standard platforms also include "effective" industry standards that arise by wide adoption, such as the WINDOWS operating system, the ORACLE E-BUSINESS SUITE ERP solution, SAP ERP, MICROSOFT DYNAMICS RMS (Retail Management System), and INTUIT QUICKBOOKS POINT-OF-SALE.

Standard platforms present an opportunity for data mining solution providers because providers can deploy one data mining solution that integrates with a standard platform to all organizations that adopt the standard platform. For example, numerous organizations may adopt SAP MANUFACTURING for maintenance management to plan, schedule, and sequence maintenance to optimize assets and minimize downtime. A provider that offers a data mining solution that integrates with SAP MANUFACTURING for maintenance management may offer a solution that estimates the risk of downtime for pieces of equipment for which data is available in SAP.

The data mining solution provider can then deploy the solution unchanged to every organization that has adopted SAP maintenance management. To the extent that organizations customize a standard platform such as SAP MANUFACTURING, the data mining provider would need to only adjust the data mining solution for the specific customizations the adopting organization made. The ability to offer one solution without any changes, or with minimal changes, to a large market of platform adopters presents a significant competitive advantage over data mining solution providers that custom develop solutions for each customer.

3) Industry-Specific Business Terminology

The business terminology technology enables data mining solutions providers to customize solutions for specific industries. Through business terminology technology, solutions providers can reduce cost and time-to-market because they can use portfolios of business tasks and customize them for multiple industries with modest effort requirements.

For example in one instance, "chum" is the tendency of Internet and cell phone subscribers to switch providers. The same concept "is also sometimes called attrition rate." While many industries may want to model and prevent chum, some industries may commonly refer to the issue as "chum," and other industries may refer to the same issue as "attrition" or other industry-specific terms. Similarly, some industries may refer to "customers" (e.g., the software industry) while other industries may refer to essentially the same concept in a variety of ways, such as "clients" (consulting industry), "shoppers" (retail industry), "users" (internet services industry), "visitors" (internet content provider industry), "subscribers" (printed periodical publishing industry), "guests" (hospitality industry), "passengers" (airline industry), "patients" (health care industry), "readers" (newspaper industry), or other industry-specific terms.

With business terminology technology, a data mining solution provider may offer essentially identical or similar portfolios of business-tasks and associated technical-tasks to various industries, and present the solution to each industry with industry-specific terminology.

Shared Business Tasks

In some cases, different business tasks may share key properties that would allow a solution provider or user to share a single business task. For example, two industry-specific data mining solutions for the retail industry and the automotive industry may share a business task for cross and up selling. The shared business task technology is an aspect of this invention that facilitates sharing of business tasks across domain-specific data mining solutions.

This invention facilitates the sharing of domain-independent predictive services by providing a catalog of domain-independent meta business tasks, which a solution provider or user can instantiate for use in a domain-specific set of business tasks. To accomplish this, the invention offers a catalog of domain-independent meta business tasks and a facility for instantiating such meta business tasks into domain-specific contexts. For example, the domain-independent meta business task may refer to a generic data element to identify a product, and by instantiating this task for the automotive domain, the instantiated business task for the automotive industry would instantiate the data item "product" to apply to automotive products by referencing a specific data element for automotive products.

Platform-Independent Business Tasks

Many industries rely on multiple common software platforms for efficiently conducting business. For instance, numerous businesses in the retail industry have adopted retail software-solution platforms, such as MICROSOFT DYNAMICS RMS (Retail. Management System), and INTUIT QUICKBOOKS POINT-OF-SALE. Data mining solution providers and users would draw significant benefit from being able to develop retail data mining solutions independently of the platform the user adopted. This invention realizes that benefit by providing the business-task technology, which enables solution providers to develop business tasks independent of the platform that provides the source data and/or target platform for integration of results. In addition to the business task technology, the invention leverages other technologies to realize platform independence. One such technology is the metadata-model technology. The invention uses a metadata-model as a target for transforming platform-specific data into a platform independent data.

Custom Platform Support for Un-Standardized Market

In situations where a data mining solutions provider offers solutions for custom platforms or when a user wants to implement such a solution, the present invention facilitates the integration with that non-standard, custom platform to implement the required solution. Integrating solutions with custom platforms requires a certain amount of effort to integrate the solution to the custom data model, access methods and other technical considerations. However, the solution provider or a user can avoid a significant amount of effort by establishing an abstraction layer between platform-independent aspects and platform specific aspects of the solution The present invention provides such an abstraction layer, where the invention supports implementing platform-independent aspects of the solution as business tasks. These business tasks operate on a platform-independent data model. Separate technologies of the invention then facilitate populating the platform-independent data model with data content, and the process of populating the platform-independent data model for standard platforms as well as for custom platforms. This technology isolates platform-specific aspects from platform-independent aspects of the data mining solution. Therefore, the solution provider can reduce the effort associated with development and deployment against custom platforms to only platform-specific aspects of the solution. The technology thus improves effectiveness and efficiency of creating data mining solutions.

This invention further supports the creation of custom-platform solutions by providing a framework for orchestrating custom platform solutions. The orchestration framework provides a generic workflow that the provider can encode in a user interface so that the workflow and process of integrating data mining solutions with custom platforms becomes standardized. For example, the workflow provided by the invention allows the user to specify data access methods and mappings of data elements of the custom platform to data elements of the platform-independent data model. In addition to the workflow specification, the invention also provides a data model for expressing the mapping between a given custom data platform and the platform-independent data model. Lastly, the invention also supports and facilitates customizing terminology that the data mining solution uses. The following list shows the components of the custom platform orchestration technology.

Custom platform orchestration components include: workflow for integrating custom platforms with data mining solutions, specifying data access methods for custom platforms, data element mapping between custom data model and platform-independent data model, and terminology mapping from industry business terminology to custom terminology. The custom platform orchestration terminology thus provides a mechanism that allows solution providers to integrate data mining solutions with custom platforms effectively and efficiently.

Solution Topologies

The invention provides technologies for deploying data mining in multiple different topologies, were some topologies may be more appropriate than another in a given deployment context. In the Software-as-a-Service (SaaS) topology, the provider or a partner of the provider may operate one or more server-portions of the solution centrally on their premises. Other client-portions of the solution, such as a browser, may operate on the customer's or user's premises. In the hardware appliance topology, the provider offers the entire solution preinstalled and ready to run on dedicated hardware, and ship this hardware appliance to the customer or user, where the user or an agent of the provider may install the hardware appliance with no further needs for installing any software. In the software appliance topology, the provider builds the software solution in such a fashion that installation requires only minimal interaction for installation. For example, installation may require only clicking on a link in a web browser. In the client-server topology, the provider offers a more traditional architecture, where the software architecture consists of server software and client software, and a single instance of the server software performs computations and stores information and serves results to the client software. The client software displays results received from the server and may perform data storage and computation to a limited extent.

In the plug-in topology, a provider offers a plug-in to another software unit, and the provider or user can download or activate the plug-in through simple interaction, such as clicking a link, or selecting a menu option. This topology is similar to the software appliance topology but differs in tendency in that the user may perceive the plug-in as an extension of another software item. The plug-in may also not provide a separate user interface or a more limited user interface as compared to the software appliance topology.

In the embedded device topology, the solution embeds into a device, such as a household appliance, automotive electronic control unit (ECU), Computer Numerical Control (CNC), or mobile device such as a PDA, pager, music player or mobile phone. In this topology, the solution must comply with storage and computational limitations of the device and the embodiment of the solution must comply with the execution environment offered by the device, such as executing in on a Java Card, on the Java Platform ME (Micro Edition) environment, Windows CE environment, or similar execution environments available on embedded devices.

Rapid and Efficient Creation of Data Mining Solutions

As data mining solutions providers compete, one critical competitive advantage is the ability to develop and deploy data mining solutions rapidly and efficiently. The following aspects of the invention enable rapid and efficient creation of data mining solutions.

On aspect is the integrated environment for entire data management and data mining life cycle from data acquisition to result delivery and presentation with automation. One can view the methods and systems described in this invention as an integrated environment for creating, deploying, optimizing and scaling data mining solutions. The invention includes mechanisms to support and automate data mining tasks across the data-mining life cycle. These tasks include data acquisition, managing the data, preparing the data, mining the prepared data to create data mining models and solutions, deploying data mining solutions, and presenting data mining results. The invention specifies how to accomplish these tasks to facilitate automation and semi-automated support, as well as interfaces between and among tasks that facilitate integration of the entire process. One objective of the invention is thus to eliminate essential technical and non-technical challenges and bottlenecks of traditional data mining solution development.

One prominent example of automation and integration is the automation of data management and data mining and the integration between these tasks. The invention automates data management processes, such as data acquisition, data preparation for data mining, and management of the acquired and prepared data. The invention then provides access to the prepared data via a standard interface to the processes of data mining. The automation and integration of the data management and data mining is one of the key benefits of this invention. This benefit is significant because data management and data mining have traditionally required different and advanced skill sets. The difficulties associated with this chasm have contributed to the slower adoption of data mining technology overall, as well as to particularly slower adoption by small and medium-sized organizations and individuals. Among other benefits, this invention would therefore facilitate the adoption of data mining by small and medium-sized organizations and individuals.

Discovery of Objective Function from User Behavior or Preferences

When business users face business needs, such as estimating churn risk or identifying cross and up-selling opportunities, they may not be able to define in technical terms how to measure the quality of solutions to these needs. This technology has applicability beyond discovering objective functions for business tasks, as it is applicable to any situation where one can observe user behavior or preferences with respect to data mining solutions.

For example, when estimating churn risk, is it most important to minimize the incorrect identification of customers with low churn risk as high-risk? Alternatively, is it most important to maximize the percentage of correctly identified customers of those who would actually churn? These two objectives conflict with each other, as optimizing for one would tend to harm the other.

The above example shows that business users may not be able to identify easily the appropriate "objective function", that is, the technical measurement that one wants to optimize may not be possible for business users. Moreover, it may not be possible for solution providers to identify the correct objective function for all users, even through extensive research, because different organizations may have diverse preferences. This invention provides a solution for this difficulty, as it enables a data mining solution to discover the best objective function, based on observed user behavior and preferences.

In addition to the above description of the various uses of the invention, the invention is capable of providing data mining and analytic solutions for data generated during everyday operations in many industry areas. A subset of the industry specific data supported by the invention include retail, electronic retail or electronic retailing, manufacturing, automobile, financial services and banking, high technology, aeronautical, medical, and pharmaceutical.

In addition to the above-mentioned industry areas, the invention is capable of analyzing data stored in multiple data formats such as ASCII, binary, hexadecimal, and multiple data-storage formats such as serial, relational, dimensional, and hierarchical. The invention also supports any platform that a user may have, including the following specific data platforms: CRM (marketing, sales, service) data platforms from software vendors such as SIEBEL, ORACLE, SAP, MICROSOFT, SALESFORCE.COM, SUGAR CRM, PEOPLESOFT, and RIGHTNOW; human resource data platforms from software vendors such as SAP, PEOPLESOFT, ADP, PAISY, and HEWITT, banking (account transactions) data platforms such as SAP, JD EDWARDS, GREAT PLAINS (now MSFT DYNAMICS GP), MSFT DYNAMICS AND BANKING 2000 (from INFOSYS); retail data platforms that support POS, purchase transactions, stocking and inventory, pricing, discount and coupons, restaurants, hotels, and casinos for software applications such as INTUIT QUICKBOOKS POS, ACCOUNTANT, MSFT RMS, SAP RETAIL, MSFT DYNAMICS, ORACLE RETAIL, KAYAK, SABRE, content management, AB INITIO, VIGNETTE, social networking, blogs, LINKEDIN, MYSPACE, FACEBOOK, FEEDBURNER, BLOGLINES, BLOGGER, TECHNORATI, Newsfeeds, REUTERS, MARKETWATCH, YAHOO, GOOGLE, Search engines, and MSFT LIVE SEARCH; manufacturing data platforms in the area of automotive, computers, heavy equipment, diagnostics and breakdowns, repairs, service and maintenance, product and parts performance, and reliability and quality from software vendors such as SAP MANUFACTURING and SAS WARRANTY.

The invention also supports an unlimited number of business tasks. A subset of such business tasks includes: business tasks for the automobile industry including predicting vehicle stalling, recall of vehicle parts, root causes for defects, and lane departure, as well as reverse engineering test modules; business tasks for the high technology and computer industry including predicting unplanned outage risk of computers and compatibility of software modules and configurations; business tasks in the customer relationship management area including predicting propensity analysis of prospects, campaign performance, acquisition cost for customers, churn, up-sell and cross-sell opportunities, life time value of customers, and optimized offers to customers; business tasks in the financial services area including predicting payment transaction fraud risk, financial portfolio optimization, credit score and loan default risk, fraudulent invoices for service, and security (computer, network, data, etc.) and intrusion risk; business tasks for retail including predicting optimized markdowns, shrinkage, fraudulent returns, personalized coupons, and optimized in-store arrangements; and business tasks in other industries including image labeling and classification, spam detection and email classification, matching resumes to job openings, matching display ads to media content, matching ads to search queries, optimizing search result ordering for click propensity, optimizing shipping routes, estimating project effort and team productivity, and detecting and segmenting communities with shared interests, behavior, users with similar rating, and preferences.

It should be appreciated that the invention may be deployed in various ways. As described in connection with the data management component, the data mining component may reside on one or more computer servers either on the end user's premises or in a central data center serving one or more geographically distributed client installations of the invention. The modular nature of the invention facilitates the distributed deployment of the data mining component because it exchanges only certain types of information with other components of the invention. For example, the data mining component does not interact with the end user, and it does not interface directly with source systems. The narrowly focused nature of the types of data the data mining component exchanges with other components facilitates distributed deployment, as it reduces the frequency of data exchanges as well as the volume of data exchanged. For example, while the data management component may extract new source data many times per minute for thousands of source data elements, the data mining component may process only a few dozen or hundreds of prepared data elements once per day.

Further, the data mining component tends to require a large amount of CPU resources because data mining algorithms are typically "CPU-bound" programs. In contrast, the data management component tends to require a large amount of input/output (I/O) resources, such as memory and computer disk storage. Therefore, it would be beneficial for the data mining component to reside on computing equipment that provides particularly powerful CPU resources, which may not be available in the end user's computing environment. In contrast, the data management component may beneficially reside on equipment that provides particularly powerful I/O resources. It should be appreciated that while the data mining component may require large amounts of I/O resources, these requirements would typically be relatively small as compared to the I/O resources required by the data management component, because the data management component extracts, transforms, augments, and prepares the data that the data mining component processes. Therefore, the data mining component may proceed immediately with applying data mining algorithms to the data it receives without performing further transformations. Naturally, the data mining algorithms themselves will process and transform data, but such transformations are limited more narrowly, excluding data which the data management component used to construct the prepared data but did not then pass on to the data mining component.

Similarly, the data mining component tends to require fewer networking resources when deployed geographically distant from the source systems, as compared to the data management component, which may extract data from source systems over the network. These different networking resource requirements also lead to benefits of distributed deployment that supports the ability to tailor computing equipment differently for each component.

Thus, each component benefits from optimization of different types of resources in the equipment on which these components reside. The availability, time required and cost of setting up, operating, servicing and maintaining computing equipment may differ significantly from one geographic location to another. For example, it may be less costly to setup, operate, service and maintain computing equipment and software in Nebraska as compared to Massachusetts, or in China or India, as compared to Europe or the United States.

The availability, time required, and cost of setting up, operating, servicing, and maintaining computing equipment may also differ significantly, depending on whether the equipment resides on the end user's premises or a provider's premises and whether the end user or provider owns the equipment. For example, an end user that is a large corporation may have restrictive policies that limit the ability to quickly, and at low cost, deploy computing equipment and software to its premises. In some instances, such end user policies may even preclude adding equipment. In the case of end users who are individual consumers, non-profit organizations, or small businesses, their ability to afford or deploy computing equipment and software may also be severely limited. Such differences in the power of various aspects of computing resources, the cost of setting up and operating equipment, and policies and ability to modify the end user's computing equipment lead to benefits of distributed deployment of the data mining component and other components of the invention.

The business task translation component may also be deployed separately, for example, to interface between pre-existing business services, data management and data mining component that are different from those of this invention. For instance, a pre-existing Customer Relationship Management (CRM) system may act as a business services component and define data mining needs in terms of business tasks. To do so one may add a limited and simple amount of software code to a CRM system that defines business tasks. Similarly, an existing data warehouse may serve as a data management component, and specific views in the data warehouse may serve as observations tables, containing prepared data for mining, or one may be able to add additional such views with limited effort and cost. Lastly, existing data mining capabilities may act as data mining components that could receive translated business task requests, along with prepared data from the business task translation and data management components. A limited amount of relatively simple additional software programming would be required to translate the translated business tasks defined by the business task translation component into requests that a pre-existing data mining capability could service. In each case, the required work to interface pre-existing capabilities to the components of the invention is limited to translating existing data formats and functionality to the data formats and functionalities provided by the components of the invention. Different combinations of pre-existing capabilities and components of the invention are possible, for example to insert the data management component alone into a pre-existing environment, where experts then benefit from its data preparation capabilities for reporting, data mining or other needs.

Further, the invention may be embodied in general-purpose and/or special-purpose devices or systems that include both hardware and/or software components. Embodiments may also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

Embodiments may also include computer program products for use in the systems of the present invention, the computer program product having a physical computer-readable medium having computer readable program code stored thereon, the computer readable program code comprising computer executable instructions that, when executed by a processor, cause the system to perform the methods of the present invention.

In one embodiment, the invention can be implemented as a hardware appliance and sold to customers. In this embodiment, the invention will be pre-installed and pre-configured in a specialized hardware device similar to a computer server. The hardware appliance that runs the invention will have a customized configuration to enable the invention to plug into the IT environment of the end user to readily execute business tasks. It is to be noted that the hardware appliance will be compatible with the IT network infrastructure used in the current art and will have following aspects of configuration: functional hardware and software environment to support and execute the binary code of the invention; network interfaces to plug into the end users' IT network infrastructure using protocols used in current art such as TCP/IP; dedicated disk to store the data generated by the invention; pre-installed software infrastructure for data storage such as file-based, relational, or xml database applications; pre-installed database connectivity drivers to connect to third-party source systems. The will include Open Database Connectivity drivers and native drivers to all industry standard data formats and database applications such as ORACLE, DB2, MYSQL, MICROSOFT SQL SERVER, INGRESS, POSTGRESS, XML, and text files; pre-installed and configured web server, ftp server, or smtp server to publish results in html format using a web interface or as ftp files or in an email and, in addition, a software system to support web services will be pre-installed and configured; a standard interface to connect to external UI devices such as computer monitors; and pre-configured capability to download the latest updates of the invention from the manufacturer.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for providing a result based on a task, comprising:
    a first module comprising a first non-transitory computer-readable memory storing computer-executable code that receives a business task related to a business of a user;
    a second module comprising a second non-transitory computer-readable memory storing computer-executable code that prepares the business task received by the first module for processing a machine-executable task by retrieving a pre-configured mapping between the business task and the machine-executable task stored in a business task repository;

wherein the second module further comprises:
- a first sub-module comprising a first sub-module non-transitory computer-readable memory storing computer-executable code that retrieves the pre-configured mapping between the business task and the machine-executable task;
- a second sub-module comprising a second sub-module non-transitory computer-readable memory storing computer-executable code that specifies a source table, or a plurality of source tables and a plurality of data fields based on the pre-configured mapping associated with the definition of the machine-executable task;
- a third sub-module comprising a third sub-module non-transitory computer-readable memory storing computer-executable code that places the selected data into a table for later use and preserving a longitudinal state of a plurality of selected data;

a third module comprising a third non-transitory computer-readable memory storing computer-executable code that selects data from a database to produce selected data, wherein the data is selected based on the pre-configured mapping, wherein the pre-configured mapping is associated with a definition of the machine-executable task;

a fourth module comprising a fourth non-transitory computer-readable memory storing computer-executable code that analyzes the selected data to produce analyzed data by selecting and applying at least one data mining algorithm from an algorithm library based on the pre-configured mapping associated with the definition of the machine-executable task;

a fifth module comprising a fifth non-transitory computer-readable memory storing computer-executable code that determines at least one result based on the analyzed data and the at least one data mining algorithm based on the pre-configured mapping associated with the definition of the machine-executable task; and a sixth module comprising a sixth non-transitory computer-readable memory storing computer-executable code that sends the at least one result for display based on the pre-configured mapping associated with the definition of the machine-executable task.

2. The system of claim 1, further comprising;
a seventh module comprising a seventh non-transitory computer-readable memory storing computer-executable code that executes the at least one data mining algorithm to generate a first model, wherein the first model is based on the selected data, and the at least one result is based on the first model.

3. The system of claim 2, wherein the seventh module further comprises computer-executable code that executes the at least one data mining algorithm to generate a second model, wherein the second model is based on the selected data, and wherein the system further comprises:
- an eighth module comprising an eighth non-transitory computer-readable memory storing computer-executable code that selects a best model from the first model and the second model, and wherein the at least one result is based on the best model.

4. The system of claim 3, wherein the seventh module further comprises computer-executable code that executes a plurality of data mining algorithms to generate a plurality of models and wherein the eighth module further comprises computer-executable code that selects the best model from the plurality of models.

5. The system of claim 3, further comprising;
a ninth module comprising a ninth non-transitory computer-readable memory storing computer-executable code that configures a plurality of new business tasks and mapping the plurality of new business tasks to a plurality of machine-executable tasks.

6. The system of claim 1, wherein the first non-transitory computer-readable memory storing computer-executable code further comprising computer-executable code that receives a plurality of pre-configured business tasks from the business task repository.

7. The system of claim 1, wherein the business task related to a software application.

8. A computer-implemented method for providing a result based on a query, comprising:
receiving, by a first computing subsystem, a business task, wherein the business task is related to a business of a user;
preparing, by a second computing subsystem, the business task received by the first computing subsystem for processing a machine-executable task, by the second computing subsystem, by retrieving a pre-configured mapping between the business task and the machine-executable task in a business task repository;
wherein the second computing subsystem further comprises:
- retrieving, by a first sub-module, the pre-configured mapping between the business task and the machine-executable task;
- specifying, by a second sub-module, a source table, or a plurality of source tables and a plurality of data fields based on the pre-configured mapping associated with the definition of the machine-executable task;
- placing, by a third sub-module, the selected data into a table for later use and preserving a longitudinal state of a plurality of selected data selecting, by a third computing subsystem, data from a database to produce selected data, wherein the data is selected based on the pre-configured mapping, wherein the pre-configured mapping is associated with a definition of the machine-executable task;
analyzing, by a fourth computing subsystem, the selected data to produce analyzed data and selecting, by the fourth computing subsystem, at least one data mining algorithm from an algorithm library to produce a selected algorithm, wherein the selecting the at least one data mining algorithm is based on the pre-configured mapping associated with the definition of the machine-executable task;
determining, by a fifth computing subsystem, at least one result based on the analyzed data and the selected algorithm based on the pre-configured mapping associated with the definition of the machine-executable task;
sending, by a sixth computing subsystem, the at least one result for display based on the pre-configured mapping associated with the definition of the machine-executable task.

9. The method of claim 8, further comprising;
executing, by a seventh computing subsystem, the at least one data mining algorithm to generate a first model, wherein the first model is based on the selected data and the at least one result is based on the first model.

10. The method of claim 9, further comprising:
executing, by the seventh computing subsystem, the at least one data mining algorithm to generate a second model, wherein the second model is based on the selected data; and selecting, by an eighth computing subsystem, a best model from the first model and the second model, and wherein the at least one result is based on the best model.

11. The method of claim 10, wherein the executing further comprises executing a plurality of data mining algorithms to generate a plurality of models and wherein the selecting further comprises selecting the best model from the first model, the second model, or one of the plurality of models.

12. The method of claim 10, further comprising:
configuring, by a ninth computing subsystem, a plurality of new business tasks; and
mapping, by the ninth computing subsystem, the plurality of new business tasks to a plurality machine-executable tasks.

13. The method of claim 8, further comprising:
retrieving, by a first module the pre-configured mapping between the business task and the machine-executable;
specifying, by a second module, a source table, or a plurality of source tables and a plurality of data fields based on the pre-configured mapping associated with the definition of the machine-executable task;
placing, by a third module, the selected data into a table for later use and preserving longitudinal state of a plurality of selected data.

14. The method of claim 8, wherein the receiving by the first computing subsystem further comprises receiving a plurality of preconfigured business tasks from the business task repository.

15. The method of claim 8, wherein the business task relates to a software application.

16. A system for preparing a task for processing, comprising:
a first module comprising a non-transitory computer-readable memory storing computer-executable code that retrieves a pre-configured mapping associated with a business task, wherein the pre-configured mapping contains mapping between the business task and a machine-executable task stored in a business task repository;
wherein the pre-configured mapping associated with the business task further includes an identity of the business task, wherein the business task repository further contains a plurality of pre-configured mapping to identify a plurality of business tasks, and wherein any one or more of the plurality of business tasks is associated with a plurality of machine-executable tasks;
a second module comprising a second non-transitory computer-readable memory storing computer-executable code that specifies a source table, or a plurality of source tables and a plurality of data fields from a first database on the pre-configured mapping, wherein the pre-configured mapping is associated with a definition of the machine-executable task;
a third module comprising a third non-transitory computer-readable memory story computer-executable code that selects data from the source table or the plurality of source tables to produce selected data, wherein the data is selected based on the pre-configured mapping associated with the definition of the machine-executable task;
a fourth module comprising a fourth non-transitory computer-readable memory storing computer-executable code that places the selected data into a first table for later use and preserving a longitudinal state of selected data and a second database for storing the first table; and
a fifth module comprising a fifth non-transitory computer-readable memory storing computer-executable code that selects and applies at least one data mining algorithm from an algorithm library, wherein the selecting the at least one data mining algorithm is based on the pre-configured mapping associated with the definition of the machine-executable task.

17. The system of claim 16, wherein the fourth module further comprises computer-executable code that places the selected data into the first table based on a pre-defined format based upon a pre-determined platform used to create the first database.

18. The system of claim 16, wherein the fourth non-transitory computer-readable memory storing computer-executable code further comprises:
computer-executable code that applies mathematical and statistical functions to the data in the first table to derive additional inputs for the data mining algorithm;
computer-executable code that stores additional inputs in a second table in the second database for a later use by the data mining algorithm; and
computer-executable code that transforms the data stored in the first and second tables in the second database into a de-normalized table that allows for usage of data regardless of form by the data mining algorithm.

19. A computer-implemented method for preparing a task for processing, comprising;
retrieving, by a first computing subsystem, a pre-configured mapping associated with a business task, wherein the pre-configured mapping comprises a mapping between the business task and a machine-executable task stored in a business task repository;
wherein the pre-configured mapping associated with the business task further includes an identity of the business task, wherein the business task repository further contains a plurality of pre-configured mapping to identify a plurality of business tasks, and wherein any one or more of the plurality of business tasks is associated with a plurality of machine-executable tasks;
specifying, by a second computing subsystem, a source table, or a plurality of source tables and a plurality of data fields from a first database based on the pre-configured mapping, wherein the pre-configured mapping is associated with a definition of the machine-executable task;
selecting, by a third computing subsystem, data from the source table or the plurality of source tables to produce selected data, wherein the data is selected based on the pre-configured mapping associated with the definition of the machine-executable task;
placing, by a fourth computing subsystem, the selected data into a first table for later use and preserving a longitudinal state of the selected data and storing the first table in a second database; and
selecting and applying at least one data mining algorithm from an algorithm library, wherein the selecting the at least one data mining algorithm is based on the pre-configured mapping associated with the definition of the machine-executable task.

20. The method of claim 19, wherein the placing the selected data into the first table is based on a pre-defined format based upon a pre-determined platform used to create the first database.

21. The method of claim 19, further comprising:
deriving, by the fourth computing subsystem, additional inputs for the data mining algorithm by applying mathematical and statistical functions to the data in the first table;
storing, by the fourth computing subsystem, of the additional inputs in a second table in the second database for a later use by the data mining algorithm; and transforming, by the fourth computing subsystem, of the data stored in the first and second tables in the second database into a de-normalized table that allows for usage of data regardless of form by the data mining algorithm.

* * * * *